United States Patent
Hauser et al.

(10) Patent No.: US 10,822,021 B2
(45) Date of Patent: Nov. 3, 2020

(54) ELECTRONIC DRIVE CONTROL SYSTEM FOR A ZERO TURN RADIUS VEHICLE

(71) Applicant: Hydro-Gear Limited Partnership, Sullivan, IL (US)

(72) Inventors: Raymond Hauser, Sullivan, IL (US); Michael L. Bennett, Sullivan, IL (US); Douglas W. Bell, Mattoon, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 335 days.

(21) Appl. No.: 16/047,752

(22) Filed: Jul. 27, 2018

(65) Prior Publication Data

US 2019/0023306 A1  Jan. 24, 2019

Related U.S. Application Data

(63) Continuation of application No. 14/617,476, filed on Feb. 9, 2015, now Pat. No. 10,035,537, which is a continuation of application No. 12/179,226, filed on Jul. 24, 2008, now Pat. No. 8,950,520, which is a continuation-in-part of application No. 11/771,559, filed on Jun. 29, 2007, now Pat. No. 8,844,658.

(60) Provisional application No. 60/819,192, filed on Jul. 7, 2006.

(51) Int. Cl.
| | |
|---|---|
| *B62D 5/04* | (2006.01) |
| *B62D 6/00* | (2006.01) |
| *B62D 11/04* | (2006.01) |
| *B62D 3/02* | (2006.01) |
| *B62D 7/12* | (2006.01) |
| *B62D 11/00* | (2006.01) |

(52) U.S. Cl.
CPC ............... *B62D 5/046* (2013.01); *B62D 3/02* (2013.01); *B62D 5/0418* (2013.01); *B62D 6/008* (2013.01); *B62D 7/12* (2013.01); *B62D 11/003* (2013.01); *B62D 11/04* (2013.01)

(58) Field of Classification Search
CPC ............................. B62D 5/046; B62D 5/0457
See application file for complete search history.

(56) References Cited

U.S. PATENT DOCUMENTS

| | | | |
|---|---|---|---|
| 4,651,018 A | 3/1987 | Peterson, Jr. | |
| 6,983,583 B2 | 1/2006 | Bucher | |
| 8,165,759 B2 | 4/2012 | Boylston et al. | |
| 8,740,229 B2 * | 6/2014 | Ellsworth | B62D 6/04 280/86 |
| 8,855,861 B2 * | 10/2014 | Goebel | B62D 11/003 701/41 |

(Continued)

*Primary Examiner* — Tony H Winner
(74) *Attorney, Agent, or Firm* — Neal, Gerber & Eisenberg LLP

(57) ABSTRACT

An electronic drive control system for a vehicle having a right and left drive wheels and a pair of actuators engaged to respective control arms of the associated variable drive units. A pair of speed sensors are in electrical communication with the respective variable drive units and a controller. The controller receives signals from the speed sensors and determines at least one operational output of each variable drive unit based on the received signals, calculates adjustments to at least one of the actuators and adjusts at least one of the actuators to move the respective control arm of the drive unit to effectuate the desired operational output of the variable drive units.

20 Claims, 53 Drawing Sheets

(56) References Cited

U.S. PATENT DOCUMENTS

| | | | |
|---|---|---|---|
| 9,538,706 B2* | 1/2017 | Haun | B62D 1/12 |
| 2005/0108999 A1* | 5/2005 | Bucher | A01D 75/28 |
| | | | 56/10.2 R |
| 2006/0272495 A1 | 12/2006 | Ohashi | |
| 2008/0277188 A1* | 11/2008 | Hauser | B62D 11/04 |
| | | | 180/422 |

* cited by examiner

ELECTRONIC DRIVE CONTROL SYSTEM FOR A ZERO TURN RADIUS VEHICLE

CROSS-REFERENCE

This application is a continuation of U.S. patent application Ser. No. 14/617,476, filed on Feb. 9, 2015, which is a continuation of U.S. patent application Ser. No. 12/179,226, filed on Jul. 24, 2008, which is a continuation-in-part of U.S. patent application Ser. No. 11/771,559, filed on Jun. 29, 2007, which claims the benefit of U.S. Provisional Patent Application No. 60/819,192, filed on Jul. 7, 2006, all of which are incorporated by reference herein in their entirety.

BACKGROUND OF THE INVENTION

This application is related to steering mechanisms for zero turn radius (ZT) vehicles. Such mechanisms have generally relied upon a pair of individual controls to control two individual transmissions or transaxles for steering. Steering has also been accomplished with a steering mechanism and mechanical linkages. However, these mechanisms are complex and present challenges, especially in the area of control.

ZT vehicles, such as riding mowers with independent front caster wheels, have been known to experience downhill drift during side-hill traverses requiring operators to exact disproportionate power outputs from the downhill transmission to maintain straight line tracking. Front wheel steering, in combination with the steering provided by the independent transmissions, has been known to improve side-hill performance in ZT vehicles but has often compromised the vehicle's zero-radius turn capability. Mechanical coordination of such front wheel steering with that provided by the independent action of the transmissions further increases the complexity of the steering linkages and the resultant control issues. The need exists for a simpler, more exacting front steering apparatus, one that delivers true zero-radius turn capability in coordination with that produced by the drive system of a ZT vehicle; an apparatus preferably packaged for ready integration by manufacturers of such vehicles, who, as a norm, purchase their drive system components.

SUMMARY OF THE INVENTION

The present invention comprises an electronic steering apparatus using electronics and control processes to operate a pair of continuously variable transmissions, such as hydrostatic transmissions. Electronic actuators receive signals from the electronics in accordance with the control processes to operate each transmission.

Another aspect of the present invention comprises a front steering module ("module") for use with a ZT vehicle incorporating an electronic steering apparatus, whereby the module provides both front wheel steering and corresponding control inputs for the electronic steering apparatus. The module, which includes a frame member, forms the vehicle's front end upon integration with the vehicle's subframe. Accordingly, manufacturers can mate a front end having true zero-radius turn capability to a ZT vehicle subassembly, the module being adapted to among other things cooperate with the electronic steering apparatus and magnify its advantages.

A further aspect of the present invention comprises a module for use with any ZT vehicle subassembly whose rear wheels are powered by independent, continuously variable transmissions. In this instance, the module further comprises a controller, a pair of electronic actuators, and various sensors and switches, essentially incorporating an electronic steering apparatus. This arrangement brings the benefit of coordinated front and drive wheel steering to a ZT vehicle with a degree of simplification unavailable to mechanical linkages.

A better understanding of the objects, advantages, features, properties and relationships of the invention will be obtained from the following detailed description and accompanying drawings which set forth illustrative embodiments and are indicative of the various ways in which the principles of the invention may be employed.

DETAILED DESCRIPTION OF THE DRAWINGS

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents. Some system components are identified by manufacturers' part numbers in order to improve teaching and understanding, but this is not to be construed as limiting any embodiment described herein to any specific manufacturer's product.

Figure 1:
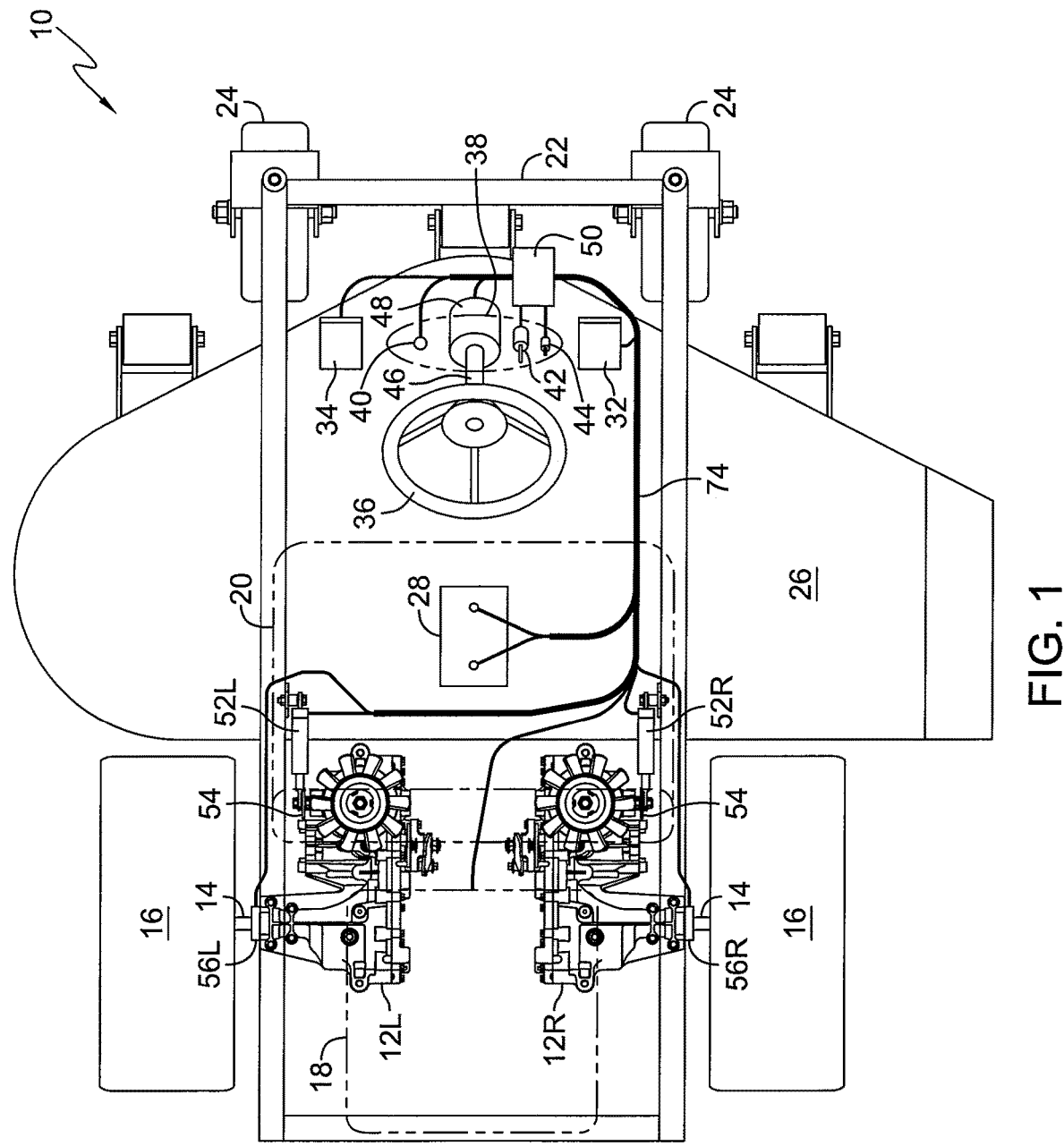
FIG. 1 is a top plan view of a vehicle incorporating an embodiment of a drive control system in accordance with the principles of the present invention.

FIGS. 1 through 11 illustrate a first embodiment of a drive control system 30 in accordance with the principles of the present invention. FIG. 1 shows a vehicle 10, which includes a prime mover 18, a seat 20, a frame 22, a set of pivotable front casters 24 and a mower deck 26. Vehicle 10 also includes a pair of transaxles or transmissions 12L and 12R that independently drive a pair of output shafts 14, which in turn, each drive one of a pair of wheels 16 that provide motion to vehicle 10. While the embodiments shown and described herein utilize hydrostatic transmissions, this invention is also applicable to other types of drive systems, such as, for example, hydraulic drive systems with a variable pump and/or motor, or mechanical drive systems such as continuously variable drive systems, continuously variable transmissions (CVTs), toroidal transmissions and the like. Accordingly, the terms "transmission" and "transaxle" are used herein for convenience and are not used to limit the present invention. Furthermore, although a mowing vehicle is shown in FIG. 1, the present invention can be applied to other vehicle types as well.

Figure 2:
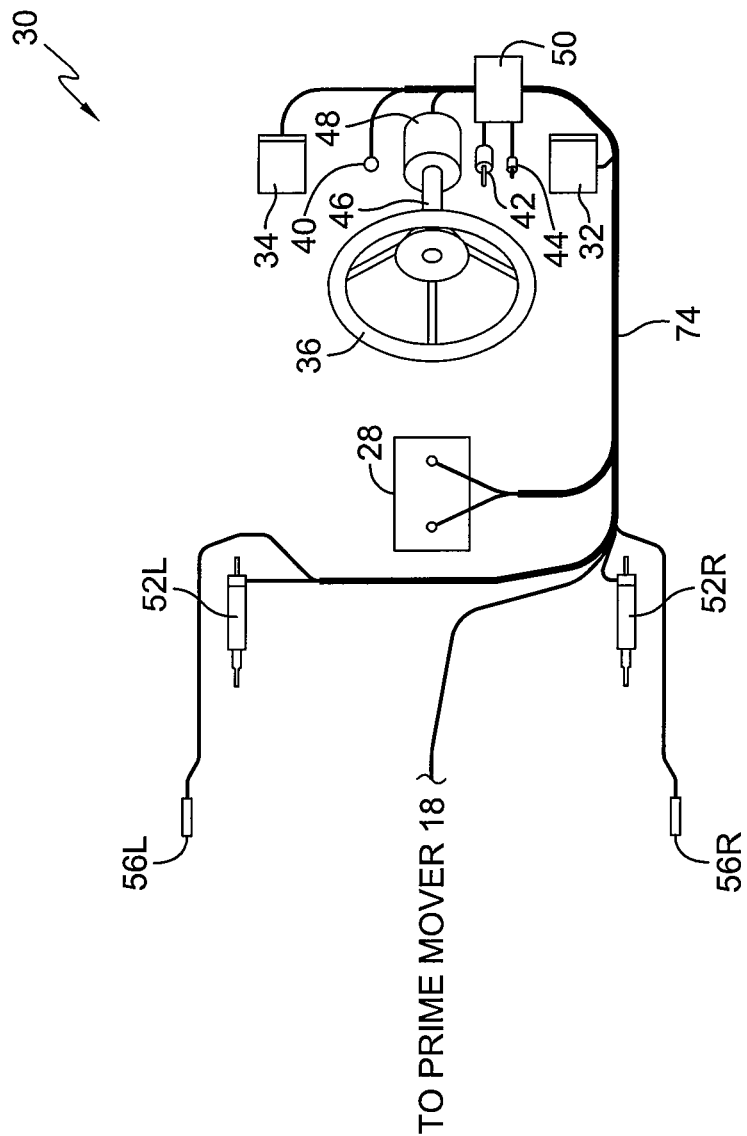
FIG. 2 is a view of the drive control system incorporated in the vehicle depicted in FIG. 1.
Figure 3:
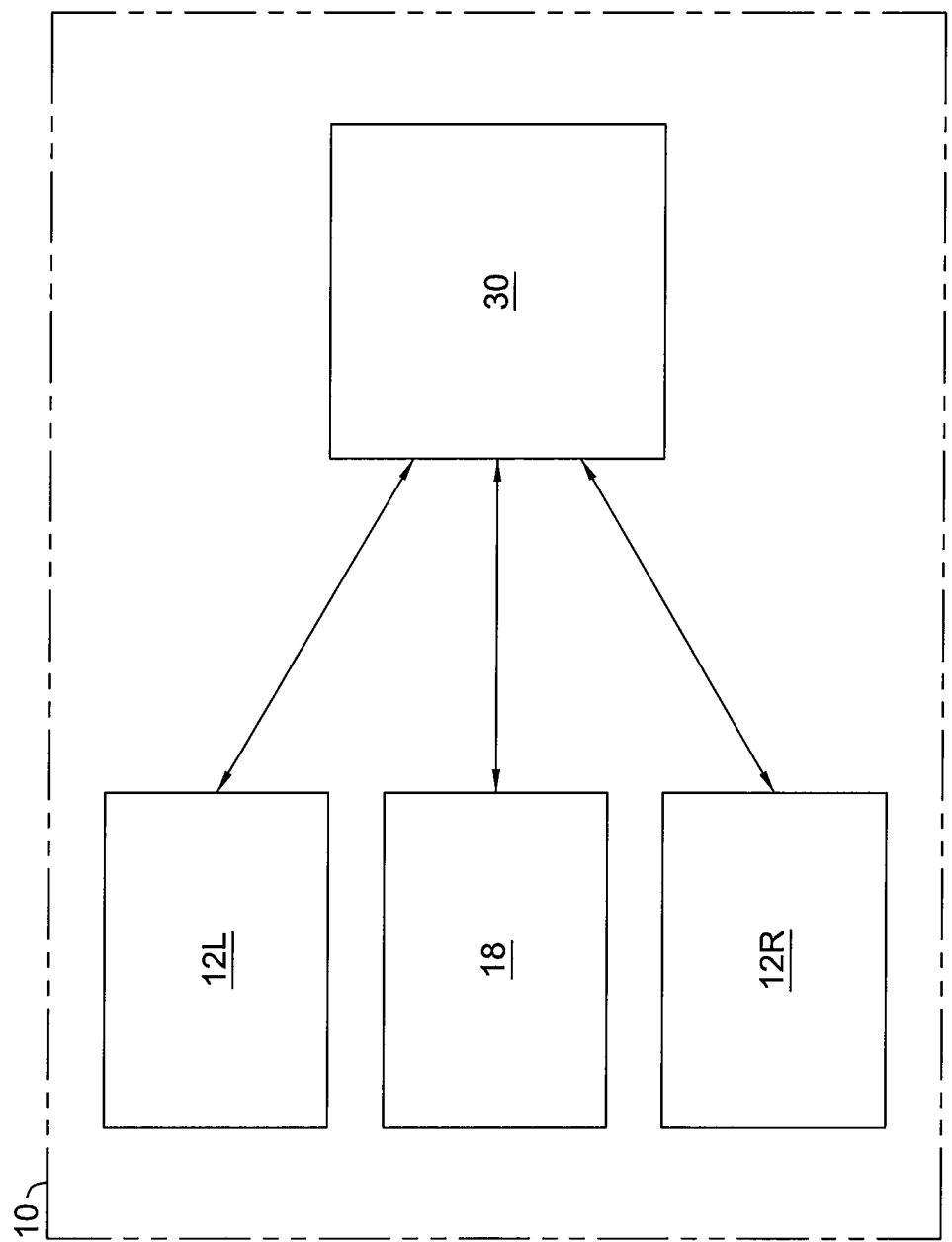
FIG. 3 is a block diagram of the vehicle depicted in FIG. 1 in accordance with the principles of the present invention.

Vehicle 10 also includes a plurality of systems to perform various functions, such as a drive control system 30, which is illustrated in FIG. 2. A general overview of the interaction between control system 30 and other portions of vehicle 10 is shown in the block diagram of FIG. 3. As shown in FIG. 3, drive control system 30 receives input from and controls transmission 12L and 12R and prime mover 18.

Referring to FIGS. 1 and 2, drive control system 30 may include a controller 50 that receives signals from, and sends signals to, various portions of drive control system 30. Drive control system 30 may include actuators 52L and 52R that are each respectively drivingly attached to a control arm 54 of each transmission 12L and 12R. External linear actuators 52L and 52R are shown, but rotary actuators, which are also known, may be substituted and drivingly attached to control arms 54. Optionally, internal actuators or electrically controlled proportional valves may be used in lieu of external actuators 52L and 52R. Each transmission 12L and 12R may be a configuration similar to that disclosed in U.S. Pat. No. 7,134,276, the terms of which are incorporated herein by reference. In the transmission disclosed in that patent, the transmission control arm is connected to a swash plate mechanism that is adjustable to control the direction and amount of fluid flow from a hydraulic pump to a hydraulic motor. This arrangement allows the speed of each transmission 12L and 12R to be adjustable by adjusting each individual actuator 52L and 52R. Accordingly, vehicle 10 may be steered and driven in a forward or reverse direction by varying the speed of each individual transmission 12L and 12R. A wiring harness or assembly 74 is connected to the various elements of drive control system 30 to electrically connect the various elements together. Wiring harness 74 may place wires together so that wires carrying signals are grouped together and wires carrying power and drive signals are grouped together.

As shown in FIGS. 1 and 2, a power system 28 is provided to operate some vehicle systems, including drive control system 30. In a particular embodiment, power system 28 is a battery. An accelerator pedal 32 or a foot or hand-operated control device establishes the direction and speed of operation of transmissions 12L and 12R. A brake pedal 34 actuates a brake system located either as part of transmissions 12L and 12R or as a separate device. In a particular embodiment, steering wheel 36 facilitates steering of vehicle 10. In a particular embodiment, steering wheel 36 includes a steering column 46 that mates with a steering position sensor 48. An equivalent hand or foot-operated steering device may be used in lieu of steering wheel 36 and steering column 46. In a particular embodiment, a vehicle dash 38 or an equivalent includes an LED or indicator light 40 of drive control system 30, a vehicle ignition switch 42, and a power take-off switch 44.

Figure 4:
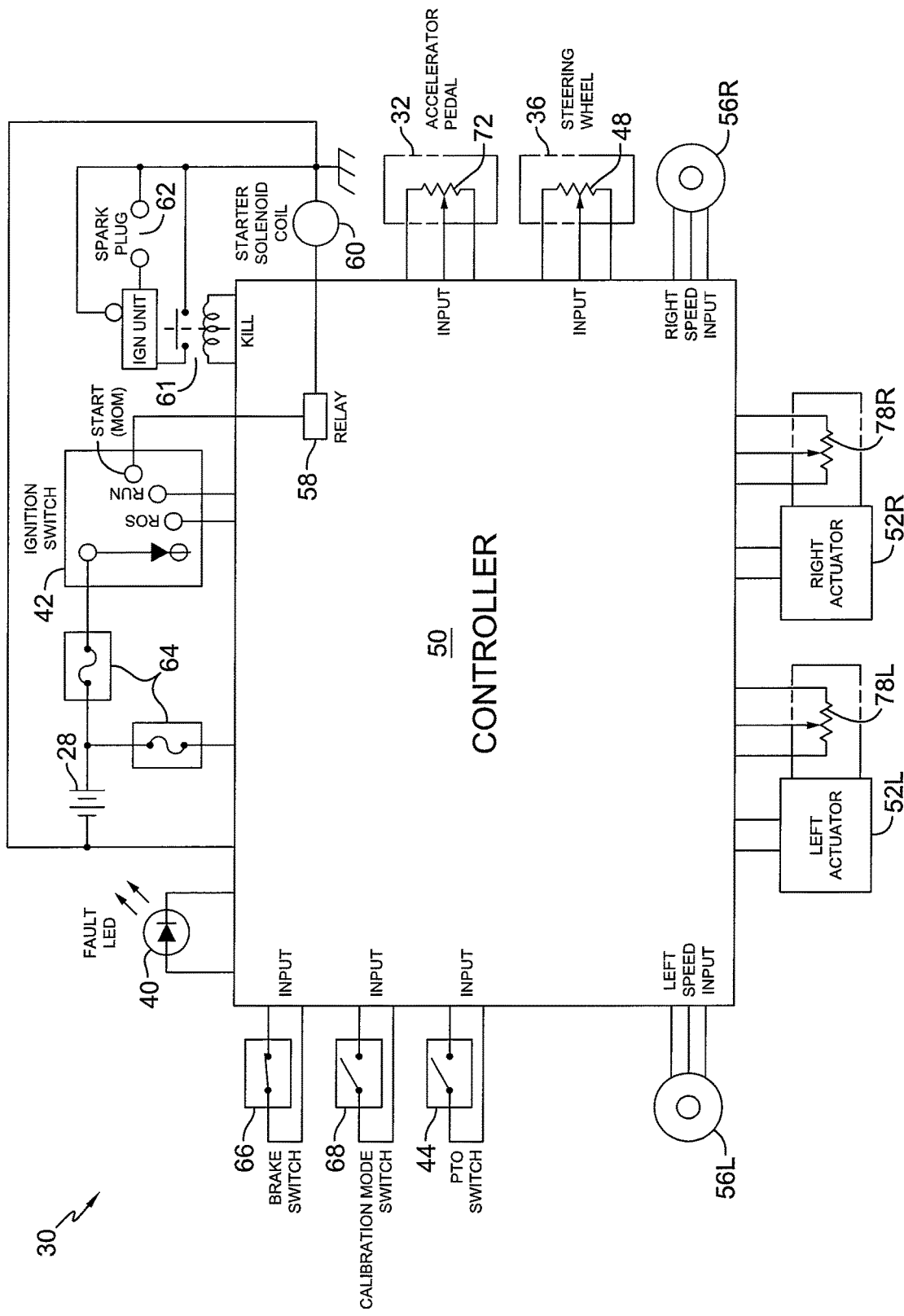
FIG. 4 is a block diagram of certain portions of the drive control system of the vehicle shown in FIG. 1.
Figure 5:
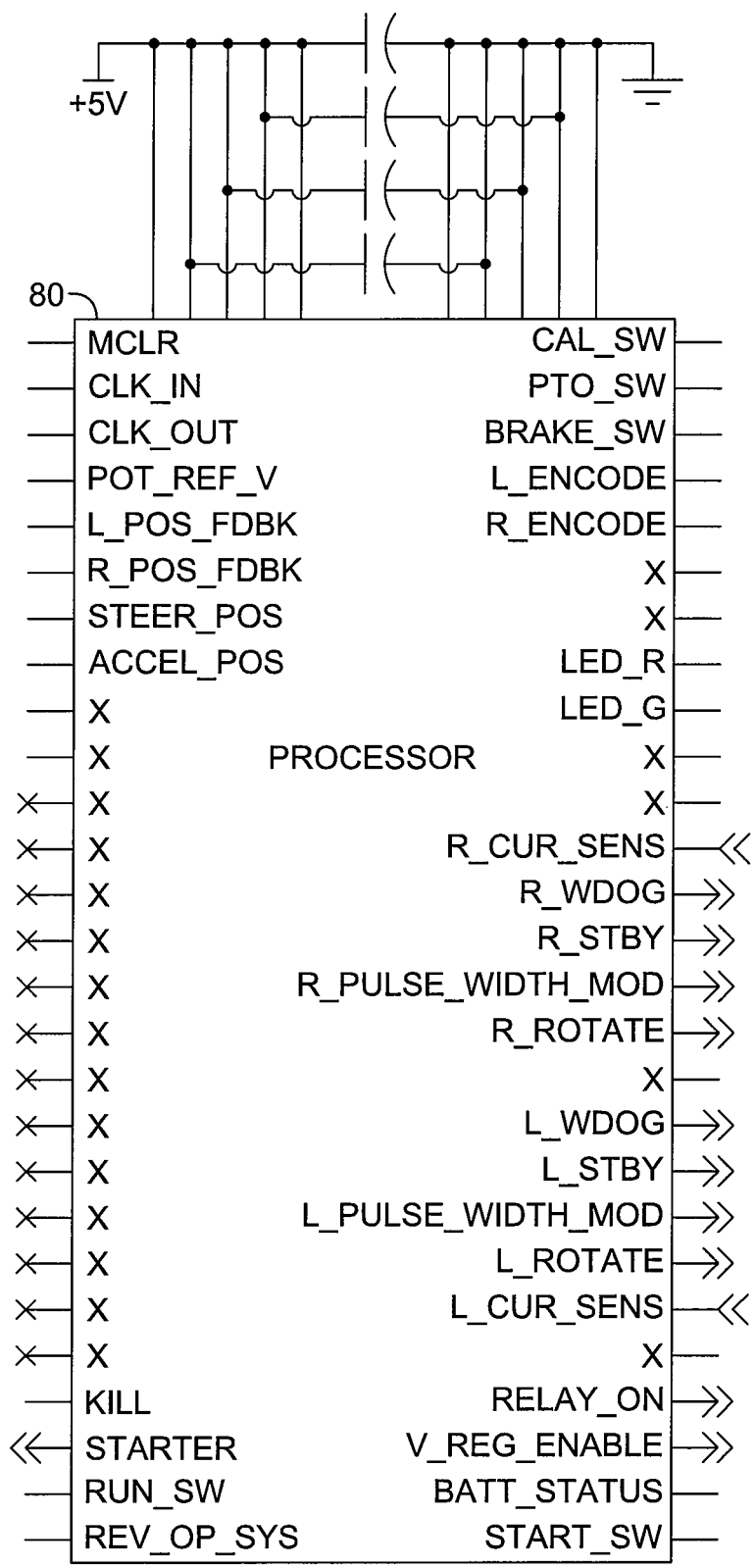
FIG. 5 is a schematic of a processor of the drive control system showing inputs to and outputs from the processor.

The block diagram shown in FIG. 4 illustrates an embodiment of drive control system 30 in more detail. Note that the following description describes a representative array of elements. Some of these elements may be optional for a particular embodiment. In other embodiments additional elements may be desirable. For example, a left speed sensor 56L and a right speed sensor 56R may be unnecessary in some applications. In another example, additional sensors may be desired to improve operator satisfaction. Such sensors may include thermocouples, proximity aids, and other devices relevant to the operation of a typical vehicle.

Controller 50 controls three general categories of functionality: (1) starting and running vehicle 10, (2) operational parameters or constraints for drive control system 30, and (3) adjustment of actuators 52L and 52R. Each of these general categories is discussed below.

There are several control aspects related to starting and running vehicle 10. Because vehicle 10 is steered, accelerated and decelerated electrically, a diagnostic routine is performed on the electronics prior to permitting vehicle 10 to be started. Referring again to FIG. 4, controller 50 performs an array of diagnostics when ignition switch 42 is rotated to the start position. Once diagnostics have successfully been completed, a relay 58 permits actuation of a starter solenoid 60. An additional relay 61 is in communication with the ignition unit and serves to shut down prime mover 18 under certain conditions. As will be noted in more detail later, controller 50 continuously monitors a variety of conditions and has the ability to shut down prime mover 18 by grounding spark plug 62. Once prime mover 18 has been started, the operator releases ignition switch 42 and ignition switch 42 moves to the run position. In a particular embodiment, ignition switch 42 also includes an ROS position. In the ROS position, a reverse operating system, which would normally stop the blades of deck 26 when vehicle 10 operates in reverse, may be bypassed to permit operation of the mower blades when vehicle 10 is operated in reverse. Power source 28 is utilized to provide starting power to vehicle 10. A related set of fuses or circuit breakers 64 may be provided to protect drive control system 30 from a power surge or a ground fault.

Controller 50 also receives signals that relate to the operation of vehicle 10. Referring to FIGS. 2 and 4, brake pedal 34 may actuate a brake switch 66 to signal to controller 50 that brake pedal 34 has been actuated. An optional calibration mode switch 68 may be provided that permits portions of controller 50 to be reprogrammed. Actuation of the cutting blades of mower deck 26 may also actuate a power take-off switch 44, which signals to controller 50 that the blades have been powered. Other signals may be desirable to permit controller 50 to provide for safe and effective operation of vehicle 10. For example, it is envisioned that some vehicles may find an inclinometer to be desirable to advise an operator of a potentially unsafe operating condition. In a particular embodiment, controller 50 may provide an indication of the operating condition of drive control system 30 by way of an indicator such as LED or indicator light 40. Optionally, text or graphical symbols indicating the operating condition of drive control system 30 may be displayed on an LCD screen (not shown) or other display device.

The remaining control aspects of controller 50 relate to operation of left actuator 52L and right actuator 52R. Referring again to FIGS. 2 and 4, accelerator pedal 32 actuates a sensor 72 that informs controller 50 of an operator-directed vehicle acceleration or deceleration in either the forward or reverse direction. In a particular embodiment, sensor 72 may be a potentiometer, Hall Effect sensor, or other device that can sense or signal a change in acceleration or position. Steering wheel 36 actuates a sensor 48 that informs controller 50 of an operator directed vehicle turn. In a particular embodiment, sensor 48 may be a potentiometer, Hall Effect sensor, or other device that can sense or signal a change in position of steering wheel 36. Each actuator 52R and 52L may respectively include a sensor 78L or 78R, such as a feedback potentiometer, Hall Effect sensor, or other type sensor capable of providing positional information. Each feedback potentiometer 78L and 78R provides information to controller 50 regarding the respective position of left actuator 52L and right actuator 52R.

Each axle shaft 14 may optionally have a respective speed sensor 56L and 56R associated with it. Speed sensors may be used for several purposes, such as, for example, a method for determining the neutral position, or neutral state, of transmissions 12L and 12R (sometimes referred to as "neutral."). The neutral position of transmissions 12L and 12R may be defined in terms of a position of each control arm 54 of each transmission 12L and 12R that does not cause movement of axle shafts 14. If speed sensors 56L and 56R do not detect any movement of axle shafts 14, control arms 54 are presumed to be in the "neutral" position, and hence, transmissions 12L and 12R are presumed to be in the neutral position. Speed sensors 56L and 56R therefore would, among other things, enhance the ability to establish the non-rotating condition of axle shafts 14, thereby further defining the neutral position. This type of closed-loop system may also be used to govern vehicle speed more accurately and compensate for hydraulic system losses or inefficiencies.

Throughout the following discussion reference will be made to a microprocessor or processor 80, which, in a particular embodiment, is part of controller 50. Processor 80, as configured for the first embodiment disclosed herein, is shown schematically in FIG. 5. In a particular embodiment, processor 80 is a PIC18F6620 microcontroller manufactured by Microchip Technology Incorporated. However, many other types of processors, programmable logic controllers (PLCs), or the like could be utilized in accordance with the principles of the present invention. For purposes of simplicity, some of the drawings described herein may illustrate only the portion of the processor being described in connection with a particular drawing, with the understanding that the processor may appear as illustrated schematically in FIG. 5.

Drive control system 30 will now be described in more detail.

Figure 6:
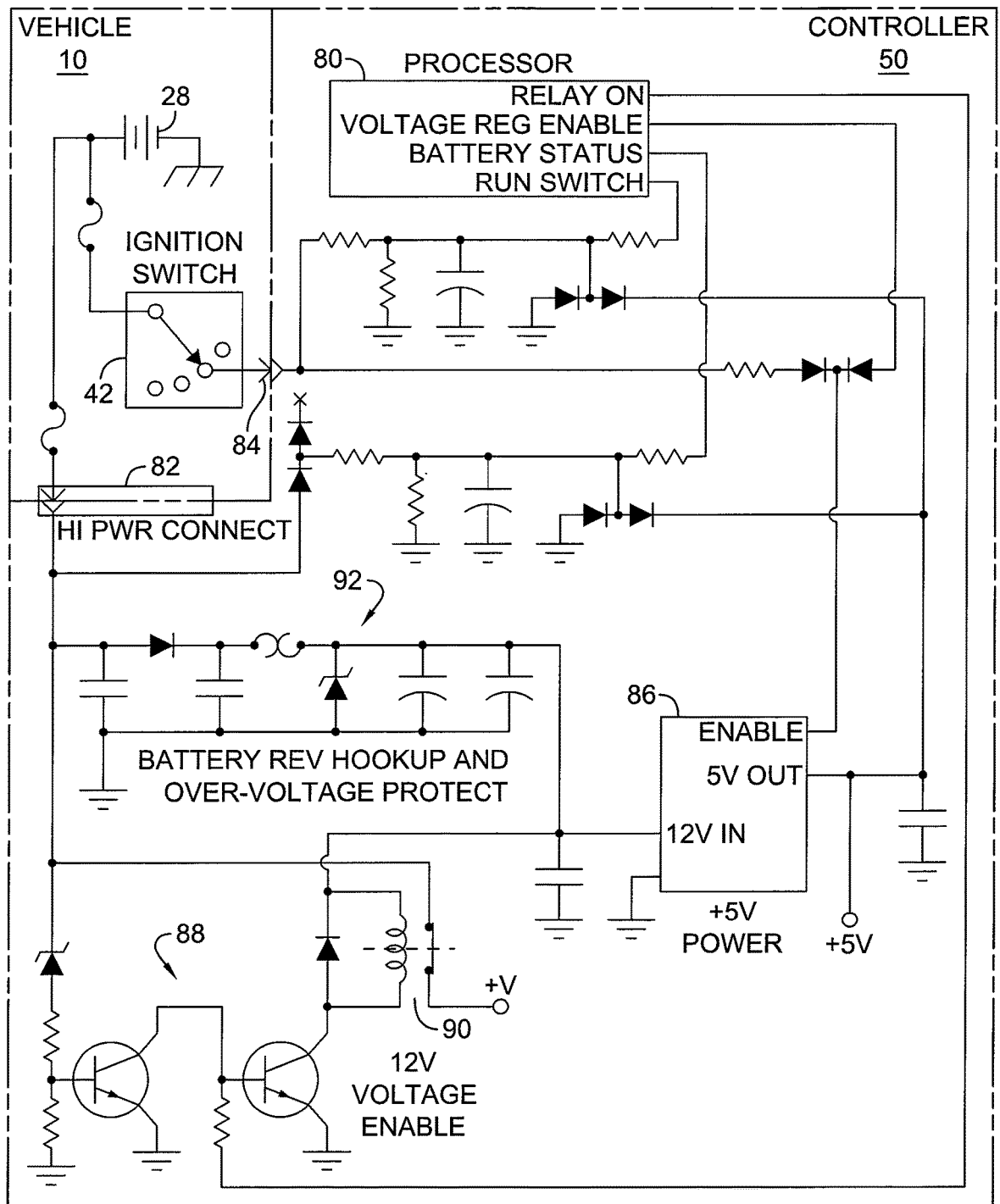
FIG. 6 is a schematic of one portion of the drive control system showing the power supply with the ignition switch in the run position.

Referring to FIG. 6, the power supplies and run circuit for drive control system 30 are illustrated. Power is connected from a voltage source, which is shown in this embodiment as battery 28, through a power connector 82 to controller 50. Battery 28 provides 12V power for use by components of drive control system 30, including a +5V power supply 86 and a 12V voltage enable relay 90. In a particular embodiment, power supply 86 is an LD29150PT50 voltage regulator manufactured by STMicroelectronics. Power supply 86 can take other forms that are known in the art. A reverse-battery-hookup and over-voltage protection circuit 92 is in electrical communication with battery 28, power supply 86 and relay 90 to protect drive control system 30 from reverse polarity and excessive voltage conditions. Power supply 86 is also in electrical communication with a signal connector 84, which is in electrical communication with ignition switch 42. +5V power supply 86 is enabled through connector 84 when ignition switch 42 is in the run position. With ignition switch 42 in the run position and with the presence of +5V power from power supply 86, processor 80 provides a signal through an amplifier 88 to 12V enable relay 90 to activate it. Once 12V enable relay 90 has been activated, unfiltered 12V power from battery 28 is provided for use at various locations in drive control system 30.

In this particular embodiment, the operating voltage of drive control system 30 is maintained until actuators 52L and 52R are returned to the neutral position. As such, power supply 86 must remain enabled to accomplish the return-to-neutral even when ignition switch 42 is switched to another position. Thus, a voltage regulator enable signal is also provided by +5V power supply 86 until processor 80 determines that it is safe to permit removal of voltage from drive control system 30, at which time the voltage regulator enable signal would be removed and power supply 86 would be disabled. Processor 80 would then remove the signal from amplifier 88, disconnecting unfiltered 12V power from drive control system 30.

Figure 7:
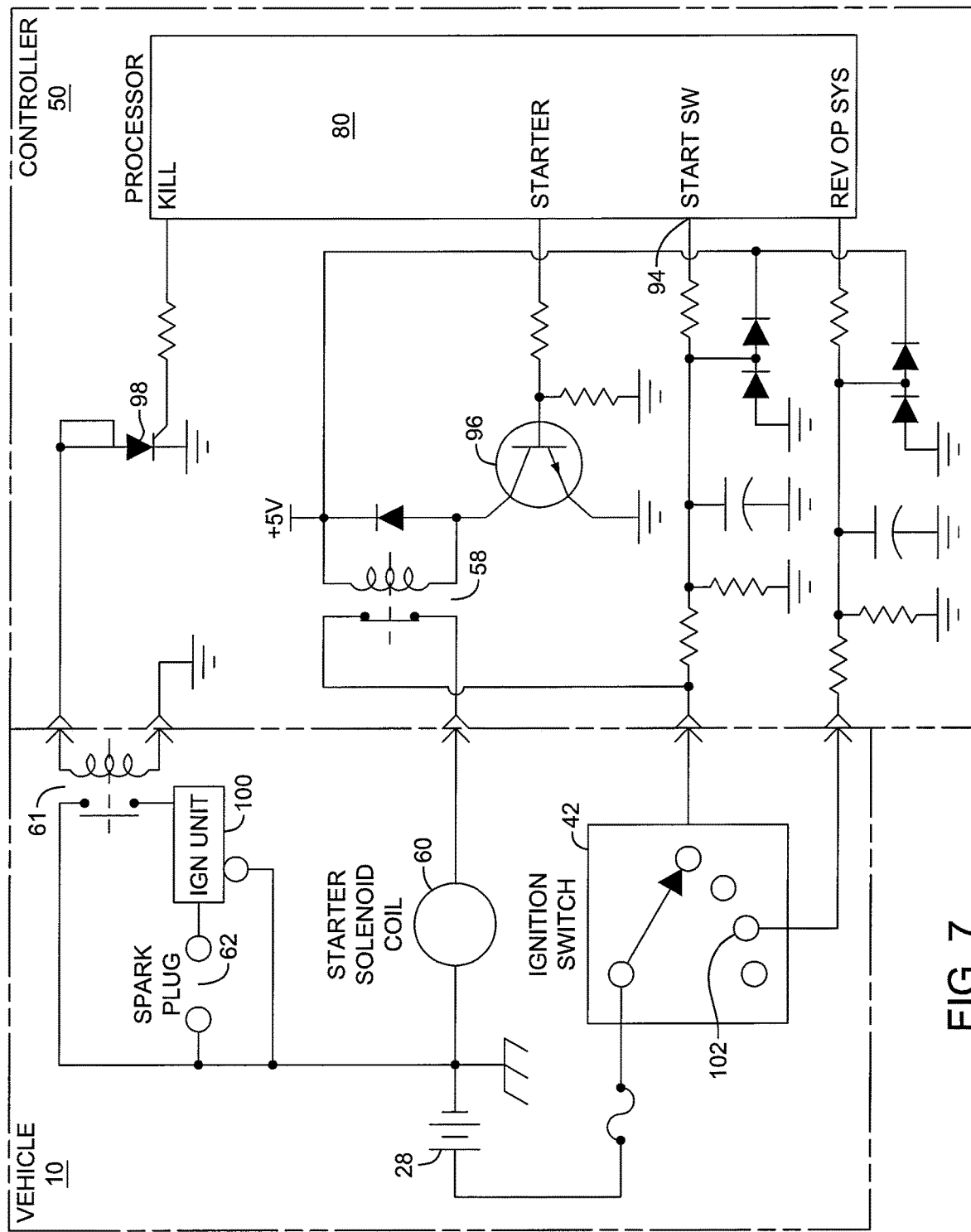
FIG. 7 is a schematic of one portion of the drive control system showing the vehicle start circuit along with certain other drive control system features.
Figure 8:
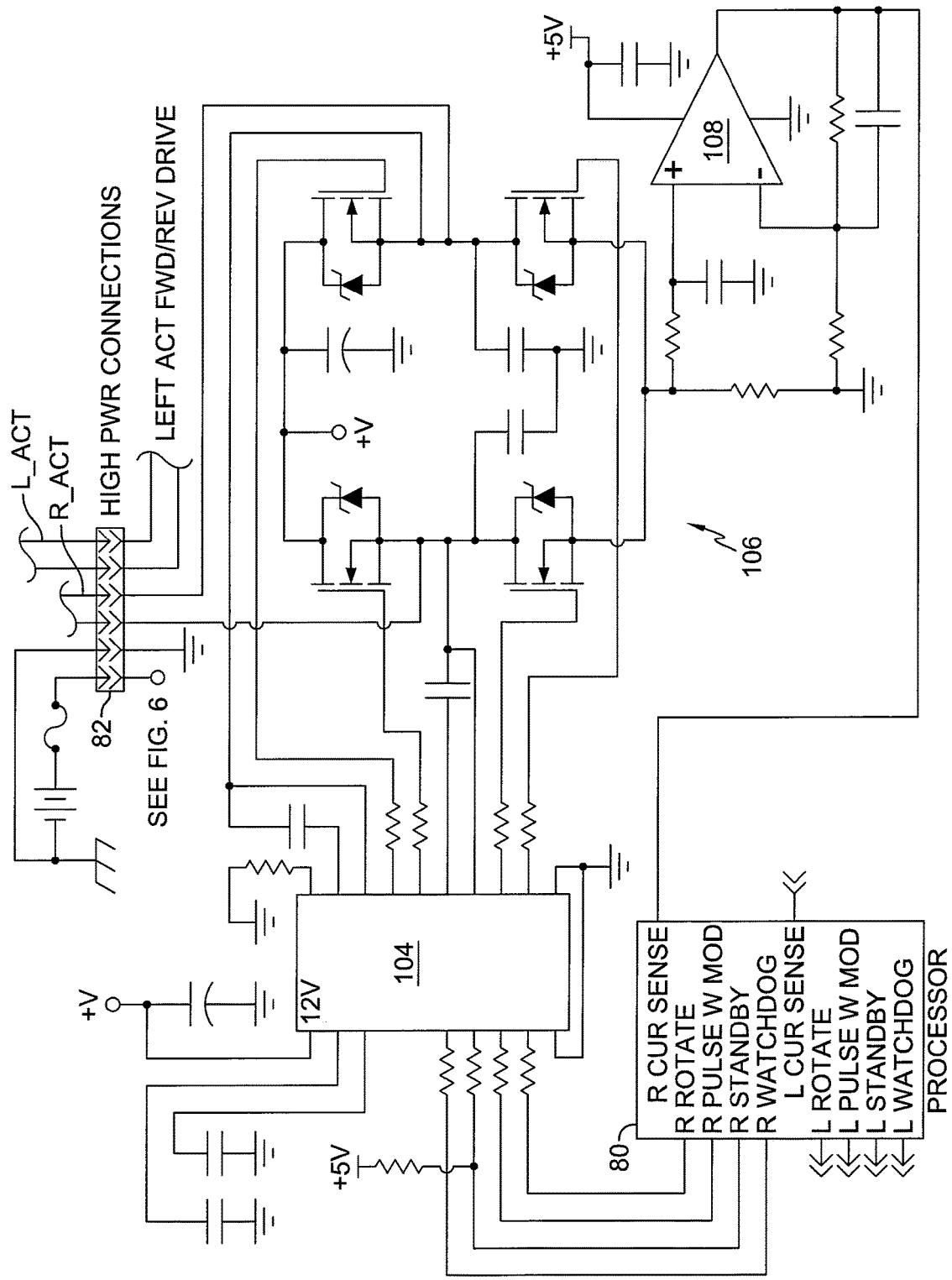
FIG. 8 is a schematic of one portion of the drive control system showing the drive circuits for one transaxle actuator.

Turning now to FIG. 7, the start, kill and reverse operating system functions are illustrated. When ignition switch 42 is placed in the start position, as shown in FIG. 7, voltage from battery 28 is provided to start switch input 94 of processor 80 as well as to relay 58. Processor 80 may perform a variety of functions prior to causing actuation of relay 58 (these functions will be described in more detail below). Processor 80 actuates relay 58 by sending a signal to a transistor 96, which then causes actuation of relay 58. Relay 58 is shown in an actuated state in FIG. 7. When relay 58 is actuated, it completes a voltage path to starter solenoid 60, which in turn permits vehicle 10 to be started.

Referring again to FIG. 7, processor 80 may provide a biasing voltage to a diode 98 that allows diode 98 to turn on and energize relay 61, which causes grounding of the signal from an ignition unit 100 should processor 80 determine that vehicle 10 has attained an impermissible operating condition. Grounding the signal from ignition unit 100 prevents spark plug 62 located in prime mover 18 from firing and thereby halts operation of prime mover 18. Thus, processor 80 has the ability to stop or "kill" operation of prime mover 18.

Ignition switch 42 may be rotated to a reverse operating system (ROS) contact position 102 as shown in FIG. 7. In this position, a signal is sent to processor 80 that indicates an operator desires mower deck 26 to keep operating even when vehicle 10 is operating or moving in a reverse direction. Many mowing vehicles have one of two types of systems to prevent mower deck 26 operation in reverse. One type of system involves removing power to an electric clutch in response to a reverse operation condition, which thus causes mower deck 26 to cease operation. The other type of system causes prime mover 18 to cease operation. Contact position 102 of ignition switch 42 enables drive control system 30 to allow operation of mower deck 26 or prime mover 18 during reverse movement or operation of vehicle 10. Additionally, reverse operating system contact position 102 could be used to enable other devices, such as a visual or audible alarm, proximity sensors for obstacle detection, a video display, etc., either individually or in combination.

As previously noted, drive control system 30 provides power to actuators 52L and 52R. The power for each actuator 52L and 52R is provided through a circuit like that shown in FIG. 8, which illustrates the power circuit for right actuator 52R. Processor 80 determines the length of time and direction that each actuator 52L and 52R is required to move based on signals from a variety of sources, as will be explained in more detail below. Processor 80 provides signals to an H-bridge MOSFET driver 104, which, in a particular embodiment, is a TD340 H-bridge quad power MOSFET driver supplied by STMicroelectronics. MOSFET driver 104 then provides drive signals as directed by processor 80 to a MOSFET H-bridge 106. Note that the functions of the H-bridge could be accomplished by other designs, such as, for example, a half H-bridge configuration. The output from MOSFET H-bridge 106 is directed through power connector 82 to actuator 52R. A current sense op-amp 108 is also provided, which, in a particular embodiment, is an LMV321 operational amplifier supplied by National Semiconductor. The output of op-amp 108 is provided to processor 80 to enable processor 80 to determine that MOSFET H-bridge 106 is operating properly.

Figure 9:
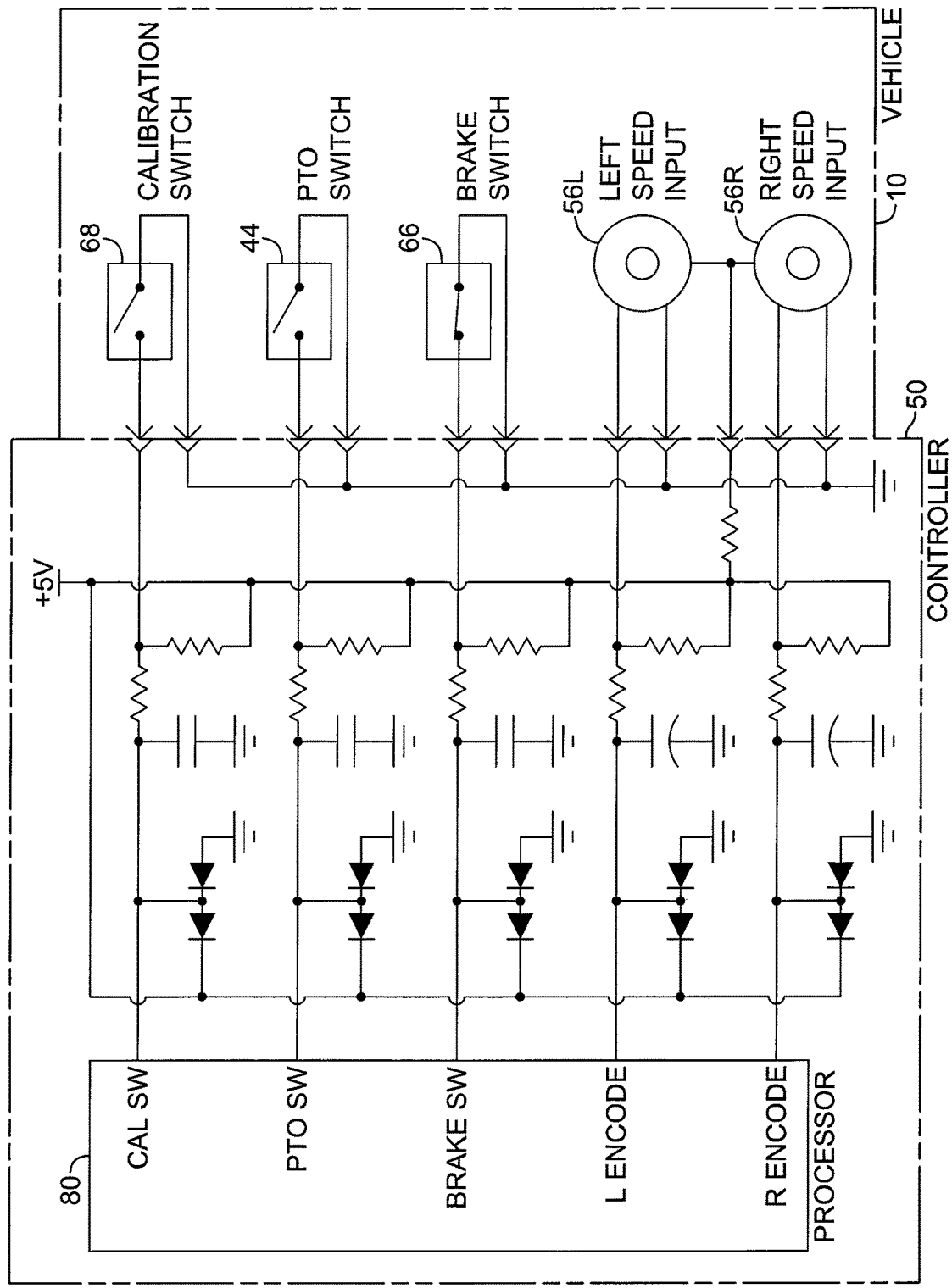
FIG. 9 is a schematic of one portion of the drive control system showing some sensor inputs to the drive control system processor.

FIG. 9 illustrates some of the various inputs that may be connected to processor 80. Processor 80 is in electrical communication with brake switch 66, which is activated by brake pedal 34. Brake switch 66 may be located such that actuation of brake pedal 34 or other similar brake actuating device causes switch 66 to be actuated. In a particular embodiment, brake switch 66 is located on transmissions 12L and 12R or is part of the brake linkage connected to brake pedal 34.

Referring to FIG. 9, processor 80 is in electrical communication with power take-off switch 44 in order to govern power to an auxiliary device such as the blades of mower deck 26. When an actuating handle or switch for the blades of mower deck 26 is engaged, power take-off switch 44 may be actuated to inform processor 80 of such engagement. Actuation of power take-off switch 44 may also be a part of an optional reverse operating system and may work in conjunction with a position of ignition switch 42 to allow the blades of mower deck 26 to continue to operate even when vehicle 10 is operated in the reverse direction.

Referring again to FIG. 9, in this embodiment, processor 80 is also in electrical communication with calibration switch 68, which permits reprogramming of processor 80. Optional speed sensors 56L and 56R are available to provide speed information for each axle shaft 14.

Figure 10:
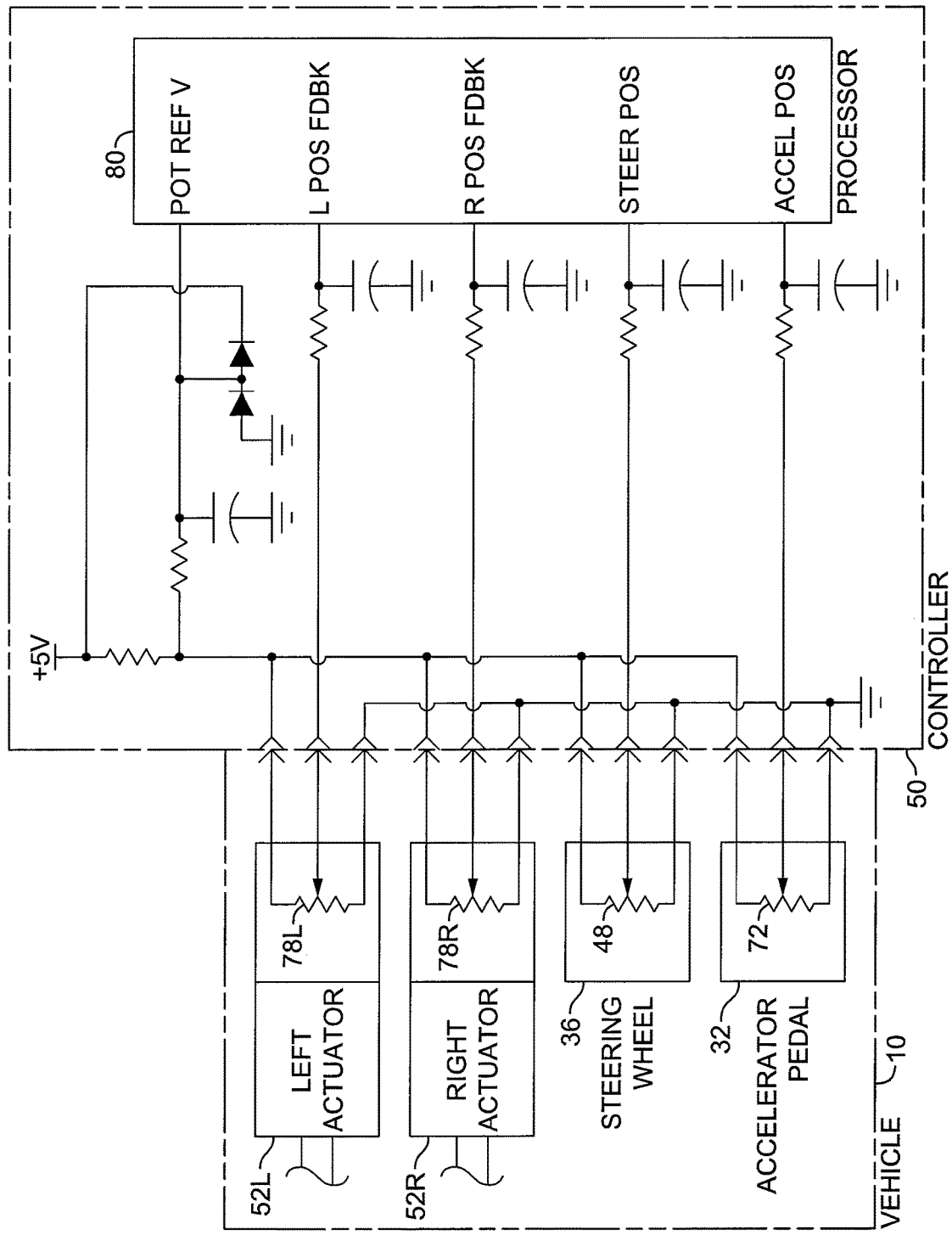
FIG. 10 is a schematic of one portion of the drive control system showing some sensor inputs to the drive control system processor.

FIG. 10 illustrates inputs to processor 80 that are directly involved in the movement of actuators 52L and 52R. Accelerator pedal 32 is associated with a sensor in the form of potentiometer 72 that provides information to processor 80 regarding the desired direction and speed of vehicle 10. Steering wheel 36 is associated with steering position sensor 48 that provides information related to the direction and desired amount of steering to processor 80. Each actuator 52L and 52R is respectively associated with actuator feedback potentiometers 78L and 78R, which provide feedback to processor 80 so that processor 80 is able to determine when each actuator 52L and 52R has reached its expected position.

Figure 11:
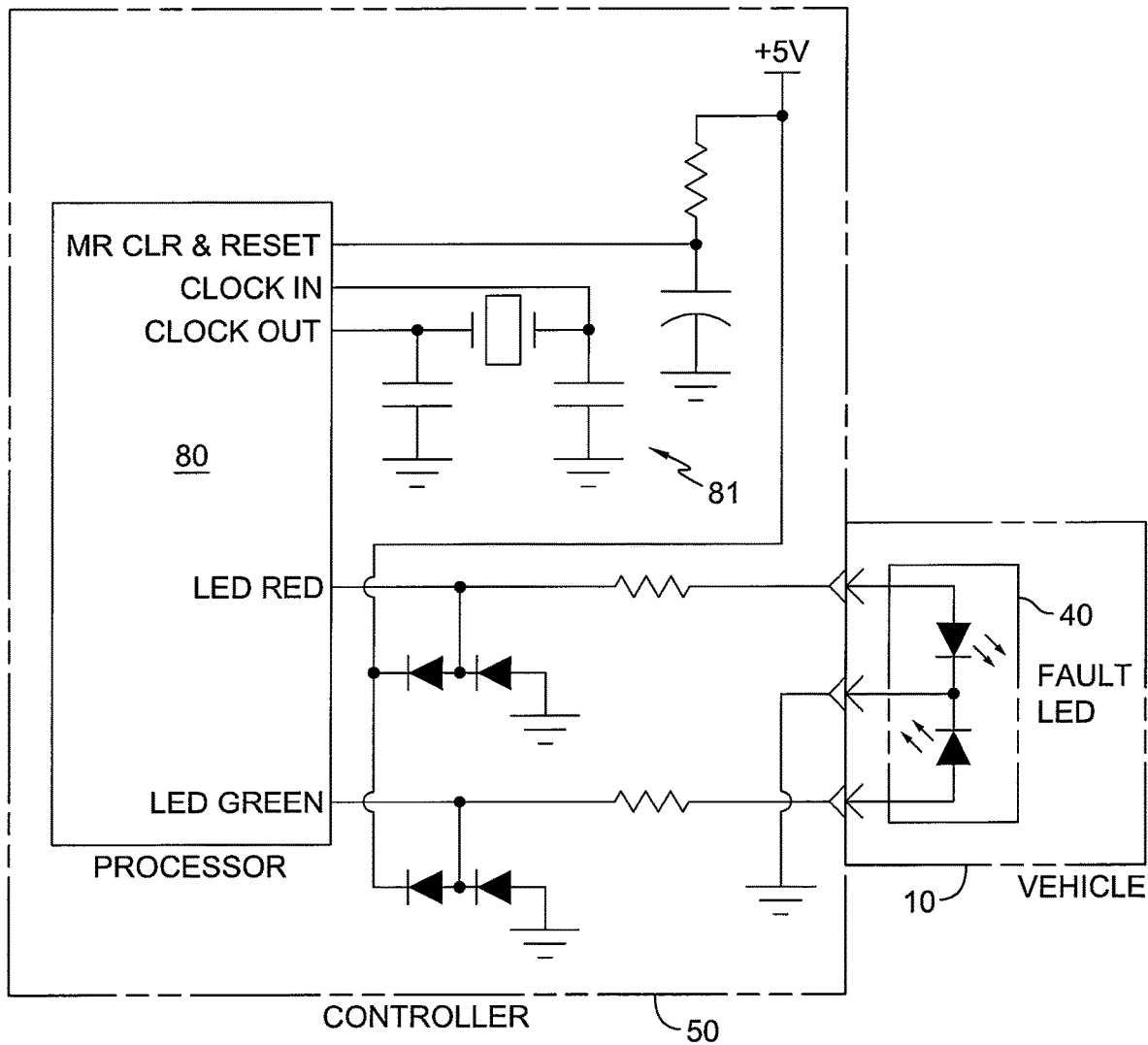
FIG. 11 is a schematic of one portion of the drive control system showing an optional processor clock and the outputs to an indicator light.

FIG. 11 illustrates an optional external clock 81 that controls the processing speed of processor 80. Processor 80 has an internal clock, but processor 80 is capable of higher processing speeds by using external clock 81. Use of external clock 81 may be desirable in some circumstances where a particular vehicle requires a faster than usual response in order to maintain end user satisfaction. Also shown in FIG. 11 is the connection between processor 80 and indicator light or LED 40. Indicator light 40 may have colored output such as red and green to indicate the status of drive control system 30.

In accordance with the principles of the present invention, drive control system 30 utilizes a number of methods and control routines to provide control functionality. In a particular embodiment, the control functions and methods of drive control system 30 are implemented by software in conjunction with processor 80. FIGS. 12 through 24 illustrate flow charts that describe embodiments of control functions and methods in accordance with the principles of the present invention that are preferably implemented in connection with the first embodiment of drive control system 30, but can also be implemented with other embodiments and other control systems as well. FIGS. 12 through 24 utilize various acronyms in order to keep the size of the flow charts and the flow chart labels reasonable. The terminology used in the flow charts is set forth in full form throughout the following description, though the acronym may be used interchangeably with the full form of a particular term.

Figure 12:
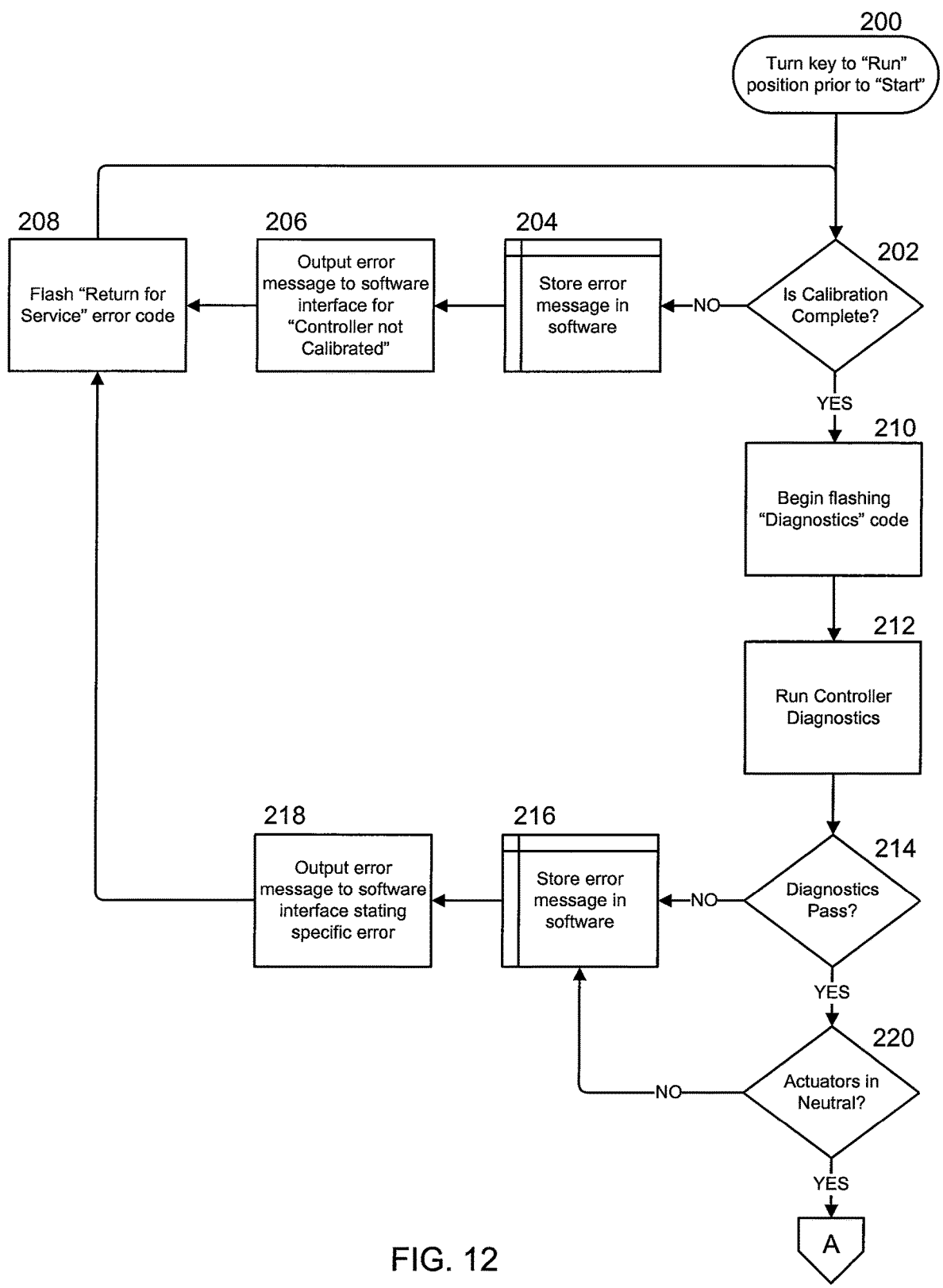
FIG. 12 is a flow chart of a control process of the drive control system, showing representative diagnostics performed prior to allowing the vehicle to be started.

In a particular embodiment, when a vehicle operator turns ignition switch 42 from its off position to the run position, drive control system 30 begins to perform a series of diagnostics and tests. Prime mover 18 is not permitted to operate until diagnostics and tests are complete. As shown in FIG. 12, step 200 denotes movement of ignition switch 42 from the off position to the run position, which is the position of ignition switch 42 as shown in FIG. 6. Once processor 80 recognizes that ignition switch 42 has been moved to the run position, processor 80 checks to determine whether drive control system 30 has been properly calibrated at step 202.

Calibration of drive control system 30 includes establishing the limits of travel and the neutral position of actuators 52L and 52R, and in a particular embodiment is performed as a part of manufacturing or servicing of drive control system 30. Since this process occurs only during assembly and maintenance of drive control system 30, it is not illustrated in the attached figures. As part of the calibration process, processor 80 may check to determine whether the limits of travel and neutral position of actuators 52L and 52R are within expected limits. If the limits of travel and neutral position of actuators 52L and 52R exceed the limits anticipated by processor 80, then processor 80 may return an error code either through a programming interface (not shown) or through indicator light 40. Once drive control system 30 has been calibrated, a soft switch is actuated and stored in processor 80's memory that denotes calibration is complete.

If the soft switch indicates that calibration of drive system 30 has not been accomplished, then an error message is stored at step 204. At step 206, an error message is output to an interface to indicate that the controller is not calibrated. In a particular embodiment, the error message may be read using appropriate diagnostic equipment connected to the software interface of drive system 30 (not shown). At step 208, indicator light 40 flashes in response to a signal that denotes that vehicle 10 needs to be returned to a qualified dealer for service. At this point vehicle 10 is inoperable, and an operator's only choice will be to return ignition switch 42 to the off position. However, it should be noted that this path of steps is available only in the unlikely event that the manufacturer installing drive control system 30 has failed to perform the proper calibration procedure.

At step 210, if the calibration-completed soft switch has been set, indicator light 40 flashes a code denoting the diagnostics mode of drive control system 30. At step 212, diagnostics of controller 50 are performed to verify that controller 50 is operating properly. As part of the diagnostics of controller 50, the position of each actuator 52L and 52R is determined. If actuators 52L and 52R are not in neutral, controller 50 attempts to drive actuators 52L and 52R into neutral. Once the diagnostics of controller 50 are complete, the status of the diagnostics is determined at step 214. If the diagnostics failed, an error message is stored at step 216. The error message is output to an interface, such as a software interface, indicating or stating the specific error at step 218. Indicator light 40 flashes to denote that vehicle 10 needs to be returned to a qualified dealer for service.

If drive control system 30 passes its diagnostic tests, drive control system 30 determines whether actuators 52L and 52R are in the neutral position at step 220. If actuators 52L and 52R are not in the neutral position and if drive control system 30 is unable to return actuators 52L and 52R to the neutral position, an error message is stored at step 216. The error message is output to an interface stating the specific error at step 218. Indicator light 40 flashes to denote that vehicle 10 needs to be returned to a qualified dealer for service.

Figure 13:
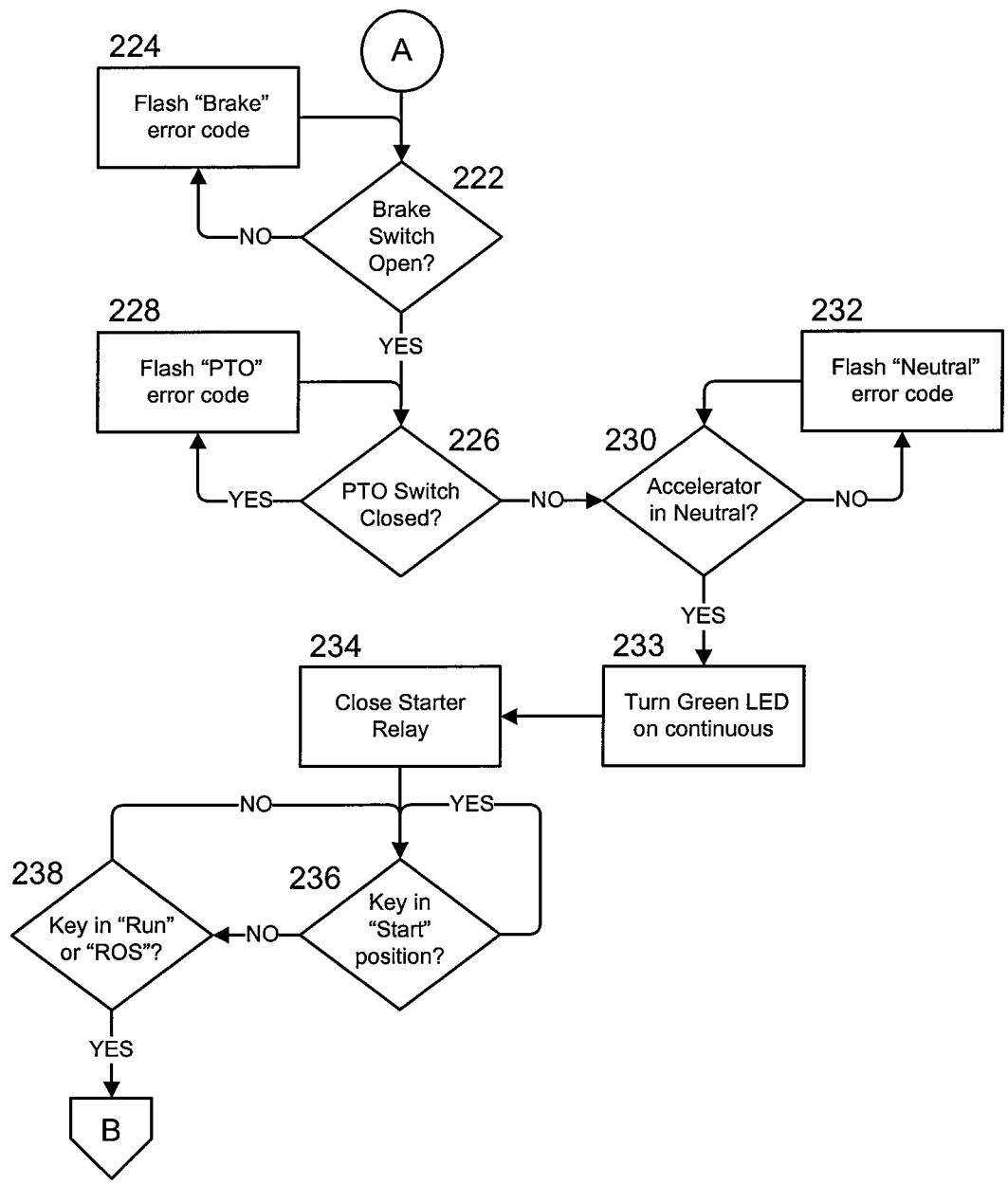
FIG. 13 is a flow chart of a control process of the drive control system, showing further representative diagnostics performed prior to allowing the vehicle to be started as well as enabling of the starter.

If actuators 52L and 52R are in the neutral position, determination of the status of brake switch 66 is made at step 222 shown in FIG. 13. If brake switch 66 is closed, indicator light 40 flashes in a pattern to indicate that the brake pedal 34 needs to be actuated prior to starting at step 224. If brake switch 66 is open, which indicates that brake pedal 34 of vehicle 10 has been actuated, then the status of power take-off switch 44 is checked at step 226. If power take-off switch 44 is closed, which indicates that the mechanism that controls the blades of mower deck 26 has been actuated, then, at step 228, indicator light 40 flashes in a pattern to indicate that power take-off switch 44 needs to be deactivated.

If power take-off switch 44 is open, it is then determined at step 230 whether the accelerator is in the neutral position. The sensors or switches involved in this step may be located as a part of accelerator pedal 32 or its equivalent, actuators 52L and 52R, control arms 54, or other portions of vehicle 10 that are associated with changing the output of transmissions 12L and 12R. At step 232, if transmissions 12L and 12R are not in the neutral position, indicator light 40 flashes in a pattern to indicate that vehicle 10 is not in neutral. Control then returns to step 230. This loop continues until vehicle 10 is returned to neutral or until ignition switch 42 is returned to the off condition.

If accelerator pedal 32 or a feature associated with accelerator pedal 32 is in neutral, a signal is sent to indicator light 40 to cause indicator light 40 to light with a color in accordance with step 233. In a particular embodiment, the color of indicator light 40 at step 233 is green. Now that drive control system 30 has determined that it is safe for vehicle 10 to be operated, drive control system 30 permits starter relay 58 to be actuated at step 234, which then enables starter solenoid 60 to operate when an operator moves ignition switch 42 to the start position. Starter solenoid 60 then causes prime mover 18 to operate, assuming that prime mover 18 is in a condition to be operable (i.e., contains fuel, oil, is mechanically sound, etc.). Under typical circumstances, an operator will release ignition switch 42, which is spring loaded to return to the run position. At step 236, a check is performed to determine whether the operator has released ignition switch 42 to the run position. At step 238, if ignition switch 42 is not in either the run or ROS position, then control returns to step 236. This check remains in a control loop until ignition switch 42 is moved from the start position. If ignition switch 42 is in either the run or ROS position, then control moves to step 240, shown in FIG. 14.

Step 240 enables the input controls to processor 80. By enabling the input controls, processor 80 is able to receive input signals from the various components of drive control system 30. The inputs from steering wheel 36 and accelerator pedal 32 cause processor 80 to send signals to actuators 52L and 52R. Step 244 in FIG. 15 begins a series of steps that controls the movement and position of actuators 52L and 52R. These steps are detailed in FIGS. 15 through 22.

Figure 15:
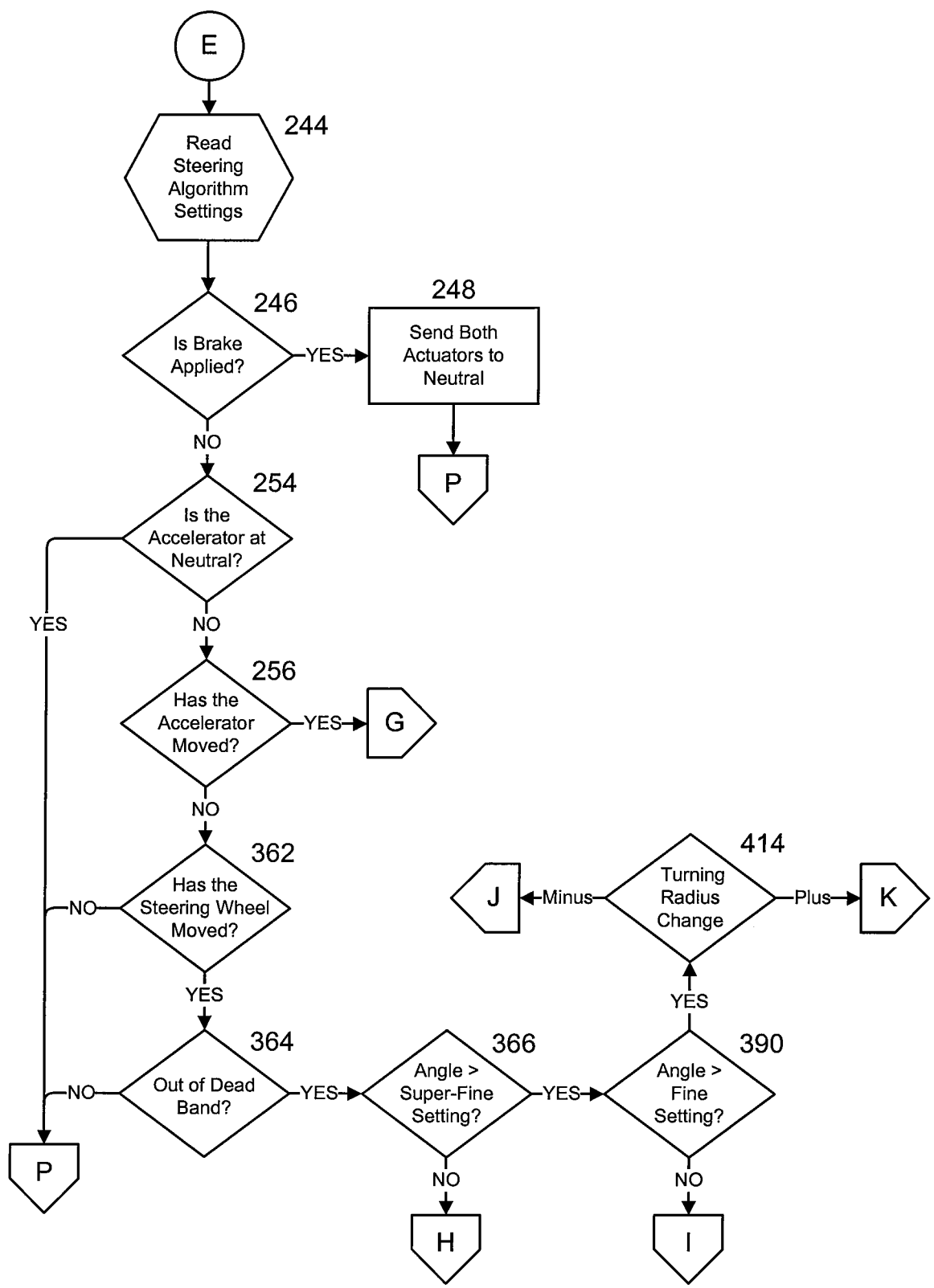
FIG. 15 is a flow chart of a control process of the drive control system, showing a portion of the actuator control process.

At step 244, shown in FIG. 15, steering algorithm settings are read. In a particular embodiment, these settings are established during the programming of processor 80. These settings may include the speed at which actuators 52L and 52R respond, the maximum speed of transmissions 12L and 12R, the maximum speed of deceleration when brake pedal 34 is actuated or accelerator pedal 32 is released to return to the neutral position, and the acceleration permitted in the transition from the zero-turn mode of operation (i.e., a pure turning mode without any significant forward or reverse progression of the vehicle) to full forward speed. Other operating settings may be established in a table or may be adjustable with operator selectable input.

After the operating settings have been established, it is determined at step 246 whether brake pedal 34 has been actuated. If brake pedal 34 has been actuated, actuators 52L and 52R are returned to neutral at step 248. After step 248, control is returned to step 304 in FIG. 14. If the brake of vehicle 10 is not applied, which in this embodiment means that brake pedal 34 is not depressed, then control passes from step 246 to step 254. At step 254, it is determined whether accelerator pedal 32 is in the neutral position. If accelerator pedal 32 is in the neutral position, control moves to step 304 in FIG. 14 (the flow chart shown in FIG. 14 will be described later). If accelerator pedal 32 is moved from the neutral position, control passes to step 256.

Figure 21:
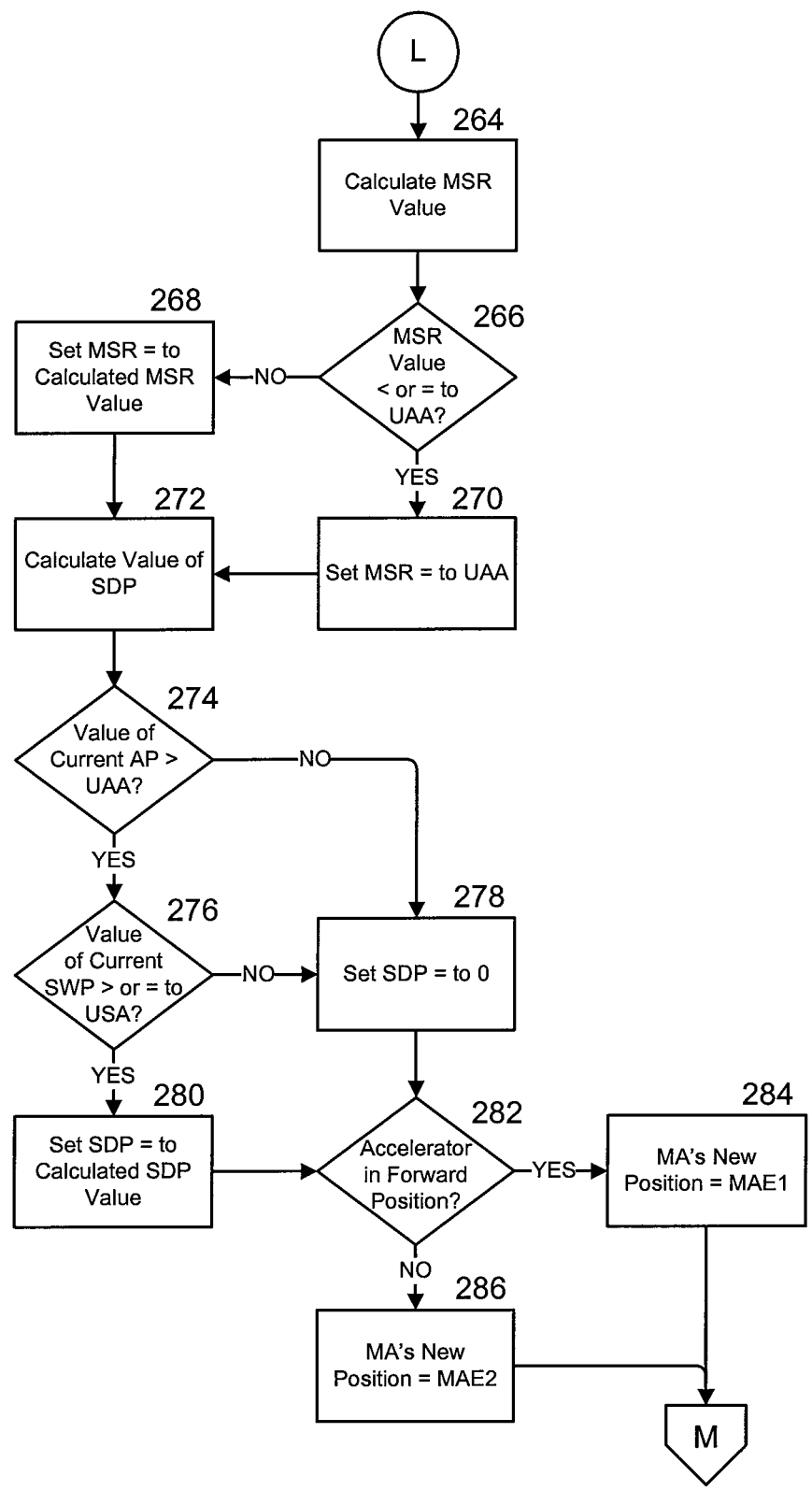
FIG. 21 is a flow chart of a control process of the drive control system, showing a portion of the actuator control process that calculates the position of the master actuator.
Figure 22:
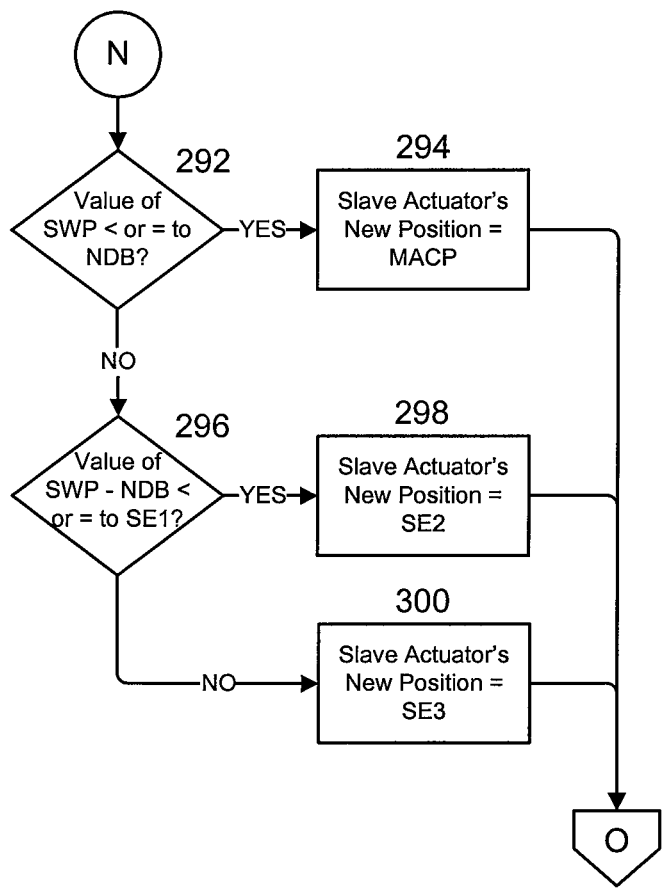
FIG. 22 is a flow chart of a control process of the drive control system, showing a portion of the actuator control process that calculates the position of the slave actuator.
Figures 23, 24:
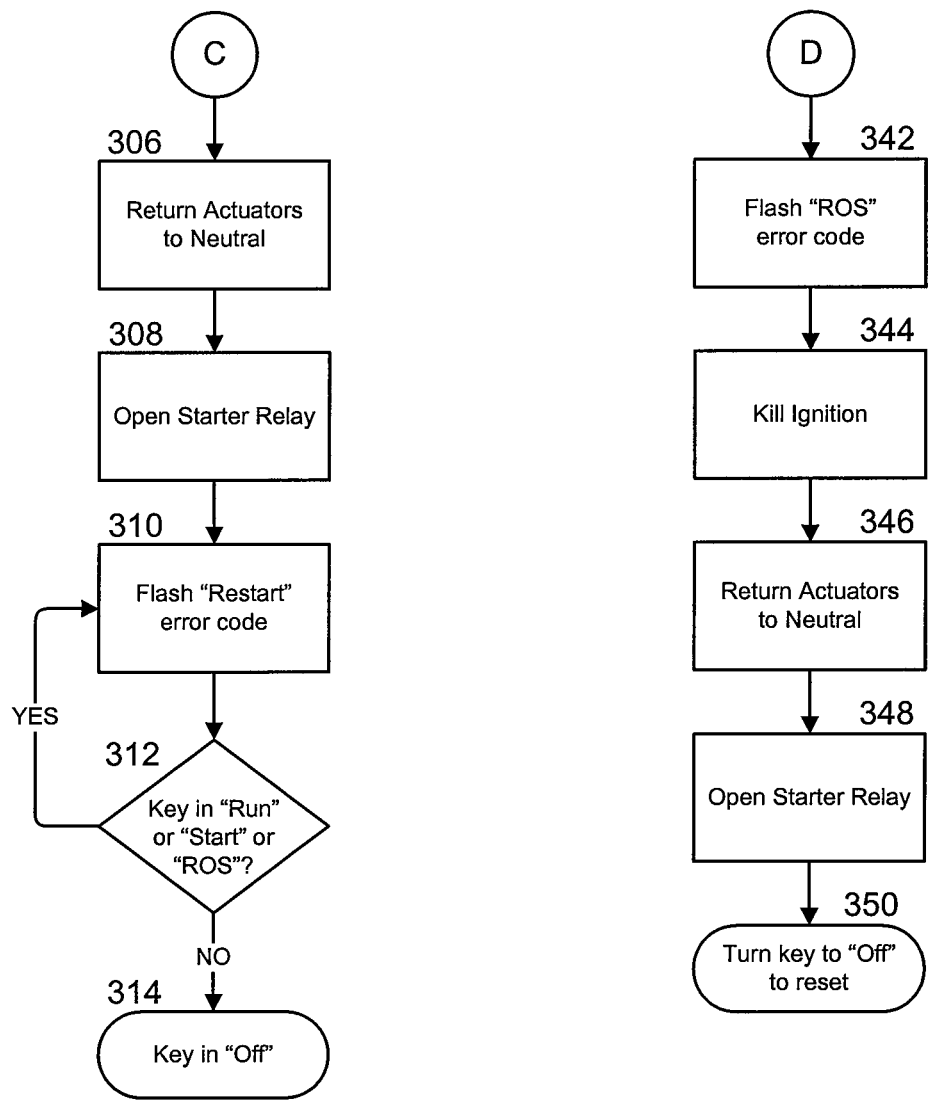
FIG. 23 is a flow chart of a control process of the drive control system, showing shutdown of the vehicle.
FIG. 24 is a flow chart of a control process of the drive control system, showing shutdown of the vehicle due to a malfunctioning reverse operating system.
Figure 25:
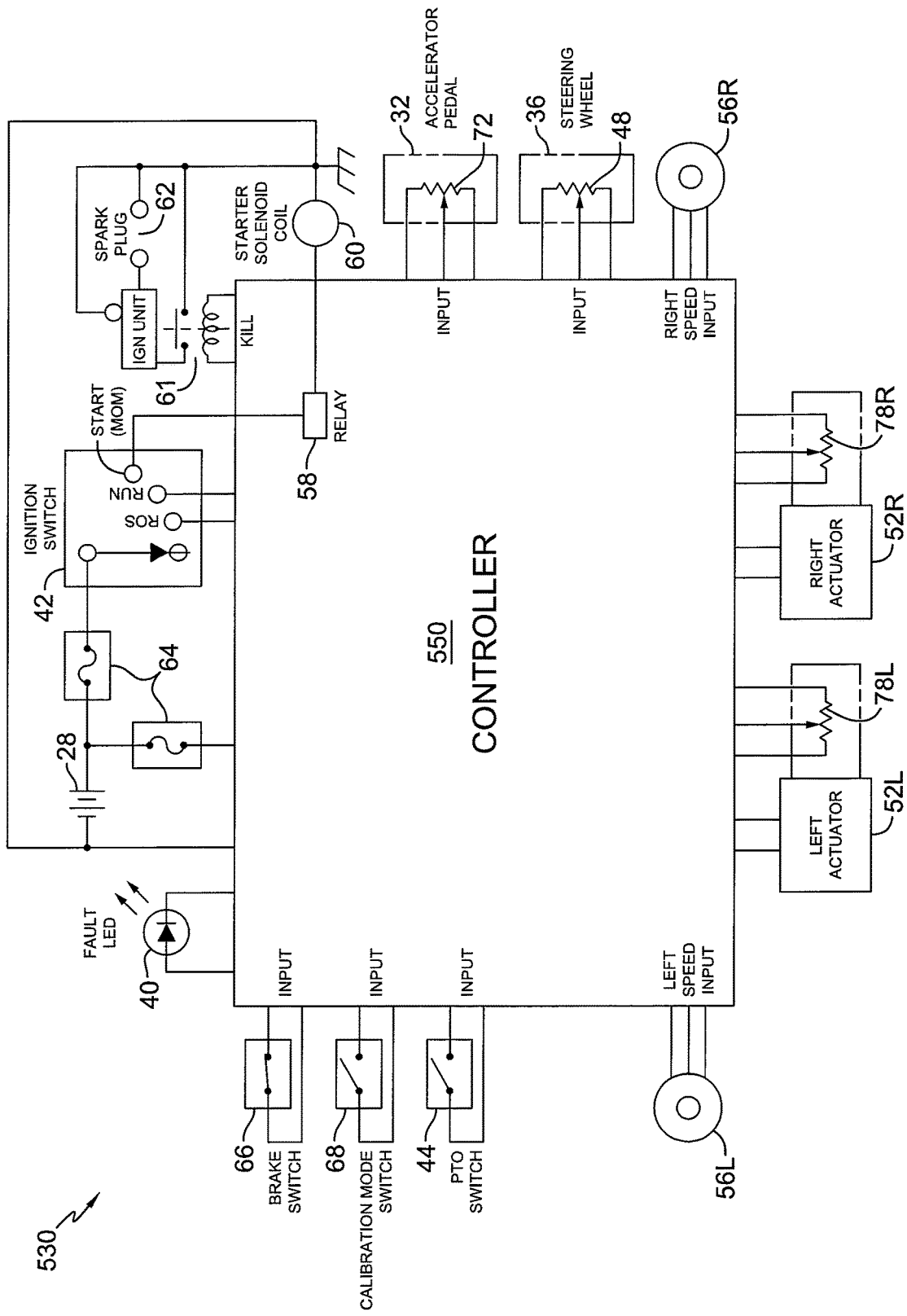
FIG. 25 is a block diagram of certain portions of a second embodiment drive control system in accordance with the principles of the present invention.

At step 256, the current position of accelerator pedal 32 is compared to the previous position of accelerator pedal 32. In a particular embodiment, the positions of accelerator pedal 32 are continuously stored in a memory. If the position of accelerator pedal 32 has changed, control passes to step 258 in FIG. 16. At step 258, the position of steering wheel 36 is determined. If steering wheel 36 is left of, or at, the center position (or non-steering position), control continues to step 260. At step 260, control system 30 denotes that right actuator 52R operates as the master and left actuator 52L operates as the slave. In a particular embodiment, the control system denotes the master and slave status via software. Software also directs the subroutines shown in FIGS. 21 and 22 where to return control, since the subroutines shown in FIGS. 21 and 22 are utilized in more than one control process. Step 262 indicates that the new master actuator position is being calculated.

At step 264 in FIG. 21, the minimum speed reduction (MSR) is calculated. The calculated minimum speed reduction is effectively the maximum permissible speed of vehicle 10 in a zero-turn or near zero-turn mode of operation. As will be explained, the effect of the calculated minimum speed reduction is to control the maximum speed of this type of vehicle in the tightest turning radii, which is seen to improve the safety of this type of vehicle as some zero-turn vehicles can also be operated at straight-line speeds in excess of 15 mph (24 kph). The reason the minimum speed reduction needs to be calculated is that it is related to both the turning radius and the vehicle speed. Thus, a large turning radius and high speed will have a different calculated minimum speed reduction than a short turning radius and a high vehicle speed or a short turning radius and a slow vehicle speed.

At step 266, the calculated minimum speed reduction is compared to the unreduced accelerator angle (UAA), which is a manufacturer-defined position of accelerator pedal 32. For example, a manufacturer may decide that the unreduced accelerator angle should result in a top vehicle speed of 3 mph. If the calculated minimum speed reduction is greater than the unreduced accelerator angle, control is passed to step 268, where the minimum speed reduction is set to the calculated minimum speed reduction. If the calculated minimum speed reduction is less than or equal to the unreduced accelerator angle, control is passed to step 270, where the minimum speed reduction is set to the unreduced accelerator angle. Thus, if the calculated minimum speed reduction is less than or equal to a certain set point, there will be no change in vehicle speed in a turn. If the calculated minimum speed reduction is greater than a certain set point, then the vehicle will see a change in speed, as will be described in more detail.

Step 272 follows either step 268 or step 270. At step 272, the speed difference percent (SDP) is calculated. In order to accomplish vehicle turning using two independent transaxles, such as with the embodiment shown in FIG. 1, the speed of one transaxle (and corresponding driven tire) must either be reduced or increased with respect to the other transaxle (and corresponding driven tire). In a particular embodiment, this difference in speed is accomplished by reducing the speed of the master tire with respect to the slave tire. In order to determine whether and by how much the speed of the master tire must be reduced, a speed difference percent is calculated. The speed difference percent may be calculated a variety of ways. One way is to calculate the speed difference percent as an amount that relates to the unreduced steering angle (USA), which, like the unreduced accelerator angle, is established by a manufacturer based on its vehicle configuration and operating needs. The speed difference percent may thus be calculated as the absolute value of the steering position minus the unreduced steering angle, with this amount divided by 100 minus the unreduced steering angle. After this calculation, control is passed to step 274.

Step 274 determines whether the position of accelerator pedal 32 is greater than the unreduced accelerator angle. If the accelerator position (AP) is less than or equal to the unreduced accelerator angle, then there is no need to modify the speed of transaxles 12L and 12R considering only the speed of transaxles 12L and 12R and the speed difference percent is set to zero at step 278. If the accelerator position is greater than the unreduced accelerator angle, control is passed to step 276, where the position of steering wheel 36 is compared to the unreduced steering angle. If the rotation angle of steering wheel 36 is less than the unreduced steering angle, then there is no need to modify the speed of transaxles 12L and 12R and the speed difference percent is set to zero at step 278. This is because the turning radius of vehicle 10 is large enough that the current output speed of transaxles 12L and 12R is acceptable. If the rotation angle of steering wheel 36 is greater than or equal to the unreduced steering angle, control passes to step 280, where the speed difference percent is set to the calculated speed difference percent.

Step 278 and step 280 both pass control to step 282, which determines whether accelerator pedal 32 is in a forward position. If accelerator pedal 32 is in a forward position, control is passed to step 284, where the master accelerator's (MA's) new position is calculated using master accelerator equation 1:

$$\text{New Position}=MAE1=CAP-[(CAP-MSR)*SDP]$$

Where:
MAE1=Master Accelerator Equation 1
CAP=Current Accelerator Position
MSR=Minimum Speed Reduction
SDP=Speed Difference Percent If accelerator pedal 32 is not in a forward position, then control moves to step 286, where the master accelerator's new position is calculated using Master Accelerator Equation 2:

$$\text{New Position}=MAE2=CAP-[(CAP+MSR)*SDP]$$

Where:
MAE2=Master Accelerator Equation 2
and where the other acronyms are the same as those specified for master accelerator equation 1 above.

Figure 16:
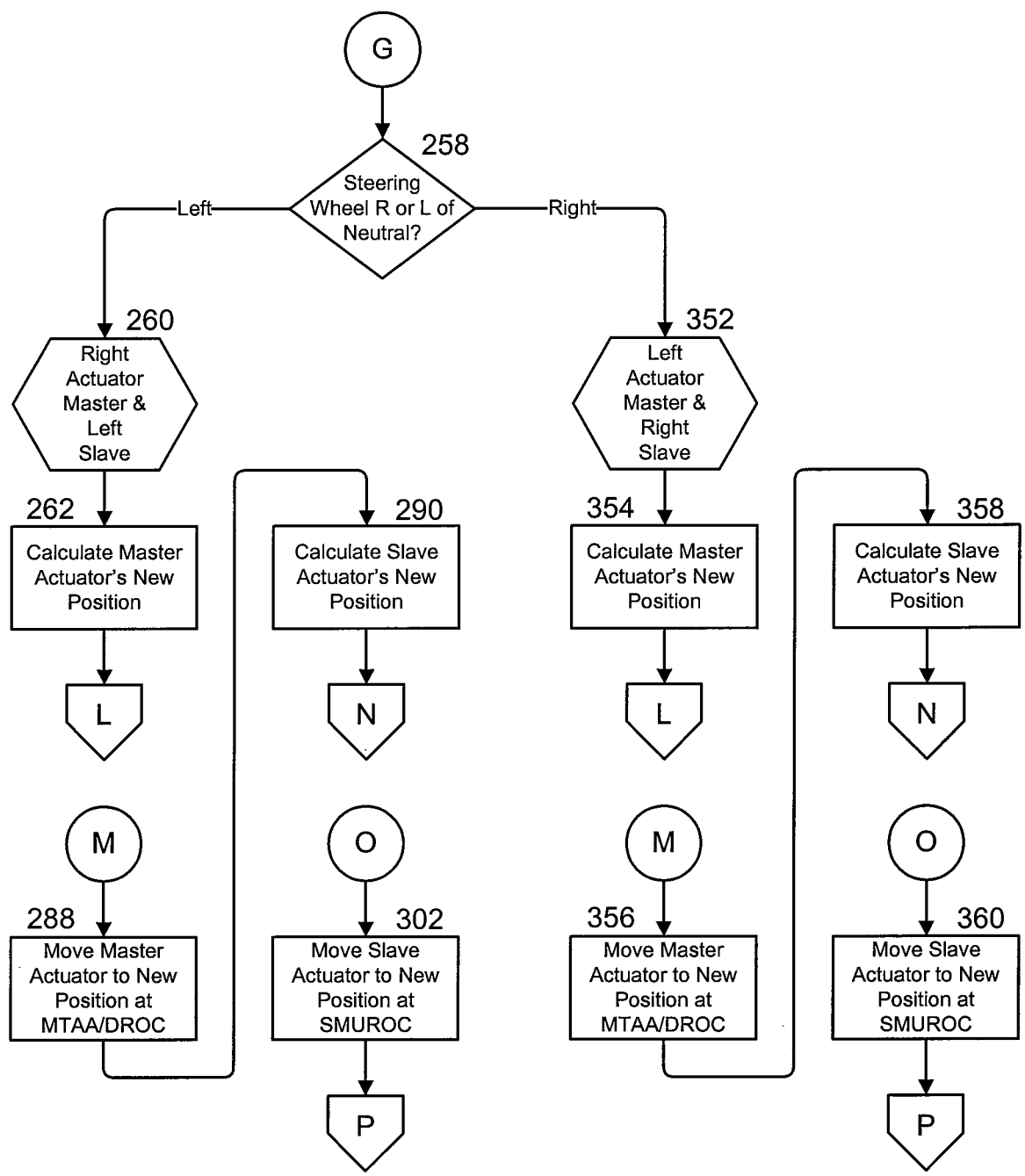
FIG. 16 is a flow chart of a control process of the drive control system, showing a portion of the actuator control process that occurs with movement of the vehicle accelerator.

Control is now returned to step 288 in FIG. 16. At step 288, the master actuator is moved to the calculated new position at the master tire accelerator accelerating and decelerating rate of change (MTAA/DROC). The master tire accelerator accelerating and decelerating rate of change is preferably defined during programming and may be modified to meet the operating requirements of a specific vehicle. This value sets how quickly an actuator moves in response to a signal to move to a new position.

After the master actuator has been moved, the slave actuator position must be determined. Step 290 indicates that the new slave actuator position is being calculated by the following steps. Step 292, shown in FIG. 22, determines whether the steering wheel position (SWP) is less than or equal to the neutral dead band (NDB). The neutral dead band defines how far from the center or nominally non-steering position steering wheel 36 must be before the slave actuator is moved. If the position of steering wheel 36 is less than or equal to the neutral dead band (that is, within the neutral dead band), steering is not required and the slave actuator's new position is set to be the master actuator's current position (MACP) at step 294. From this point, control returns to step 302 in FIG. 16.

Returning to step 292, if the position of steering wheel 36 is greater than the neutral dead band (that is, outside the neutral dead band), then control is moved to step 296, which determines whether the value of steering wheel 36 position minus the neutral dead band is less than or equal to the value of slave equation 1 (SE1), which is:

$$SE1=(PSW/100)*(100-NDB)$$

Where:
SE1=Slave Equation 1
PSW=Percent Steering Wheel
NDB=Neutral Dead Band
Thus, the test at step 296 is:

$$SWP-NDB \le [(PSW/100)*(100-NDB)]$$

The percent steering wheel (PSW) is the amount of rotation of steering wheel 36 relative to the maximum allowed rotation of steering wheel 36.

If the test at step 296 is met, then control passes to step 298, where the slave actuator's new position is set to slave equation 2, which is:

$$SE2=MACP-\{MACP*[(AVCSP-NDB)/\{(PSW/100)*(100-NDB)\}]\}$$

And which may be written as:

$$SE2=MACP-\{MACP*[AVCSP-NDB/SE1]\}$$

Where:
SE2=Slave Equation 2
MACP=Master Actuator's Current Position
AVCSP=Absolute Value of the Current Steering Position PSW=Percent Steering Wheel
NDB=Neutral Dead Band
SE1=Slave Equation 1

If the test at step 296 is not met, control passes to step 300, where the slave actuator's new position is set to slave equation 3, which is:

SE3=MACP+{MACP*[1−{[AVCSP−NDB−[(PSW/100)*(100−NDB)]]/[1−{(PSW/100)*(100−NDB)}]}]}

And which may be written:

SE3=MACP+{MACP*[1−{[AVCSP−NDB−SE1]/[1−SE1]}]}

Where:
SE1=Slave Equation 1
SE3=Slave Equation 3
MACP=Master Actuator's Current Position
AVCSP=Absolute Value of the Current Steering Position
PSW=Percent Steering Wheel
NDB=Neutral Dead Band After the new slave actuator position has been calculated, control passes to step 302 in FIG. 16. At step 302, the slave actuator is moved to its new position at the slave maximum unrestricted rate of change (SMUROC). Once step 302 is complete, control passes to step 304 in FIG. 14. Step 304 determines whether ignition switch 42 is in the run or ROS position. If ignition switch 42 is not in either the run or ROS position, then control passes to step 306, shown in FIG. 23. At step 306, actuators 52L and 52R are returned to neutral. At step 308, starter relay 58 is opened, which prevents vehicle 10 from being started again should ignition switch 42 be moved to the start position. At step 310, indicator light 40 flashes in a pattern that indicates that vehicle 10 needs to be restarted, also called a restart error code. Step 312 then determines whether ignition switch 42 is in the start, run or ROS position. If ignition switch 42 is in one of these positions, control is passed back to step 310, and this control loop continues until ignition switch 42 is moved to the off position. If ignition switch 42 is in the off position, then drive control system 30 is in the condition specified by step 314, and drive control system 30 is deactivated.

Figure 14:
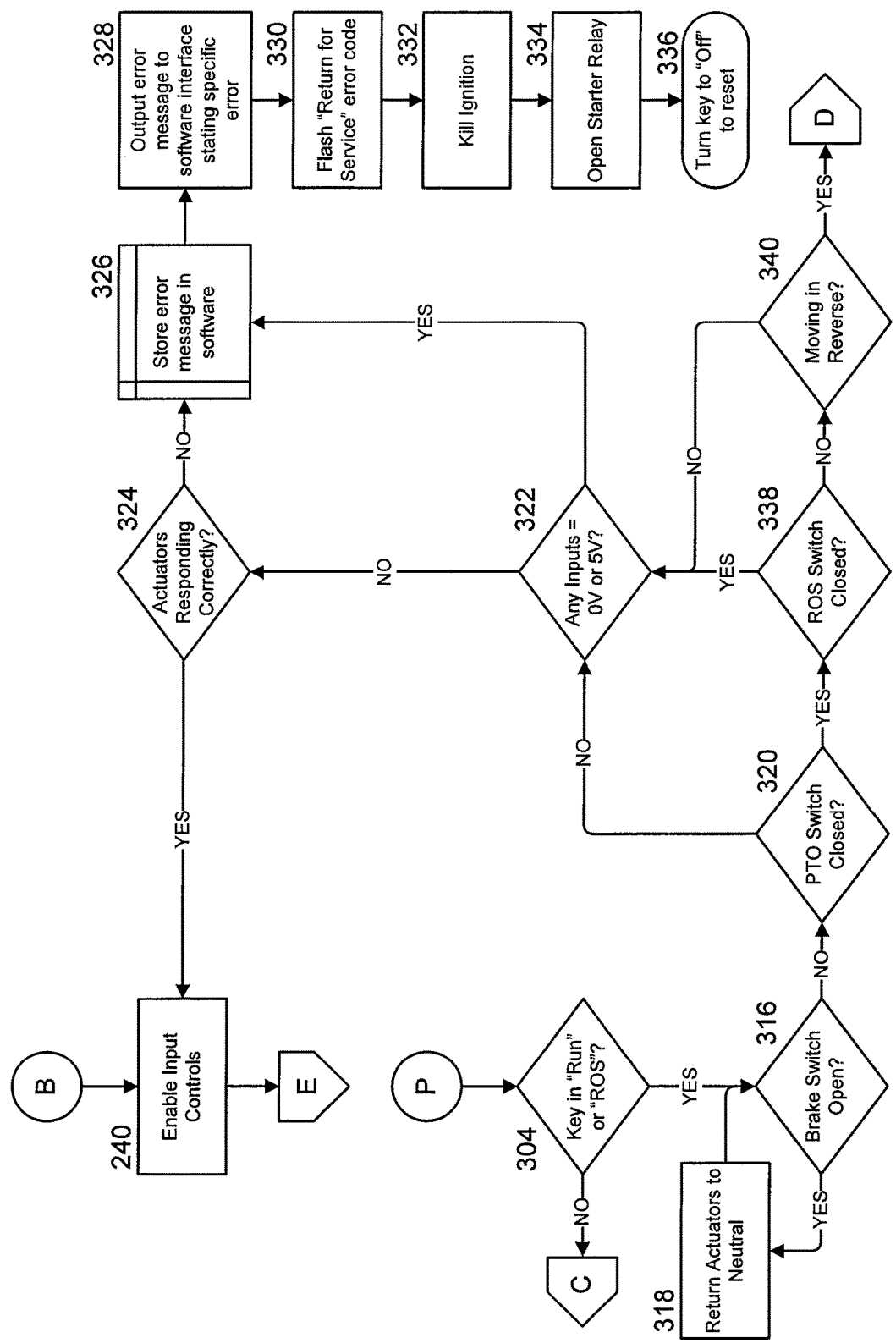
FIG. 14 is a flow chart of a control process of the drive control system, showing diagnostics performed to determine whether to kill the prime mover or enable input controls.

Returning to step 304 in FIG. 14, if ignition key switch 42 is in either the run or ROS position, then step 316 determines whether brake switch 66 is open. If brake switch 66 is open, step 318 returns actuators 52L and 52R to neutral. Control then loops back through step 316 until brake switch 66 is closed or until ignition switch 42 is turned off. If brake switch 66 is not open, step 320 determines whether power take-off switch 44 is closed. If power take-off switch 44 is not closed, step 322 determines whether any inputs are at a voltage that might indicate a problem. If all inputs are normal, step 324 determines whether actuators 52L and 52R are functioning correctly. If actuators 52L and 52R are functioning properly, control returns to step 240. If inputs are not normal or if actuators 52L and 52R are not responding correctly, control moves to step 326.

At step 326, an error message is stored into a memory. At step 328, the error message is output to an interface stating the specific error. At step 330, an error code is flashed, preferably via indicator light 40, in a pattern to indicate that vehicle 10 should be returned to a qualified dealer for service. At step 332, processor 80 sends a signal that causes primer mover 18 to stop operating. At step 334, starter relay 58 is opened, and an operator is prevented from restarting vehicle 10 at this time. At step 336, the operator moves ignition switch 42 to the off position. From this point, the operator may attempt to restart vehicle 10 by turning ignition switch 42 from its off position to the run position, wherein drive control system 30 begins to perform a series of diagnostics following step 200 in FIG. 12. The error condition may be removed during initialization of drive control system 30. Alternatively, the operator may have vehicle 10 serviced by a qualified dealer.

Returning to step 320, if power take-off switch 44 has been actuated, control passes to step 338. If ignition switch 42 is in the ROS position, then control passes to step 322. If ignition switch 42 is not in the ROS position, step 340 tests for reverse operation. Since step 340 is reached only if power take-off switch 44 has been actuated, the blades of mower deck 26 will be operating. It may be undesirable to permit operation of mower deck 26 with vehicle 10 operating in reverse. An operator may elect to mow in reverse by selecting the ROS position with ignition switch 42, or some other optional bypass switch that permits operation of mower deck 26 with vehicle 10 operating in reverse. If a vehicle is not configured with this arrangement, or if the optional bypass feature is not selected, control passes to step 342 in FIG. 24.

At step 342, indicator light 40 flashes in response to a signal that denotes an ROS error. Step 344 kills the ignition by grounding ignition unit 100 through diode 98. Step 346 returns actuators 52L and 52R to neutral. Step 348 opens starter relay 58. Ignition switch 42 will need to be returned to the off position in order to reset drive control system 30 to enable restart of vehicle 10, which occurs at step 350.

As described in a particular embodiment, a signal from processor 80 causes prime mover 18 to cease operation. However, other methods of halting mowing operation in reverse are known and drive control system 30 is compatible with known methodologies. For example, blade clutches are also known, and the signal that forward-biases diode 98 could be used to enable and disable an electric blade clutch. Thus, the description of how the ROS function prevents mowing operation in reverse is illustrative of one of a plurality of techniques for halting mowing operation in reverse in accordance with the principles of the present invention.

Returning now to step 258 in FIG. 16, if steering wheel 36 is to the right of the center position, drive control system 30 denotes left actuator 52L as the master and right actuator 52R as the slave at step 352. In a particular embodiment, control system 30 denotes the master and slave status via software. Software also directs the subroutines shown in FIGS. 21 and 22 where to return control, since the subroutines shown in FIGS. 21 and 22 are utilized in more than one control process. Step 354 indicates that the new master actuator position is being calculated by the subroutine that follows, which begins with step 264 in FIG. 21.

The function of the flow chart presented in FIG. 21 has been previously described in connection with step 262 and step 288. The only difference from the previous explanation is that upon completion of either step 284 or step 286 in FIG. 21, control passes to step 356 in FIG. 16.

At step 356, the master actuator is moved to the calculated new position at the master tire accelerator accelerating and decelerating rate of change (MTAA/DROC). The master tire accelerator accelerating and decelerating rate of change is defined during programming and may be modified to meet the operating requirements of a specific vehicle. This value sets how quickly an actuator moves in response to a signal to move to a new position.

After the master actuator has been moved, the slave actuator position must be determined. Step 358 indicates that the new slave actuator position is being calculated by the steps shown in FIG. 22 and previously described above. The only difference from the previously described procedure is that upon completion of the process steps in FIG. 22, control returns to step 360 in FIG. 16. At step 360, the slave actuator is moved to its new position at the slave maximum unrestricted rate of change (SMUROC). Once step 360 is complete, control passes to step 304 in FIG. 14. The function of the methodology illustrated in FIG. 14 has been previously described above.

Returning now to step 256 in FIG. 15, if accelerator pedal 32 has not moved, step 362 determines whether steering wheel 36 has moved. If steering wheel 36 has not moved, control passes to step 304 in FIG. 14, which has been previously described in detail. If steering wheel 36 has moved, step 364 determines whether steering wheel 36 is out of the neutral dead band (NDB), which has previously been described. If steering wheel 36 is not out of the neutral dead band, control is passed to step 304 in FIG. 14, which has been previously described. If steering wheel 36 is out of the neutral dead band, then control passes to step 366.

Figure 17:
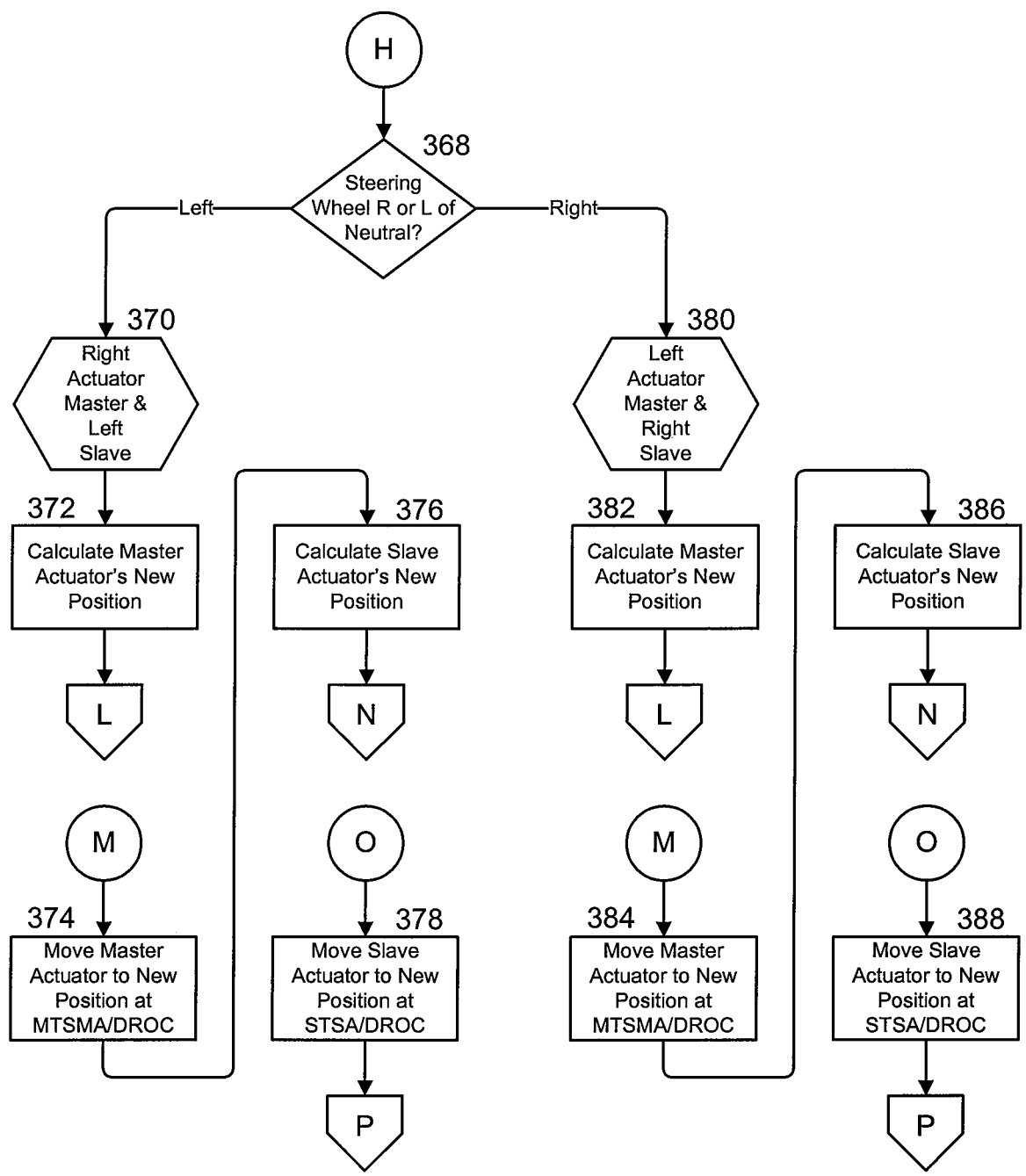
FIG. 17 is a flow chart of a control process of the drive control system, showing a portion of the actuator control process that occurs with movement of the steering wheel.

At step 366, shown in FIG. 15, if steering wheel 36 has moved to an angle less than or equal to the angle defined as super-fine (which, in a particular embodiment, has been predetermined), control passes to step 368 in FIG. 17. In step 368, the position of steering wheel 36 is determined. If steering wheel 36 is left of, or at, the center position (non-steering position), step 370 denotes that right actuator 52R operates as the master and left actuator 52L operates as the slave. In a particular embodiment, these denotations are accomplished via software. Software also directs the subroutines shown in FIGS. 21 and 22 where to return control, since the subroutines shown in FIGS. 21 and 22 are utilized in more than one control process. Step 372 indicates that the new master actuator position is being calculated by the subroutine that follows, which begins with step 264 in FIG. 21.

The function of the flow chart presented in FIG. 21 has been previously described in connection with step 262 and step 288. The only difference from the previous explanation is that upon completion of either step 284 or step 286 in FIG. 21, control passes to step 374 in FIG. 17.

At step 374, the master actuator is moved to the new position at the master tire steering minimum accelerating and decelerating rate of change (MTSMA/DROC). The master tire steering minimum accelerating and decelerating rate of change is defined during programming and may be modified to meet the operating requirements of a specific vehicle. This value sets how quickly an actuator moves in response to a signal to move to a new position during a steering operation.

Now that the master actuator has been moved, the slave actuator position must be determined. Step 376 indicates that the new slave actuator position is being calculated by the steps shown in FIG. 22 and previously described above. The only difference from the previously described procedure is that completion of the process steps in FIG. 22 returns control to step 378 in FIG. 17. At step 378, the slave actuator is moved to its new position at the slave tire steering accelerating and decelerating rate of change (STSA/DROC). Once step 378 is complete, control passes to step 304 in FIG. 14. The function of the flow chart in FIG. 14 has been previously described above.

Returning now to decision step 368 in FIG. 17, if steering wheel 36 is to the right of the center position, step 380 denotes left actuator 52L as the master and right actuator 52R as the slave. In a particular embodiment, this denotation is accomplished via software. Software also directs the subroutine shown in FIGS. 21 and 22 where to return control, since the subroutines shown in FIGS. 21 and 22 are utilized in more than one control process. Step 382 indicates that the new master actuator position is being calculated by the subroutine that follows, which begins with step 264 in FIG. 21.

The function of the flow chart presented in FIG. 21 has been previously described in connection with step 262 and step 288. The only difference from the previous explanation is that on completion of either step 284 or step 286 in FIG. 21, control passes to step 384 in FIG. 17.

At step 384, the master actuator is moved to the calculated new position at the master tire steering minimum accelerating and decelerating rate of change (MTSMA/DROC). The master tire steering minimum accelerating and decelerating rate of change is defined during programming and may be modified to meet the operating requirements of a specific vehicle. This value sets how quickly an actuator moves in response to a signal to move to a new position.

After the master actuator has been moved, the slave actuator position must be determined. Step 386 indicates that the new slave actuator position is being calculated by the steps shown in FIG. 22 and previously described above. The only difference from the previously described procedure is that completion of the process steps in FIG. 22 returns control to step 388 in FIG. 17. At step 388, the slave actuator is moved to its new position at the slave tire steering accelerating and decelerating rate of change (STSA/DROC). Once step 388 is complete, control passes to step 304 in FIG. 14. The function of the flow chart in FIG. 14 has been previously described above.

Returning now to decision step 366 in FIG. 15, if steering wheel 36 has moved to an angle greater than the angle defined as super-fine (which, in a particular embodiment, has been predetermined), control passes to decision step 390. If the steering wheel angle is less than or equal to the angle defined as fine, then control passes to step 392 in FIG. 18. In step 392, the position of steering wheel 36 is determined. If steering wheel 36 is left of, or at, the center position (non-steering position), control moves to step 394.

Step 394 denotes that right actuator 52R operates as the master and left actuator 52L operates as the slave. In a particular embodiment, the denotation is accomplished via software. Software also directs the subroutine shown in FIGS. 21 and 22 where to return control, since the subroutines shown in FIGS. 21 and 22 are utilized in more than one control process. Step 396 indicates that the new master actuator position is being calculated by the subroutine that follows, which begins with step 264 in FIG. 21.

The function of the flow chart presented in FIG. 21 has been previously described in connection with step 262 and step 288. The only difference from the previous explanation is that upon completion of either step 284 or step 286 in FIG. 21, control passes to step 398 in FIG. 18.

At step 398, the master actuator is moved to the new position at the master tire accelerator accelerating and decelerating rate of change (MTAA/DROC). The master tire accelerator accelerating and decelerating rate of change is defined during programming and may be modified to meet the operating requirements of a specific vehicle. This value sets how quickly an actuator moves in response to a signal to move to a new position during a steering operation.

After the master actuator has been moved, the slave actuator position must be determined. Step 400 indicates that the new slave actuator position is being calculated by the steps shown in FIG. 22 and previously described above. The only difference from the previously described procedure is that completion of the flow chart in FIG. 22 returns control to step 402 in FIG. 18. At step 402, the slave actuator is moved to its new position at the calculated fine steering angle rate of change (CFSAROC). Once step 402 is complete, control passes to step 304 in FIG. 14. The function of the flow chart in FIG. 14 has been previously described above.

Figure 18:
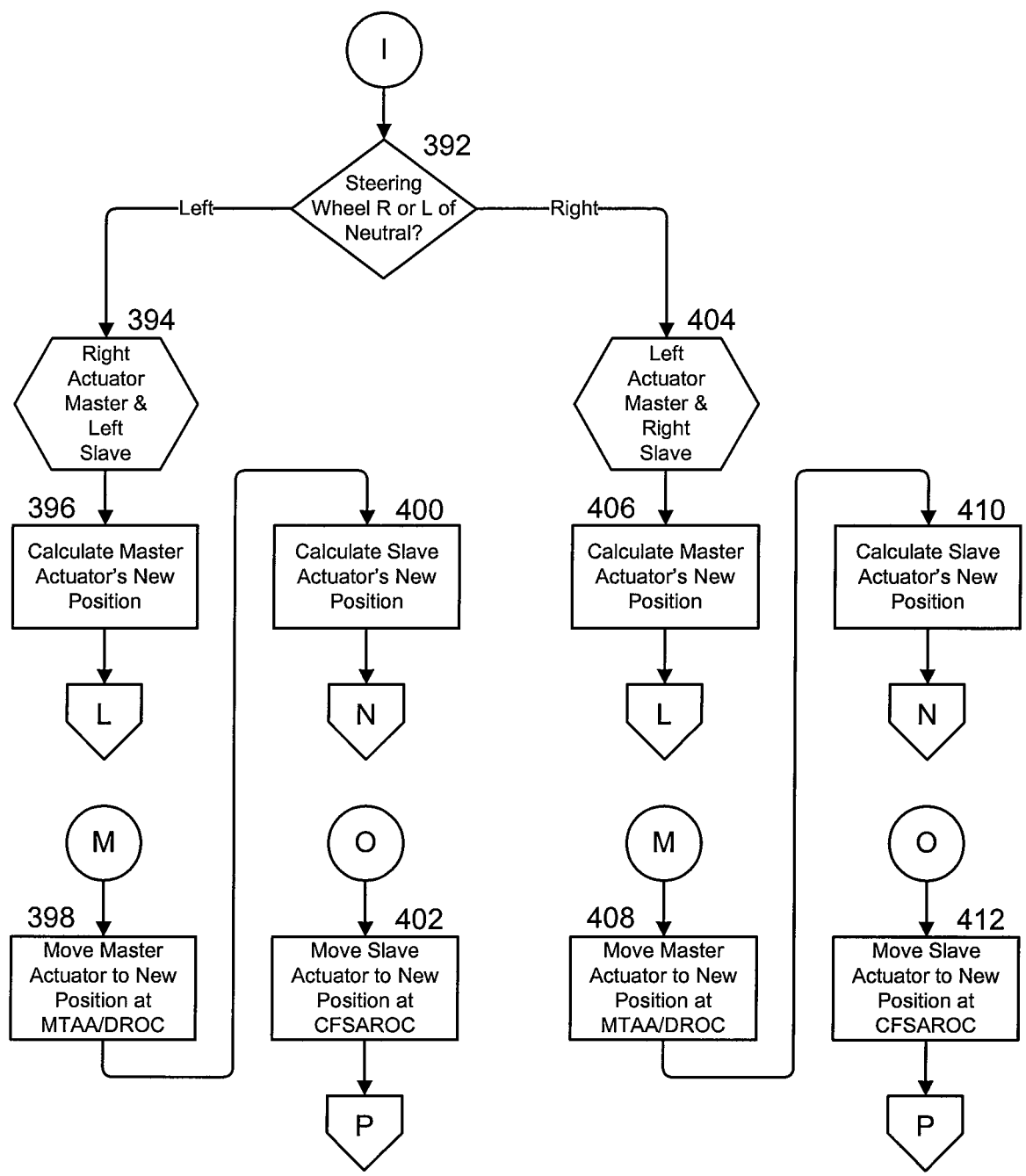
FIG. 18 is a flow chart of a control process of the drive control system, showing a portion of the actuator control process that occurs with movement of the steering wheel.

Returning now to step 392 in FIG. 18, if steering wheel 36 is to the right of the center position, step 404 denotes left actuator 52L as the master and right actuator 52R as the slave. In a particular embodiment, the denotation is accomplished via software. Software also directs the subroutine shown in FIGS. 21 and 22 where to return control, since the subroutines shown in FIGS. 21 and 22 are utilized in more than one control process. Step 406 indicates that the new master actuator position is being calculated by the subroutine that follows, which begins with step 264 in FIG. 21.

The function of the flow chart presented in FIG. 21 has been previously described in connection with step 262 and step 288. The only difference from the previous explanation is that upon completion of either step 284 or step 286 in FIG. 21, control passes to step 408 in FIG. 18.

At step 408, the master actuator is moved to the calculated new position at the master tire accelerator accelerating and decelerating rate of change (MTAA/DROC). The master tire accelerator accelerating and decelerating rate of change is defined during programming and may be modified to meet the operating requirements of a specific vehicle. This value sets how quickly an actuator moves in response to a signal to move to a new position.

After the master actuator has been moved, the slave actuator position must be determined. Step 410 indicates that the new slave actuator position is being calculated by the steps shown in FIG. 22 and previously described above. The only difference from the previously described procedure is that completion of the process steps in FIG. 22 returns control to step 412 in FIG. 18. At step 412, the slave actuator is moved to its new position at the calculated fine steering angle rate of change (CFSAROC). Once step 412 is complete, control passes to step 304 in FIG. 14. The function of the flow chart in FIG. 14 has been previously described above.

Returning now to step 390 in FIG. 15, if the steering angle is greater than fine, step 414 determines whether there has been an increase or decrease in the turning radius. If there has been a decrease in turning radius, control passes to step 416 in FIG. 19.

In step 416, the position of steering wheel 36 is determined. If steering wheel 36 is left of, or at, the center position (non-steering position), step 418 denotes that right actuator 52R operates as the master and left actuator 52L operates as the slave. In a particular embodiment, the denotation is accomplished via software. Software also directs the subroutine shown in FIGS. 21 and 22 where to return control, since the subroutines shown in FIGS. 21 and 22 are utilized in more than one control process. Step 420 indicates that the new master actuator position is being calculated by the subroutine that follows, which begins with step 264 in FIG. 21.

The function of the flow chart presented in FIG. 21 has been previously described in connection with step 262 and step 288. The only difference from the previous explanation is that upon completion of either step 284 or step 286 in FIG. 21, control passes to step 422 in FIG. 19.

At step 422, the master actuator is moved to the new position at the master tire steering acceleration rate of change (MTSAROC). The master tire steering acceleration rate of change is defined during programming and may be modified to meet the operating requirements of a specific vehicle. This value sets how quickly an actuator moves in response to a signal to move to a new position during a steering operation.

After the master actuator has been moved, the slave actuator position must be determined. Step 424 indicates that the new slave actuator position is being calculated by the steps shown in FIG. 22 and previously described above. The only difference from the previously described procedure is that completion of the process steps in FIG. 22 returns control to step 426 in FIG. 19. At step 426, the slave actuator is moved to its new position at the slave maximum unrestricted rate of change (SMUROC). Once step 426 is complete, control passes to step 304 in FIG. 14. The function of the flow chart in FIG. 14 has been previously described above.

Figure 19:
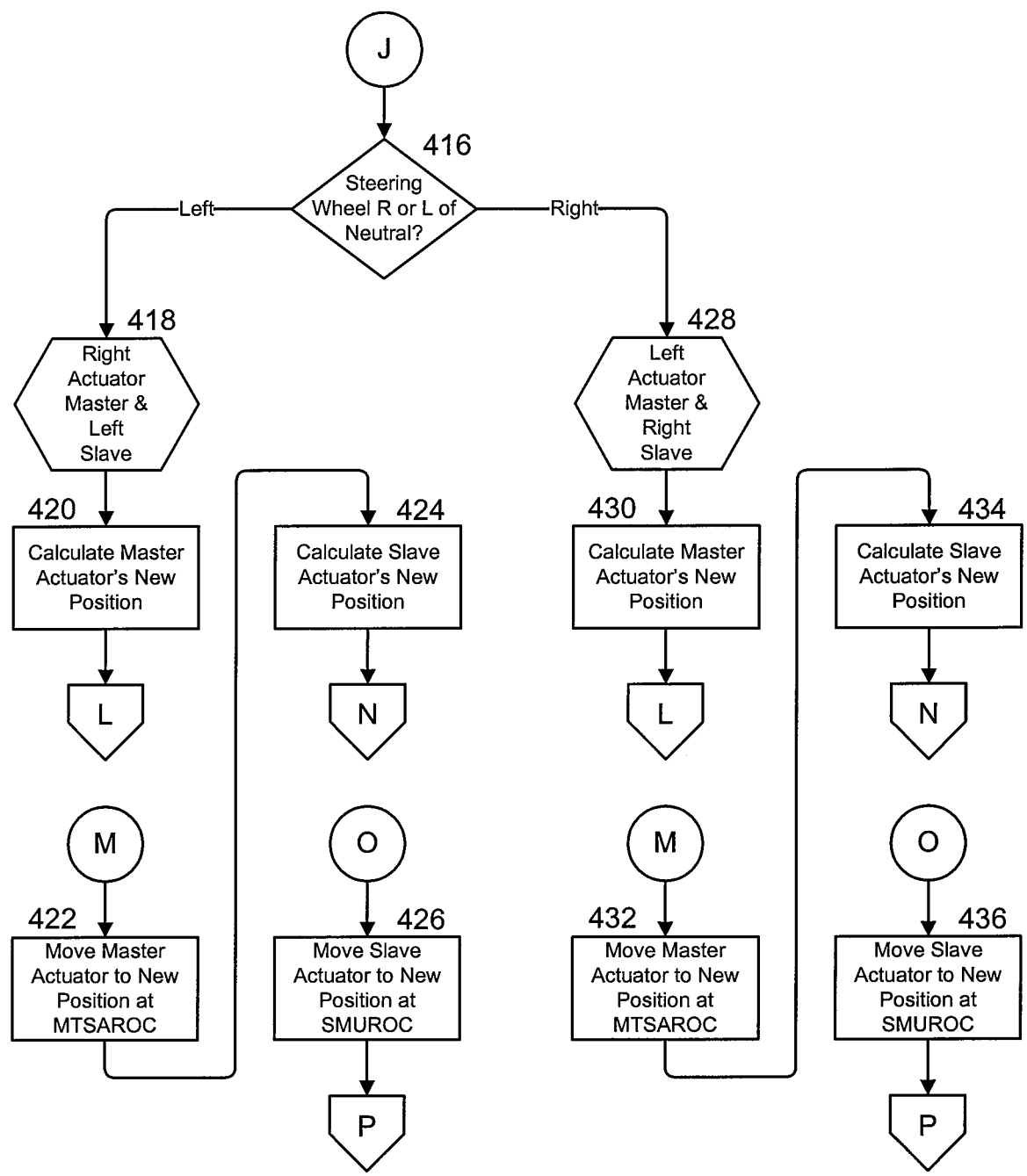
FIG. 19 is a flow chart of a control process of the drive control system, showing a portion of the actuator control process that occurs with movement of the steering wheel.

Returning now to step 416 in FIG. 19, if steering wheel 36 is to the right of the center position, step 428 denotes left actuator 52L as the master and right actuator 52R as the slave. In a particular embodiment, the denotation is accomplished via software. Software also directs the subroutine shown in FIGS. 21 and 22 where to return control, since the subroutines shown in FIGS. 21 and 22 are utilized in more than one control process. Step 430 indicates that the new master actuator position is being calculated by the subroutine that follows, which begins with step 264 in FIG. 21.

The function of the flow chart presented in FIG. 21 has been previously described in connection with step 262 and step 288. The only difference from the previous explanation is that upon completion of either step 284 or step 286 in FIG. 21, control passes to step 432 in FIG. 19.

At step 432, the master actuator is moved to the calculated new position at the master tire steering acceleration rate of change (MTSAROC). The master tire steering acceleration rate of change is defined during programming and may be modified to meet the operating requirements of a specific vehicle. This value sets how quickly an actuator moves in response to a signal to move to a new position.

After the master actuator has been moved, the slave actuator position must be determined. Step 434 indicates that the new slave actuator position is being calculated by the steps shown in FIG. 22 and previously described above. The only difference from the previously described procedure is that completion of the process steps in FIG. 22 returns control to step 436 in FIG. 19. At step 436, the slave actuator is moved to its new position at the slave maximum unrestricted rate of change (SMUROC). Once step 436 is complete, control passes to step 304 in FIG. 14. The function of the flow chart in FIG. 14 has been previously described above.

Figure 20:
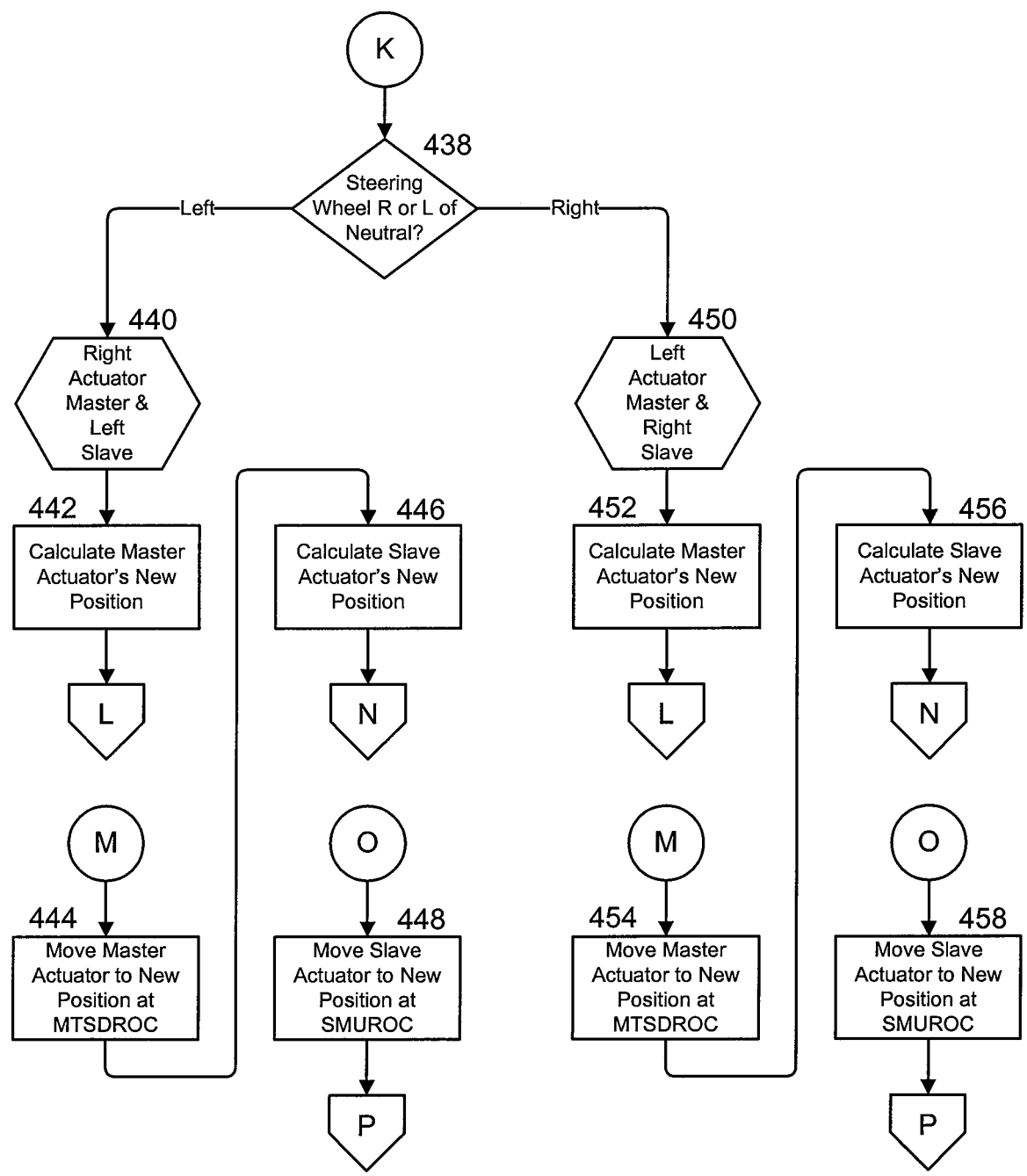
FIG. 20 is a flow chart of a control process of the drive control system, showing a portion of the actuator control process that occurs with movement of the steering wheel.

Returning now to step 414 in FIG. 15, if the turning radius has increased, control passes to step 438 in FIG. 20, where the position of steering wheel 36 is determined. If steering wheel 36 is left of, or at, the center position (non-steering position), step 440 denotes right actuator 52R as the master and left actuator 52L as the slave. In a particular embodiment, the denotation is accomplished via software. Software also directs the subroutine shown in FIGS. 21 and 22 where to return control, since the subroutines shown in FIGS. 21 and 22 are utilized in more than one control process. Step 442 indicates that the new master actuator position is being calculated by the subroutine that follows, which begins with step 264 in FIG. 21.

The function of the flow chart presented in FIG. 21 has been previously described in connection with step 262 and step 288. The only difference from the previous explanation is that upon completion of either step 284 or step 286 in FIG. 21, control passes to step 444 in FIG. 20.

At step 444, the master actuator is moved to the new position at the master tire steering deceleration rate of change (MTSDROC). The master tire steering deceleration rate of change is defined during programming and may be modified to meet the operating requirements of a specific vehicle. This value sets how quickly an actuator moves in response to a signal to move to a new position during a steering operation.

After the master actuator has been moved, the slave actuator position must be determined. Step 446 indicates that the new slave actuator position is being calculated by the steps shown in FIG. 22 and previously described above. The only difference from the previously described procedure is that completion of the process steps in FIG. 22 returns control to step 448 in FIG. 20. At step 448, the slave actuator is moved to its new position at the slave maximum unrestricted rate of change (SMUROC). Once step 448 is complete, control passes to step 304 in FIG. 14. The function of the flow chart in FIG. 14 has been previously described above.

Returning now to step 438 in FIG. 20, if steering wheel 36 is to the right of the center position, step 450 denotes left actuator 52L as the master and right actuator 52R as the slave. In a particular embodiment, the denotation is accomplished via software. Software also directs the subroutine shown in FIGS. 21 and 22 where to return control, since the subroutines shown in FIGS. 21 and 22 are utilized in more than one control process. Step 452 indicates that the new master actuator position is being calculated by the subroutine that follows, which begins with step 264 in FIG. 21.

The function of the flow chart presented in FIG. 21 has been previously described in connection with step 262 and step 288. The only difference from the previous explanation is that upon completion of either step 284 or step 286 in FIG. 21, control passes to step 454 in FIG. 20.

At step 454, the master actuator is moved to the calculated new position at the master tire steering deceleration rate of change (MTSDROC). The master tire steering deceleration rate of change is defined during programming and may be modified to meet the operating requirements of a specific vehicle. This value sets how quickly an actuator moves in response to a signal to move to a new position.

After the master actuator has been moved, the slave actuator position must be determined. Step 456 indicates that the new slave actuator position is being calculated by the steps shown in FIG. 22 and previously described above. The only difference from the previously described procedure is that upon completion of the flow chart in FIG. 22 control returns to step 458 in FIG. 20. At step 458, the slave actuator is moved to its new position at the slave maximum unrestricted rate of change (SMUROC). Once step 458 is complete, control passes to step 304 in FIG. 14. The function of the flow chart in FIG. 14 has been previously described above.

Throughout this description actuators 52L and 52R are caused to move by the actions of accelerator pedal 32 and steering wheel 36. Though the movement is limited by minimum and maximum speeds, one aspect that has yet to be addressed is how processor 80 causes actuators 52L and 52R to transition to a particular speed of movement. If the transition is too abrupt, then an end user will perceive the vehicle to be jerky. If the transition is too slow, then an end user will perceive the vehicle to be sluggish and possibly hard to turn.

In order to address these issues, the control methods of the present invention make use of a proportional integral derivative (PID) loop to control the beginning and end of the actuator movements. PID loops are known in the art. Other transitioning moderating techniques may also be used, such as proportional (P) loops, proportional integral (PI) loops, and proportional derivative (PD) loops. Other transition moderating techniques may be used, as long as they can be adjusted for reasonably smooth operation of a particular vehicle or particular class of vehicle.

Another factor is the time required to process the information provided by accelerator pedal 32 and steering wheel 36. Because the maximum rate of movement of actuators 52L and 52R are preferably controlled via software processes resident in processor 80 as described herein, there is no penalty to operation with an extremely fast processor. However, a slow processor may be noticed by a user as sluggish response. Optional clock 81 may be used if the speed of processor 80 is insufficiently fast for a particular vehicle application. In the configuration described herein, the approximate speed of response to a change in controls is about 20 milliseconds. This response speed should be sufficient for most applications.

Figure 26:
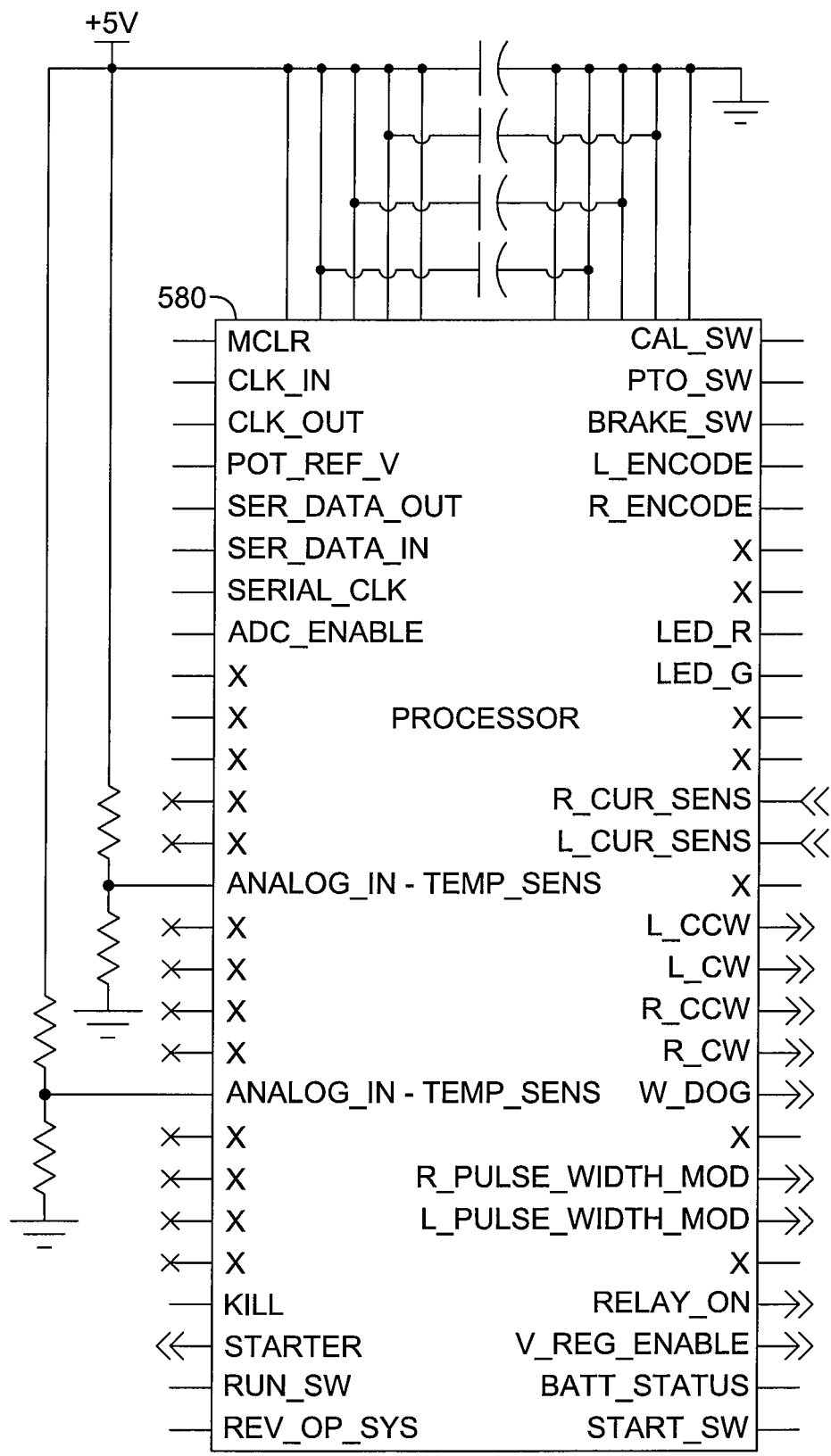
FIG. 26 is a schematic of a processor of the second embodiment drive control system showing inputs to and outputs from the processor.

FIGS. 25 through 33 illustrate a second embodiment of a drive control system 530 in accordance with the principles of the present invention. This embodiment illustrates that the principles of the present invention can be implemented in numerous ways and with various modifications without departing from those principles. Referring to FIGS. 25 through 33, controller 550 preferably includes processor 580, which is configured with some differences compared to processor 80 of the first embodiment. These differences will be explained in more detail below with respect to the control algorithms of the second embodiment. Referring generally to FIG. 26, processor 580 is configured with several inputs/outputs that differ from processor 80, including SER_DATA_OUT, SER_DATA_IN, SERIAL_CLK, ADC_ENABLE, ANALOG IN-TEMP SENS, L_CCW, L_CW, R_CCW, R_CW, and W_DOG. In a particular embodiment, processor 580 is a PIC18F6620 microcontroller manufactured by Microchip Technology Incorporated. However, many other types of processors, programmable logic controllers (PLCs), or the like could be utilized in accordance with the principles of the present invention. As with the first embodiment, for purposes of simplicity, some of the drawings described herein with respect to the second embodiment may illustrate only the portion of the processor being described in connection with a particular drawing, with the understanding that the processor may appear as illustrated schematically in FIG. 26.

Figure 27:
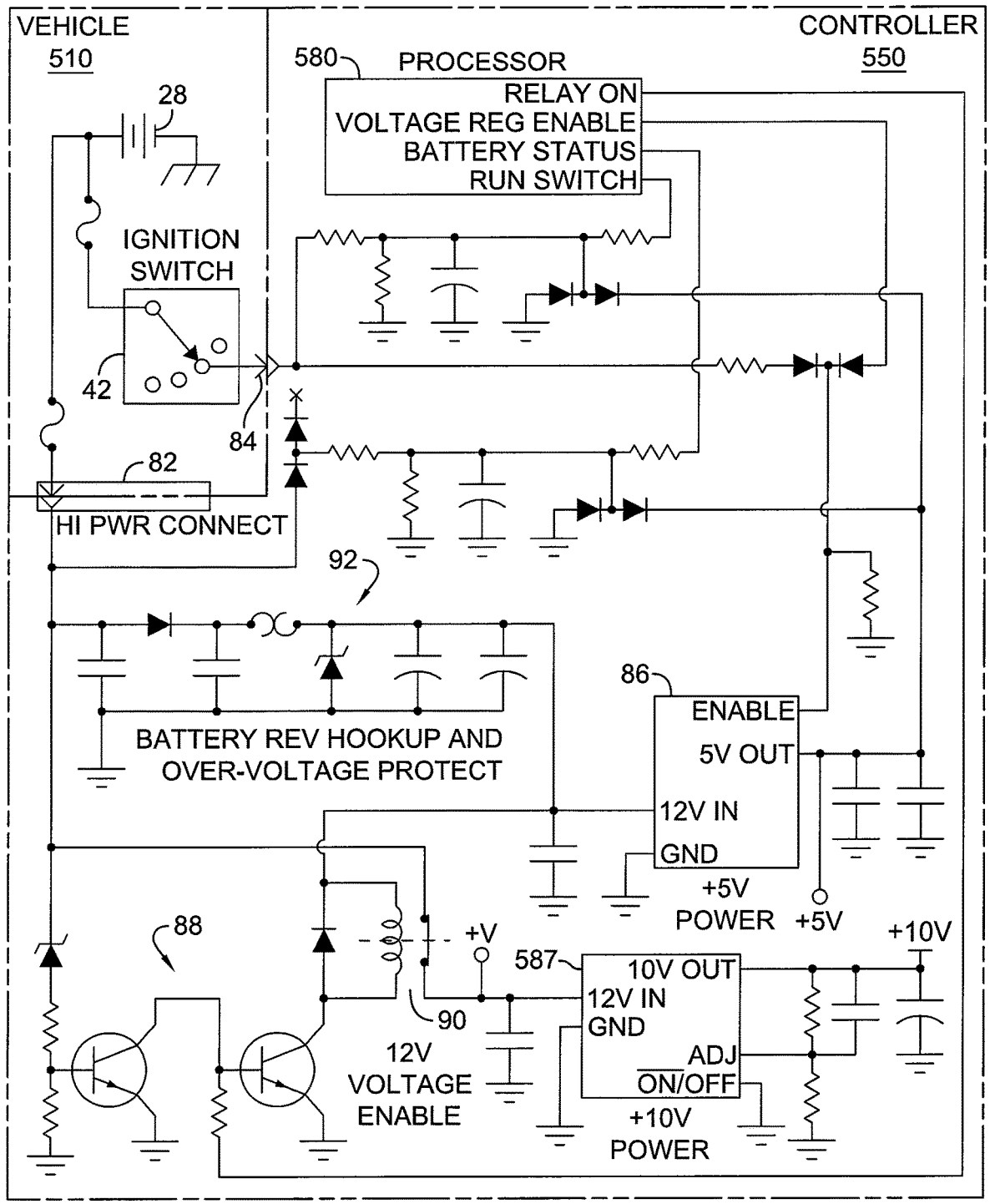
FIG. 27 is a schematic of one portion of the second embodiment drive control system showing the power supply with the ignition switch in the run position.

Referring to FIG. 27, controller 550 is similar to controller 50. Controller 550 includes an additional power supply, which is in the form of +10V power supply 587. Similar to operation of controller 50, +5V power supply 86 is enabled through connector 84 when ignition switch 42 is in the run position. With ignition switch 42 in the run position and with the presence of +5V power from power supply 86, processor 580 provides a signal through an amplifier 88 to 12V enable relay 90 to activate it. Once 12V enable relay 90 has been activated, unfiltered 12V power from battery 28 is provided for use at various locations in drive control system 530. Additionally, in this embodiment, when 12V enable relay 90 has been activated, +10V power supply 587 is also enabled to supply 10V power for use in system 530 or vehicle 510.

Figure 28:
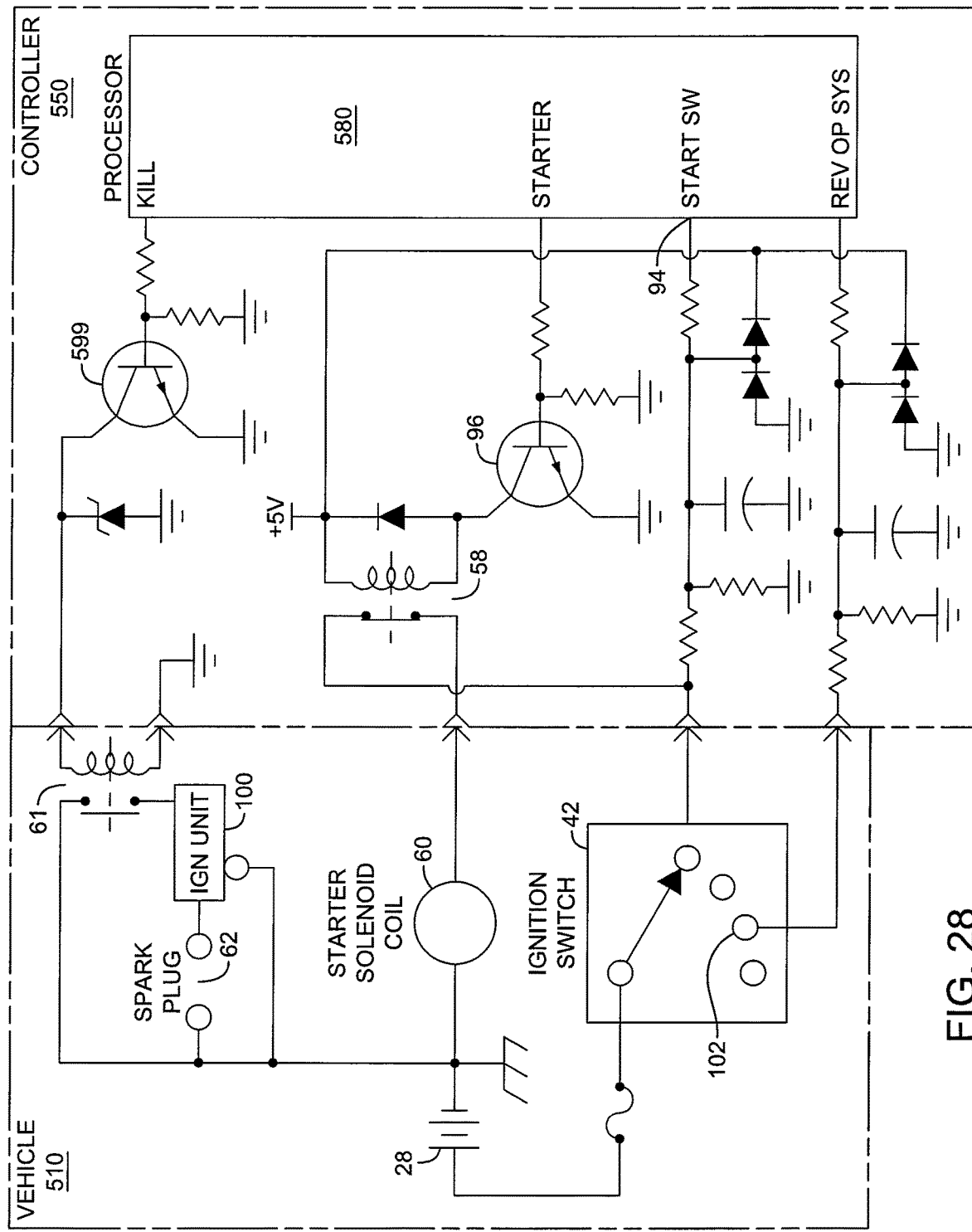
FIG. 28 is a schematic of one portion of the second embodiment drive control system showing the vehicle start circuit along with certain other drive control system features.

Turning now to FIG. 28, the start, kill and reverse operating system functions are illustrated, which are similar to those described with respect to the first embodiment.

When ignition switch 42 is placed in the start position, as shown in FIG. 28, voltage from battery 28 is provided to start switch input 94 of processor 580 as well as to relay 58. Processor 580 performs a variety of functions prior to causing actuation of relay 58, as previously described with respect to the first embodiment. Processor 580 actuates relay 58 by sending a signal to a transistor 96, which then causes actuation of relay 58. Relay 58 is shown in an actuated state in FIG. 28. When relay 58 is actuated, it completes a voltage path to starter solenoid 60, which in turn permits vehicle 510 to be started.

Referring again to FIG. 28, processor 580 may provide a biasing voltage to a transistor 599 that allows relay 61 to be energized, which causes grounding of the signal from an ignition unit 100 if processor 580 determines that vehicle 510 has attained an impermissible operating condition. A Zener diode (not numbered) is associated with transistor 599 so that the avalanche/zener point introduces compensating temperature co-efficient balancing of the transistor PN junction. Grounding the signal from ignition unit 100 prevents spark plug 62 located in prime mover 18 from firing and thereby halts operation of prime mover 18. Thus, processor 580 has the ability to stop or "kill" operation of prime mover 18.

Ignition switch 42 may be rotated to a reverse operating system (ROS) contact position 102 as shown in FIG. 28. Similar to the first embodiment, in this position, a signal is sent to processor 580 that indicates an operator desires mower deck 26 to keep operating even when vehicle 510 is operating or moving in a reverse direction. Many mowing vehicles have one of two types of systems to prevent mower deck 26 operation in reverse. One type of system involves removing power to an electric clutch in response to a reverse operation condition, which thus causes mower deck 26 to cease operation. The other type of system causes prime mover 18 to cease operation. Contact position 102 of ignition switch 42 enables drive control system 530 to allow operation of mower deck 26 or prime mover 18 during reverse movement or operation of vehicle 510. As in the first embodiment, reverse operating system contact position 102 could be used to enable other devices, such as a visual or audible alarm, proximity sensors for obstacle detection, a video display, etc., either individually or in combination.

As previously noted, first embodiment drive control system 30 provides power to actuators 52L and 52R. In the second embodiment, the power for each actuator 52L and 52R is provided through a circuit like that shown in FIG. 29, which illustrates the power circuit for right actuator 52R. Similar to the first embodiment, processor 580 determines the length of time and direction that each actuator 52L and 52R is required to move based on signals from a variety of sources. Processor 580 provides signals to an H-bridge MOSFET driver 504, which then provides drive signals as directed by processor 580 to a MOSFET half H-bridge 506. The output from MOSFET half H-bridge 506 is directed through power connector 82 to actuator 52R. A current sense op-amp 108 is also provided, which, in a particular embodiment, is an LMV321 operational amplifier supplied by National Semiconductor. The output of op-amp 108 is provided to processor 580 to enable processor 580 to determine that MOSFET half H-bridge 506 is operating properly.

Figure 29:
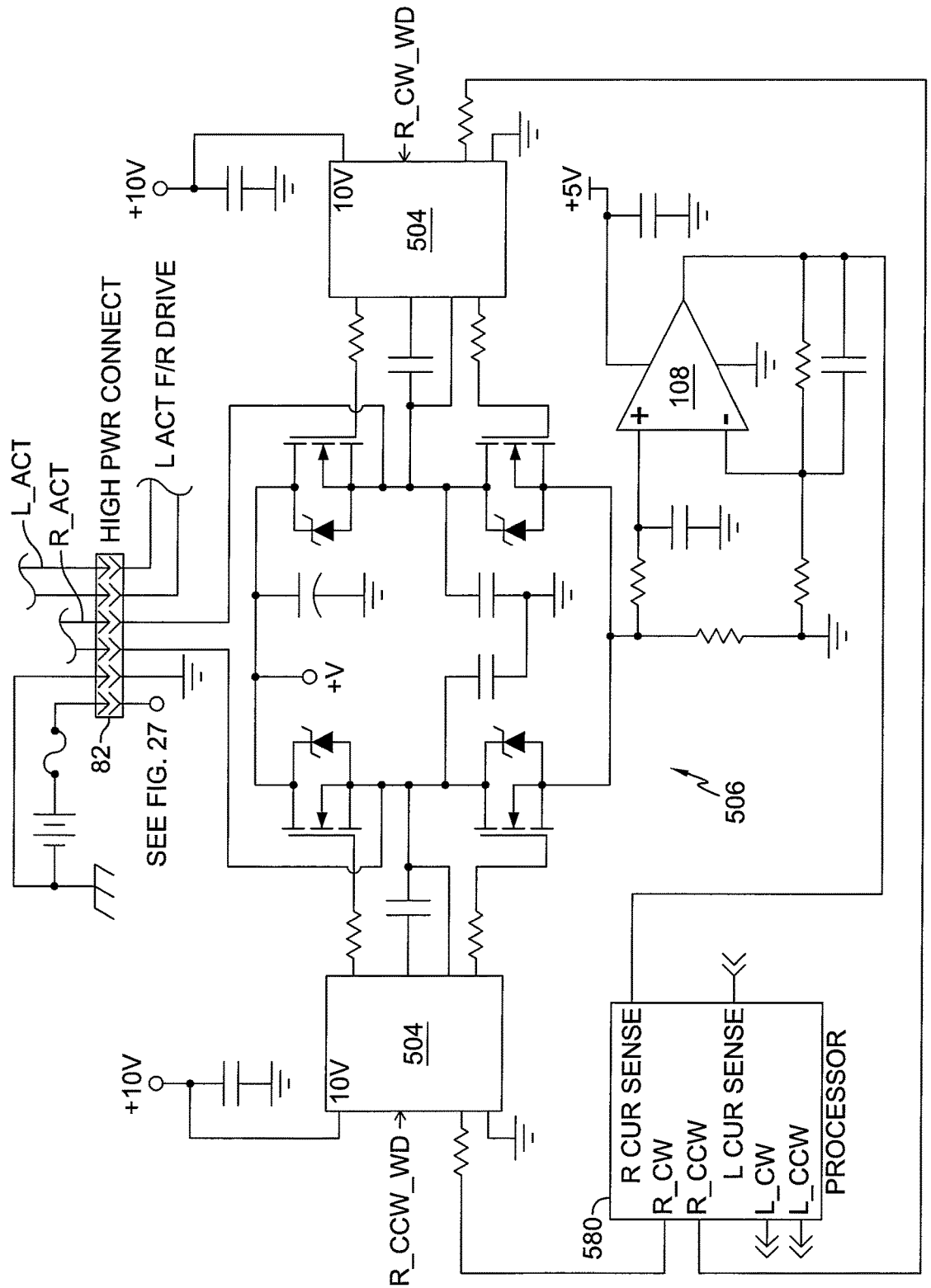
FIG. 29 is a schematic of one portion of the second embodiment drive control system showing the drive circuits for one transaxle actuator.
Figure 30:
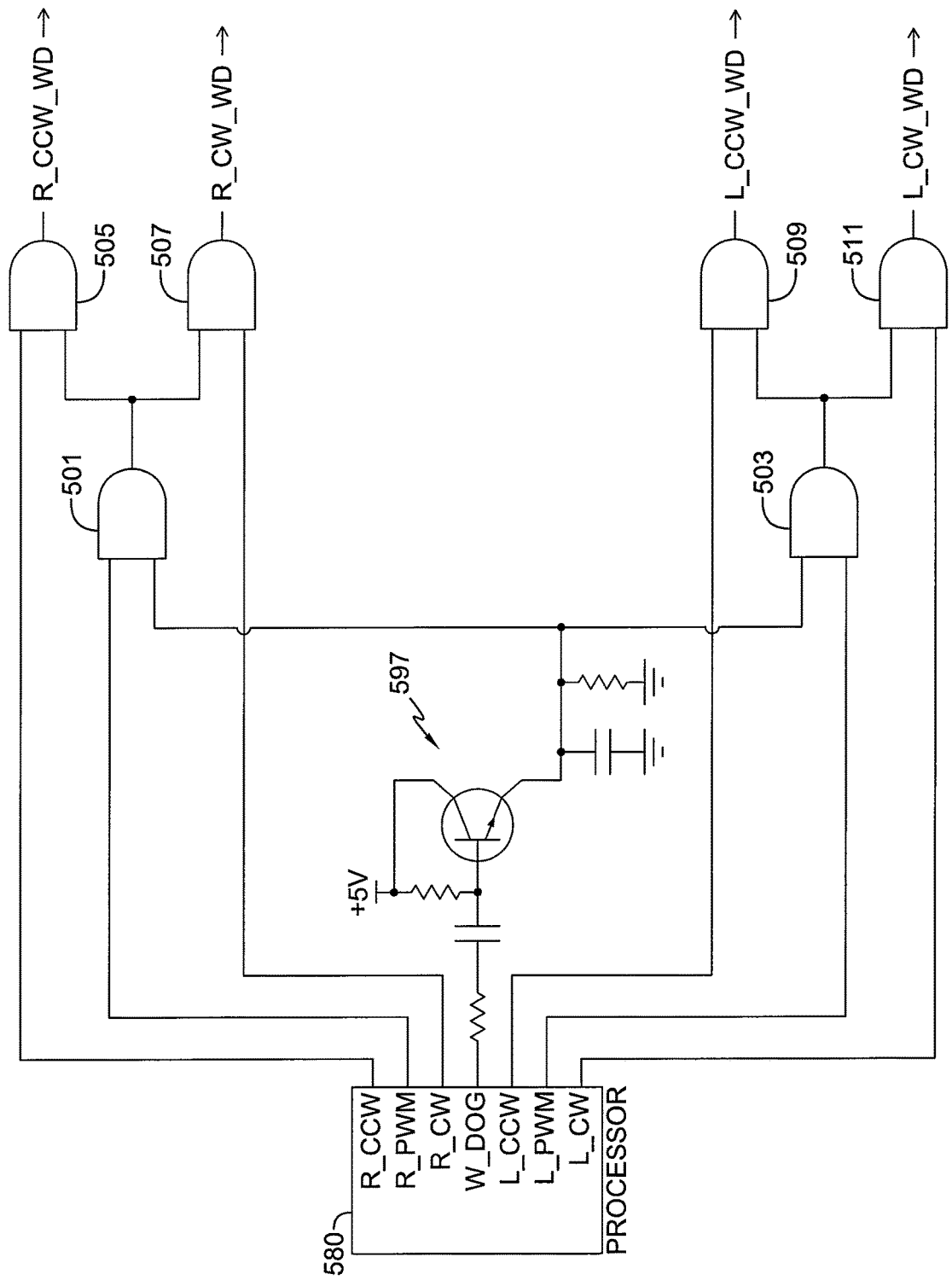
FIG. 30 is a schematic of one portion of the second embodiment drive control system showing an external watch dog circuit and an arrangement of AND gates providing input to the circuit shown in FIG. 29.

As shown in FIG. 30, in the second embodiment, a watchdog circuit is provided external to the processor 580. When the internal watchdog of processor 580 generates a signal, transistor 597 is switched to provide +5V to one input of each AND gate 501 and 503, which are respectively associated with each drive circuit for each actuator 52L and 52R. The second input to each AND gate 501 and 503 is respectively provided by the R_PWM and L_PWM outputs of processor 580. The output of AND gate 501 feeds one input of each AND gate 505 and 507. The other inputs of these AND gates receive input from R_CCW and R_CW of processor 580, respectively. The output of each of these AND gates, R_CCW WD and R_CW_WD, provides input signals to the appropriate H-bridge MOSFET driver 504 as shown in FIG. 29. Likewise, the output of AND gate 503 feeds one input of each AND gate 509 and 511. The other inputs of these AND gates receive input from L_CCW and L_CW of processor 580, respectively. The output of each of these AND gates, L_CCW WD and L_CW_WD, provides input signals to the appropriate H-bridge MOSFET driver 504 as shown in FIG. 29.

Figure 31:
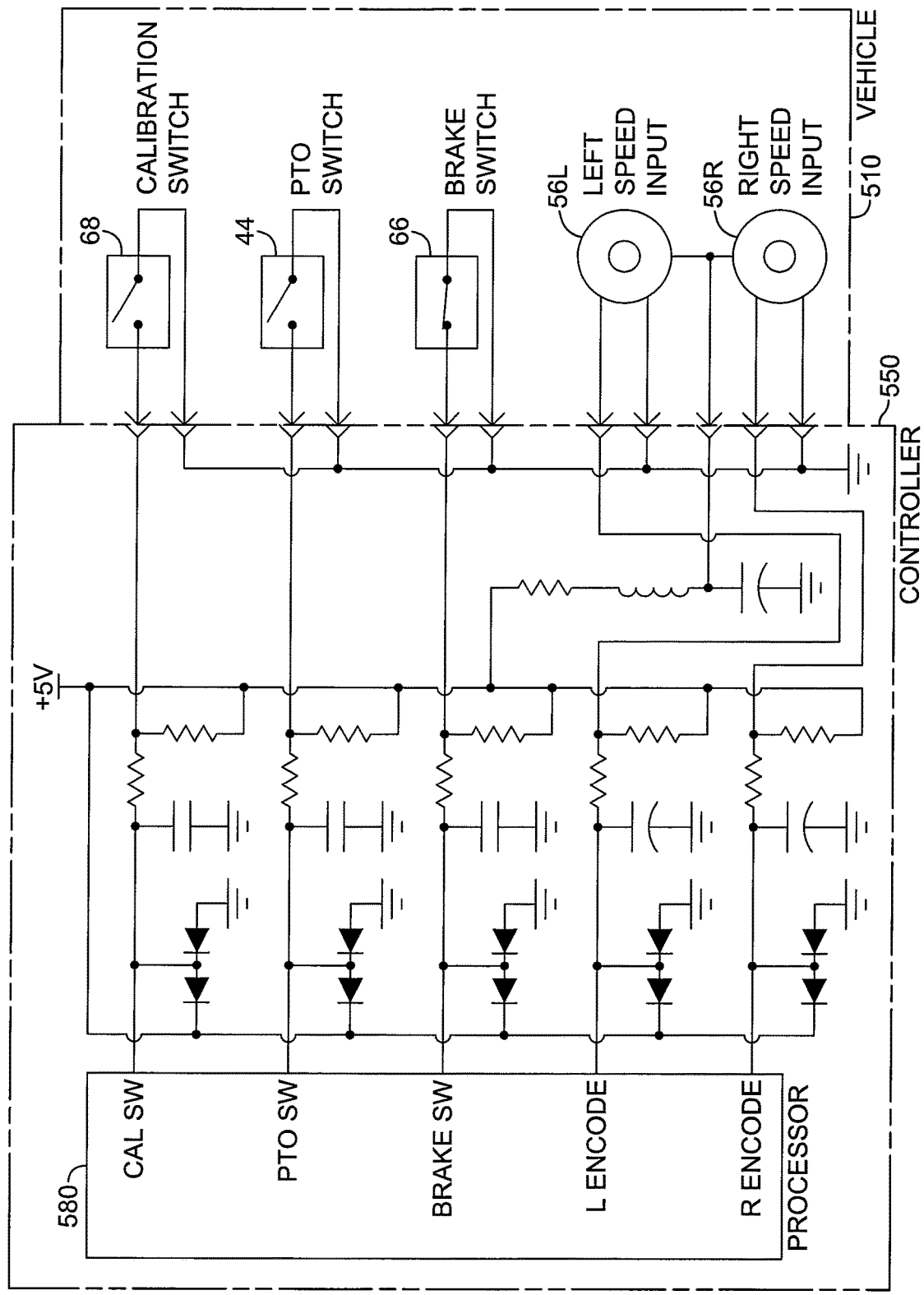
FIG. 31 is a schematic of one portion of the second embodiment drive control system showing some sensor inputs to the drive control system processor.

Similar to the first embodiment, FIG. 31 illustrates some of the various inputs that may be connected to processor 580. Processor 580 is in electrical communication with brake switch 66, which is activated by brake pedal 34. Brake switch 66 may be located such that actuation of brake pedal 34 or other similar brake actuating device causes switch 66 to be actuated. In a particular embodiment, brake switch 66 is located on transmissions 12L and 12R or is part of the brake linkage connected to brake pedal 34.

Referring to FIG. 31, processor 580 is in electrical communication with power take-off switch 44 in order to govern power to an auxiliary device such as the blades of mower deck 26. When an actuating handle or switch for the blades of mower deck 26 is engaged, power take-off switch 44 may be actuated to inform processor 580 of such engagement. Actuation of power take-off switch 44 may also be a part of an optional reverse operating system and may work in conjunction with a position of ignition switch 42 to allow the blades of mower deck 26 to continue to operate even when vehicle 510 is operated in the reverse direction.

Referring again to FIG. 31, processor 580 is also in electrical communication with calibration switch 68, which permits reprogramming of processor 580. Optional speed sensors 56L and 56R are available to provide speed information for each axle shaft 14.

In the second embodiment circuit shown in FIG. 31, an RLC circuit (not numbered) is included between the processor 580 and the various inputs to act as a filter.

Figure 32:
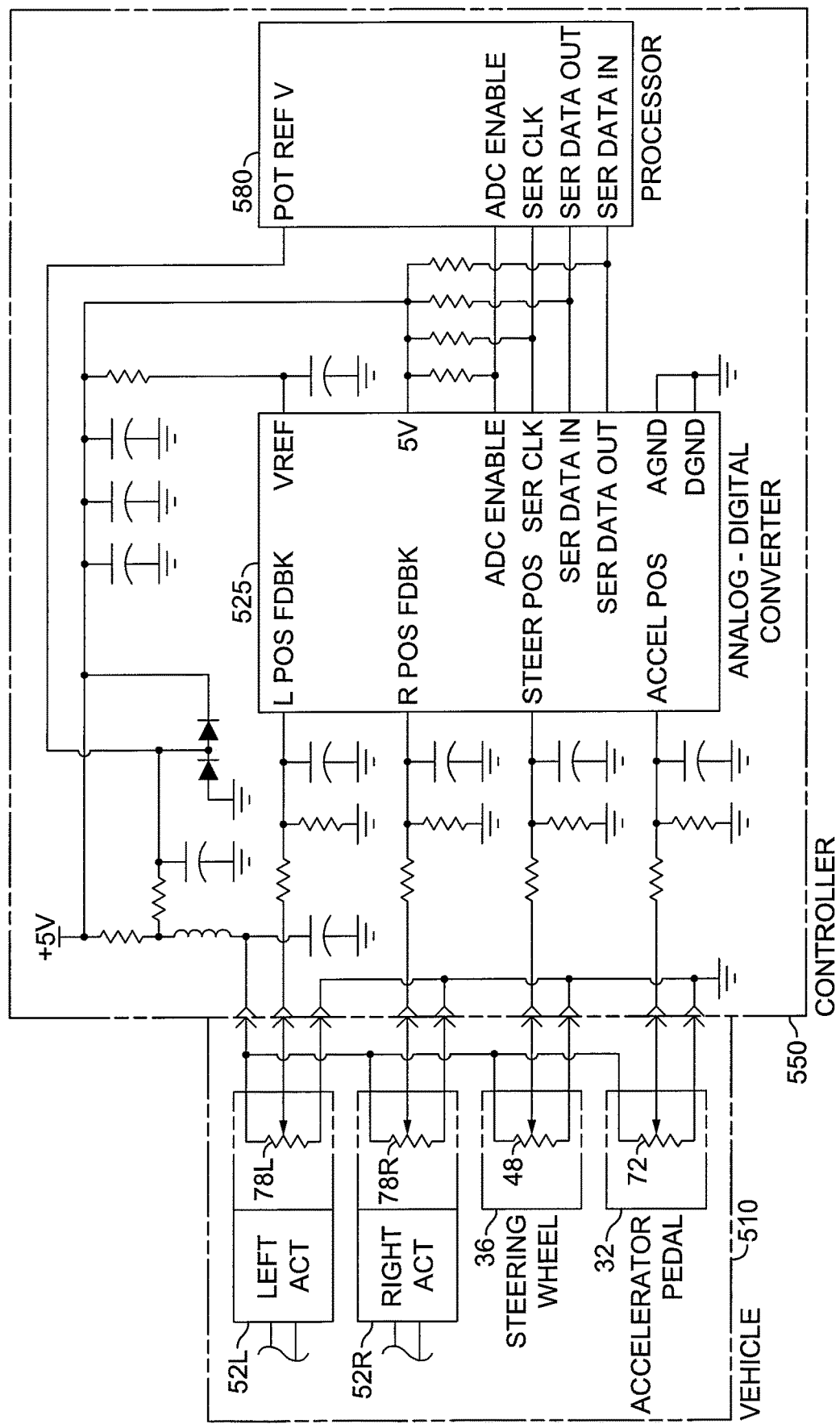
FIG. 32 is a schematic of one portion of the second embodiment drive control system showing some sensor inputs to the drive control system processor.

FIG. 32 illustrates inputs to processor 580 that are directly involved in the movement of actuators 52L and 52R. Accelerator pedal 32 is associated with a sensor in the form of potentiometer 72 that provides information to processor 580 regarding the desired direction and speed of vehicle 510. Steering wheel 36 is associated with steering position sensor 48 that provides information related to the direction and desired amount of steering to processor 580. Each actuator 52L and 52R is respectively associated with actuator feedback potentiometers 78L and 78R, which provide feedback to processor 580 so that processor 580 is able to determine when each actuator 52L and 52R has reached its expected position. In the second embodiment shown in FIG. 32, an analog-to-digital converter 525 is provided between the inputs and processor 580.

Figure 33:
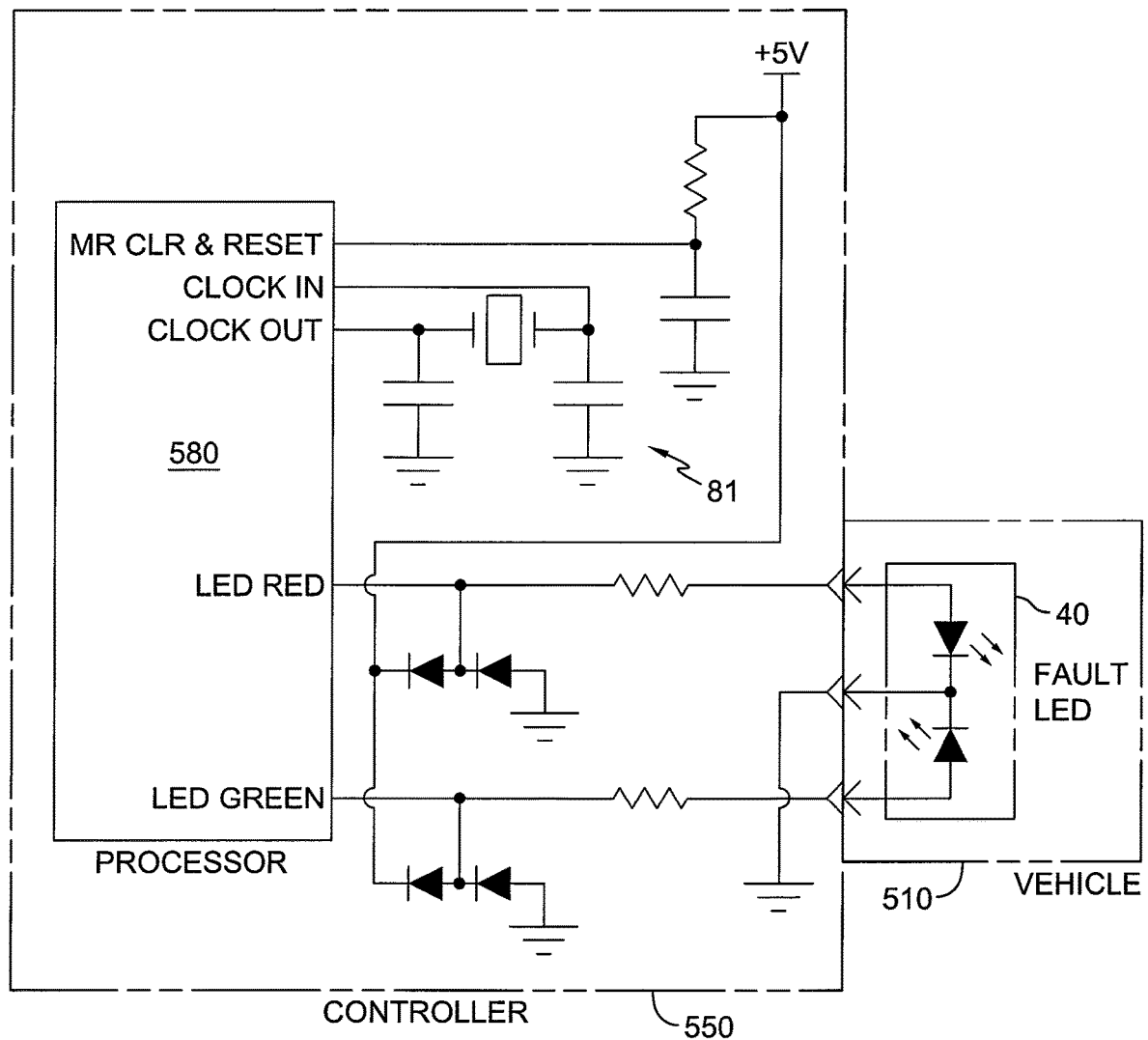
FIG. 33 is a schematic of one portion of the second embodiment drive control system showing an optional processor clock and the outputs to an indicator light.

FIG. 33 illustrates an optional external clock 81 that controls the processing speed of processor 580. Processor 580 has an internal clock, but processor 580 is capable of higher processing speeds by using external clock 81. External clock 81 may be desirable in some circumstances where a particular vehicle requires a faster than usual response in order to maintain end user satisfaction. Also shown in FIG. 33 is the connection between processor 580 and indicator light or LED 40. Indicator light 40 may have colored output such as red and green to indicate the status of drive control system 530.

Figure 34:
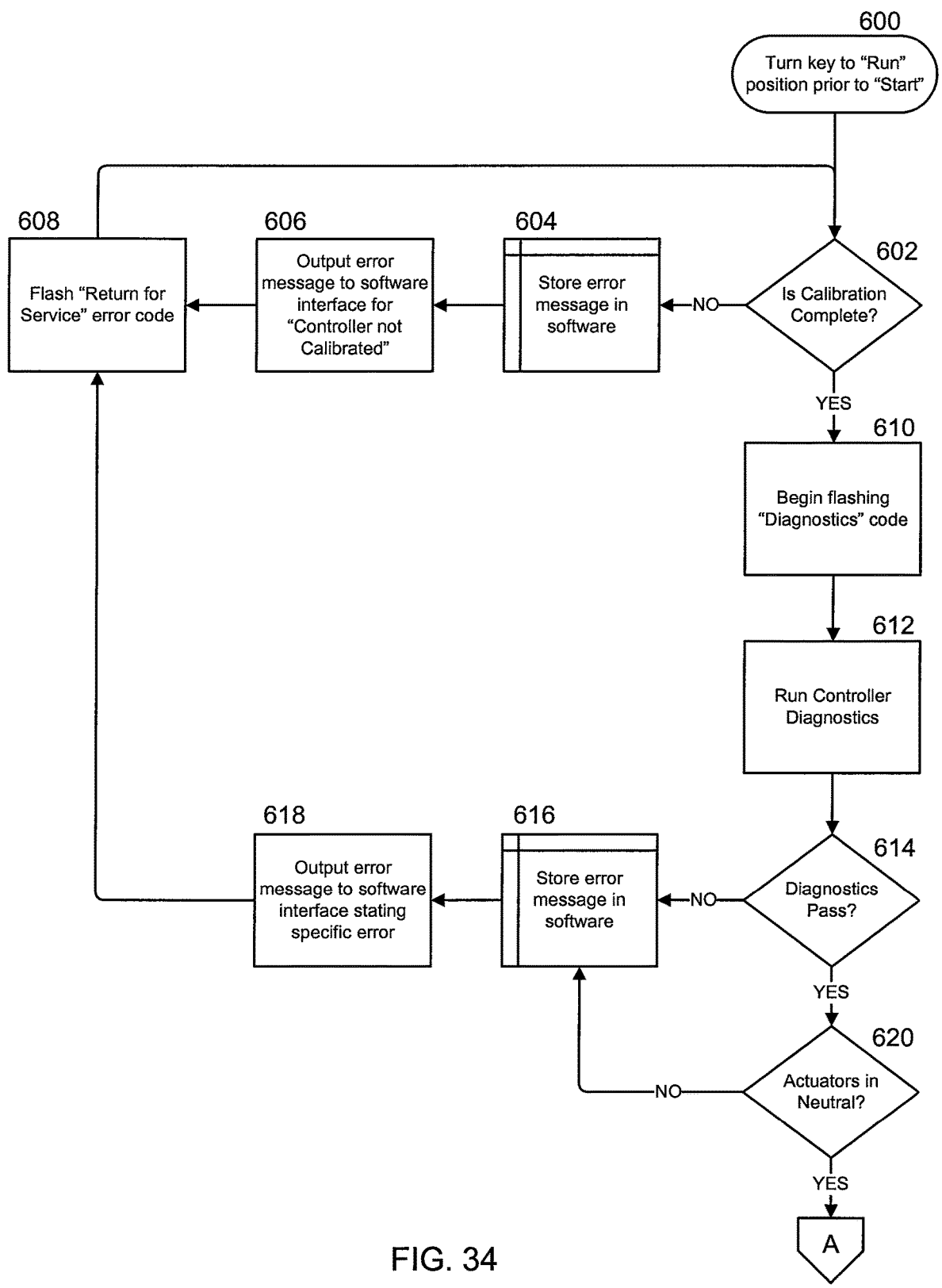
FIG. 34 is a flow chart of a control process of the second embodiment drive control system, showing representative diagnostics performed prior to allowing the vehicle to be started.

FIGS. 34 through 40 illustrate flow charts that describe the control functions and methods of the second embodiment in accordance with the principles of the present invention. When a vehicle operator turns ignition switch 42 from its off position to the run position, drive control system 530 begins to perform a series of diagnostics and tests. Prime mover 18 is not permitted to operate until diagnostics and tests are complete. As shown in FIG. 34, step 600 denotes movement of ignition switch 42 from the off position to the run position, which is the position of ignition switch 42 as shown in FIG. 27. Once processor 580 recognizes that ignition switch 42 has been moved to the run position, processor 580 checks to determine whether drive control system 530 has been properly calibrated at step 602.

Calibration of drive control system 530 includes establishing the limits of travel and the neutral position of actuators 52L and 52R, and is performed as a part of manufacturing or servicing of drive control system 530. Since this process occurs only during assembly and maintenance of drive control system 530, it is not illustrated in the attached figures. As part of the calibration process, processor 580 may check to determine whether the limits of travel and neutral position of actuators 52L and 52R are within expected limits. If the limits of travel and neutral position of actuators 52L and 52R exceed the limits anticipated by processor 580, then processor 580 may return an error code either through a programming interface (not shown) or through indicator light 40. Once drive control system 530 has been calibrated, a soft switch is actuated and stored in processor 580's memory that denotes calibration is complete.

If the soft switch indicates that calibration of drive system 530 has not been accomplished, then an error message is stored at step 604. At step 606, an error message is output to an interface to indicate that the controller is not calibrated. In a particular embodiment, the error message may be read using appropriate diagnostic equipment connected to the software interface (not shown) of drive system 530. At step 608, an error code is flashed, preferably via indicator light 40, in response to a signal that denotes that vehicle 510 needs to be returned to a qualified dealer for service. At this point, vehicle 510 is inoperable and an operator's only choice will be to return ignition switch 42 to the off position. However, it should be noted that this path of steps is available only in the unlikely event that the manufacturer installing drive control system 530 has failed to perform the proper calibration procedure.

At step 610, if the calibration-completed soft switch has been set, indicator light 40 flashes a code denoting the diagnostics mode of drive control system 530. At step 612, diagnostics of controller 550 are performed to verify that controller 550 is operating properly. As part of the diagnostics of controller 550, the position of each actuator 52L and 52R is determined. If actuators 52L and 52R are not in neutral, controller 550 attempts to drive actuators 52L and 52R into neutral. Once the diagnostics of controller 550 are complete, the status of the diagnostics is determined at step 614. If the diagnostics failed, an error message is stored at step 616. The error message is output to an interface stating the specific error at step 618. Indicator light 40 flashes to denote that vehicle 510 needs to be returned to a qualified dealer for service.

If drive control system 530 passes its diagnostic tests, drive control system 530 determines whether actuators 52L and 52R are in the neutral position at step 620. If actuators 52L and 52R are not in the neutral position and if drive control system 530 is unable to return actuators 52L and 52R to the neutral position, an error message is stored at step 616. The error message is output to an interface stating the specific error at step 618. Indicator light 40 flashes to denote that vehicle 510 needs to be returned to a qualified dealer for service.

Figure 35:
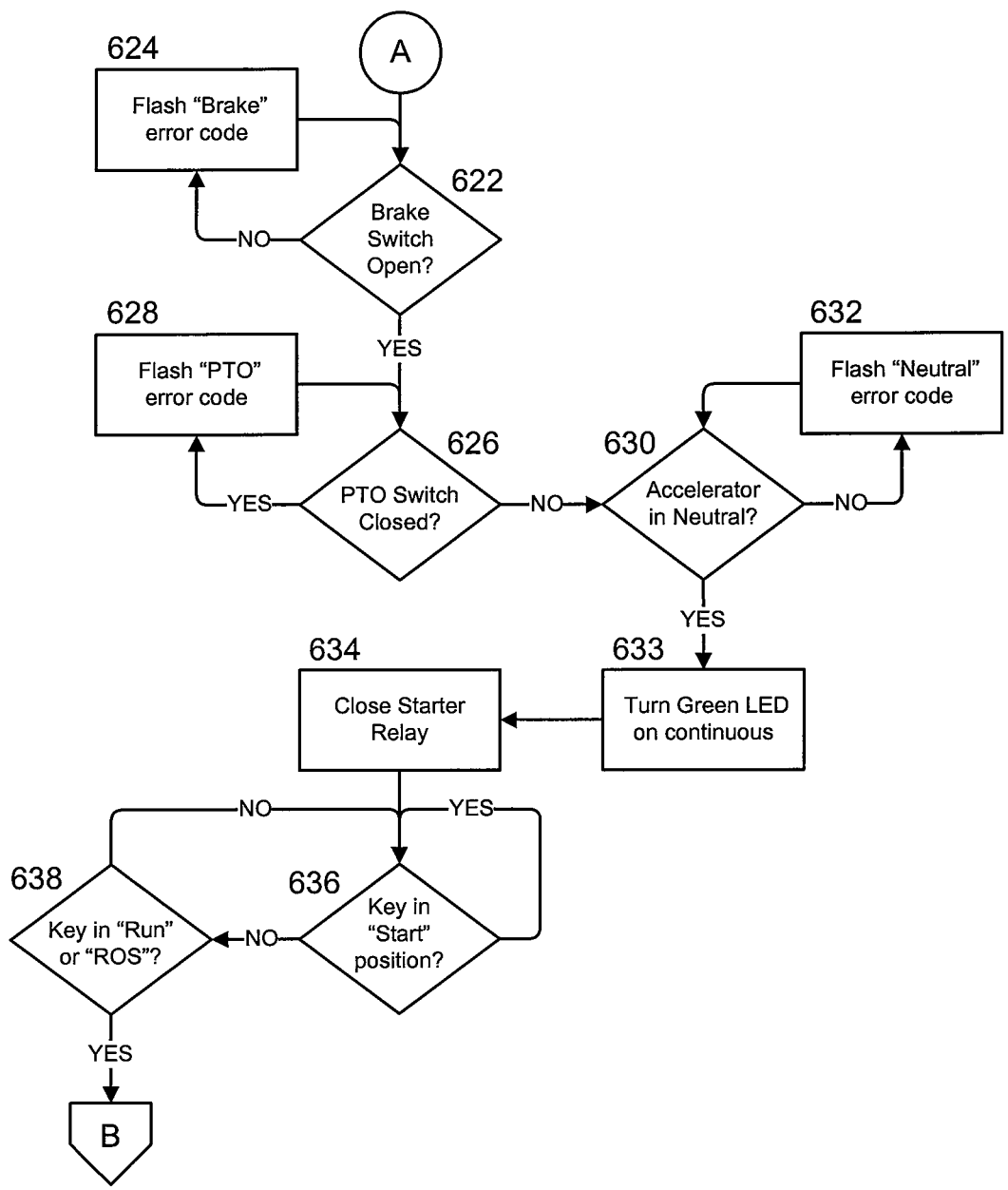
FIG. 35 is a flow chart of a control process of the second embodiment drive control system, showing further representative diagnostics performed prior to allowing the vehicle to be started as well as enabling of the starter.
Figure 36:
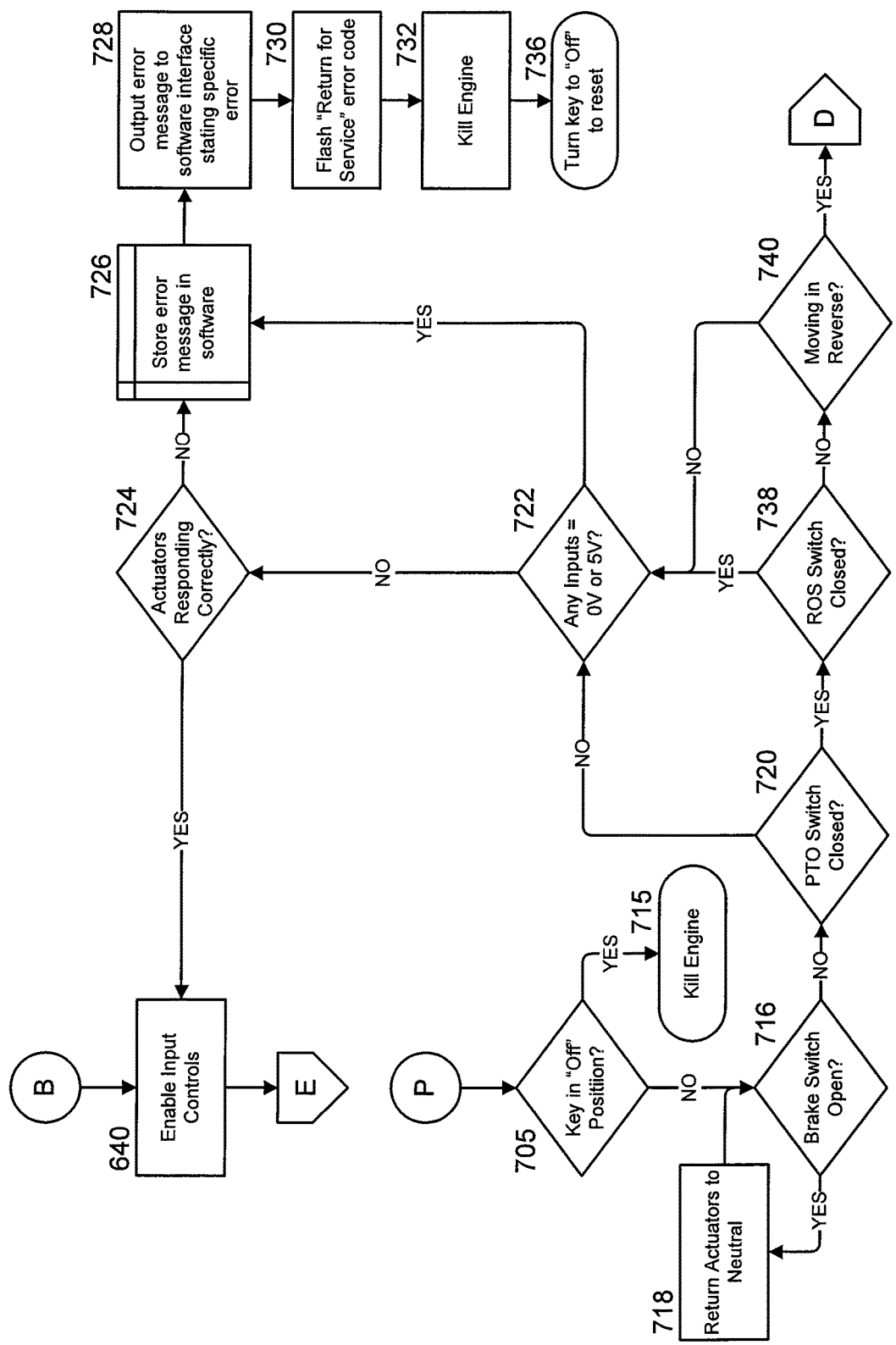
FIG. 36 is a flow chart of a control process of the second embodiment drive control system, showing diagnostics performed to determine whether to kill the prime mover or enable input controls.

If actuators 52L and 52R are in the neutral position, determination of the status of brake switch 66 is made at step 622 shown in FIG. 35. If brake switch 66 is closed, indicator light 40 flashes in a pattern to indicate that the brake pedal 34 needs to be actuated prior to starting at step 624. If brake switch 66 is open, which indicates that brake pedal 34 of vehicle 510 has been actuated, then the status of power take-off switch 44 is checked at step 626. If power take-off switch 44 is closed, which indicates that the mechanism that controls the blades of mower deck 26 has been actuated, then, at step 628, indicator light 40 flashes in a pattern to indicate that power take-off switch 44 needs to be deactivated.

If power take-off switch 44 is open, it is then determined at step 630 whether the accelerator is in the neutral position. The sensors or switches involved in this step may be located as a part of accelerator pedal 32 or its equivalent, actuators 52L and 52R, control arms 54, or other portions of vehicle 510 that are associated with changing the output of transmissions 12L and 12R. At step 632, if transmissions 12L and 12R are not in the neutral position, indicator light 40 flashes in a pattern to indicate that vehicle 510 is not in neutral. Control then returns to step 630. This loop continues until vehicle 510 is returned to neutral or until ignition switch 42 is returned to the off condition.

If accelerator pedal 32 or a feature associated with accelerator pedal 32 is in neutral, a signal is sent to indicator light 40 to cause indicator light 40 to light with a color in accordance with step 633. In a particular embodiment, the color of indicator light 40 at step 633 is green. Now that drive control system 530 has determined that it is safe for vehicle 510 to be operated, drive control system 530 permits starter relay 58 to be actuated at step 634, which then enables starter solenoid 60 to operate when an operator moves ignition switch 42 to the start position. Starter solenoid 60 then causes prime mover 18 to operate, assuming that prime mover 18 is in a condition to be operable (i.e., contains fuel, oil, is mechanically sound, etc.). Under typical circumstances, an operator will release ignition switch 42, which is spring loaded to return to the run position. At step 636, a check is performed to determine whether the operator has released ignition switch 42 to the run position or if it is still in the start position. If ignition switch 42 is not in the start position, control moves to step 638. At step 638, if ignition switch 42 is not in either the run or ROS position, then control returns to step 636. This check remains in a control loop until ignition switch 42 is moved from the start position. If ignition switch 42 is in either the run or ROS position, then control moves to step 640, shown in FIG. 36.

Step 640 enables the input controls to processor 580. By enabling the input controls, processor 580 is able to receive input signals from the various components of drive control system 530. The inputs from steering wheel 36 and accelerator pedal 32 cause processor 580 to send signals to actuators 52L and 52R. Step 644 in FIG. 37 begins a series of steps that controls the movement and position of actuators 52L and 52R. These steps are detailed in FIGS. 36 to 40.

Figure 37:
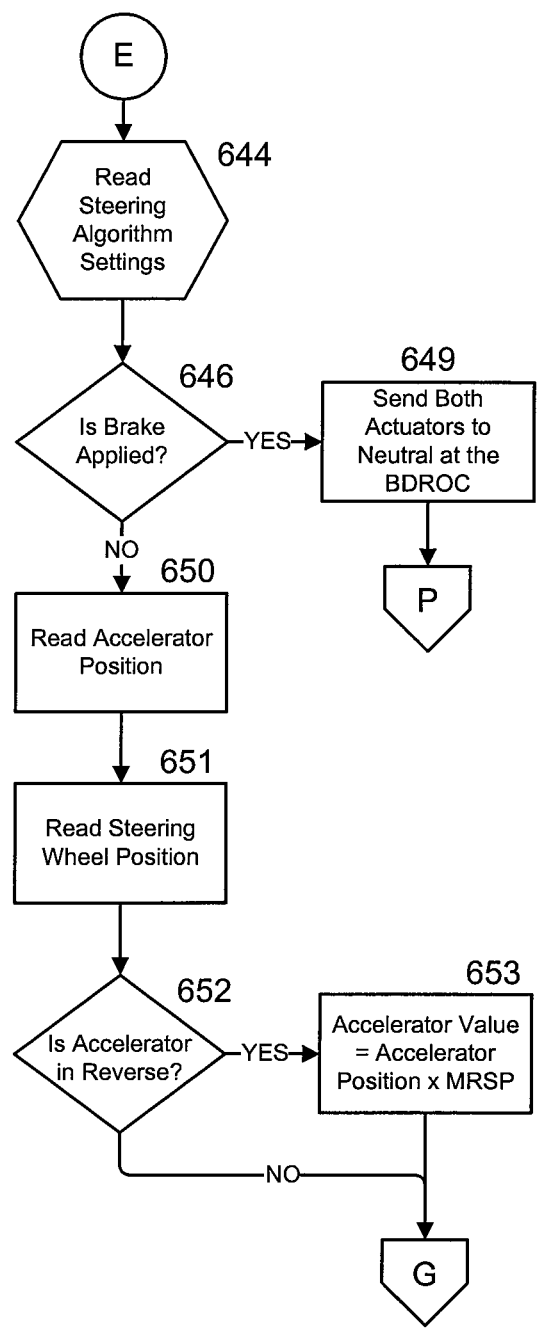
FIG. 37 is a flow chart of a control process of the second embodiment drive control system, showing a portion of the actuator control process.

At step 644, shown in FIG. 37, steering algorithm settings are read. In a particular embodiment, these settings are established during the programming of processor 580. These settings may include the speed at which actuators 52L and 52R respond, the maximum speed of transmissions 12L and 12R, the maximum speed of deceleration when brake pedal 34 is actuated or accelerator pedal 32 is released to return to the neutral position, and the acceleration permitted in the transition from the zero-turn mode of operation (i.e., a pure turning mode without any significant forward or reverse progression of the vehicle) to full forward speed. Other operating settings may be established in a table or may be adjustable with operator selectable input.

After the operating settings have been established, it is determined at step 646 whether brake pedal 34 has been actuated. If brake pedal 34 has been actuated, actuators 52L and 52R are returned to neutral at the brake deceleration rate of change (BDROC) at step 649. After step 649, control is returned to step 705 in FIG. 36 (which will be explained in more detail, below). If the brake of vehicle 510 is not applied, which in this embodiment means that brake pedal 34 is not depressed, then control passes from step 646 to steps 650 and 651. At steps 650 and 651, accelerator pedal 32 and steering wheel 36 positions are read and obtained, respectively. At step 652, it is determined whether accelerator pedal 32 is in reverse. If accelerator pedal 32 is in reverse, then the accelerator value is set equal to the accelerator position multiplied by the maximum reverse speed percent (MRSP) at step 653. The algorithm then proceeds to step 658 in FIG. 38. If accelerator pedal 32 is not in reverse, the algorithm proceeds directly to step 658 in FIG. 38.

At step 658, it is determined whether steering wheel 36 is either right or left of the neutral position. If left of neutral, the algorithm proceeds to step 660, which sets the right actuator 52R as the master and the left actuator 52L as the slave. If steering wheel 36 is right of neutral at step 658, the algorithm proceeds to step 752, which sets the left actuator 52L as the master and the right actuator 52R as the slave. When the right actuator 52R is set as the master and the left actuator 52L is set as the slave at step 660, the algorithm proceeds to step 663, where the position of accelerator pedal 32 determines the master actuator position. At step 689, the master actuator is moved to reflect the position of accelerator pedal 32. At step 690, the new position of the slave actuator is calculated and the algorithm proceeds to step 692 in FIG. 39. When the left actuator 52L is set as the master and the right actuator 52R is set as the slave at step 752, the algorithm proceeds to step 755, where the position of accelerator pedal 32 determines the master actuator position. At step 757, the master actuator is moved to reflect the position of accelerator pedal 32. At step 758, the new position of the slave actuator is calculated and the algorithm proceeds to step 692 in FIG. 39.

At step 692, with steering wheel 36 positioned either left or right of neutral, it is determined whether the value of the steering wheel position (SWP) is less than or equal to the neutral dead band (NDB) value. If SWP is less than or equal to NDB, the algorithm proceeds to step 695, where the slave actuator's new position is set to the master actuator's set point (MASP) and the algorithm proceeds to step 703 in FIG. 38. If SWP is not less than or equal to NDB in step 692, the algorithm proceeds to step 696, where it is determined whether the value of SWP minus NDB is less than or equal to slave Equation 1 (SE1=(PSW/100)*(100−NDB)). If this value is less than or equal to SE1, then the algorithm proceeds to step 698, where the slave actuator's new position is set to slave equation 2 (SE2=MACP−{MACP*[AVCSP-NDB/SE1]}) and the algorithm proceeds to step 703 in FIG. 38. If this value is not less than or equal to SE1, then the algorithm proceeds to step 700, where the slave actuator's new position is set to slave equation 3 (SE3=MACP+{MACP*[1−{[AVCSP−NDB−SE1]/[1−SE1]}]}) and the algorithm proceeds to step 703 in FIG. 38.

Figure 38:
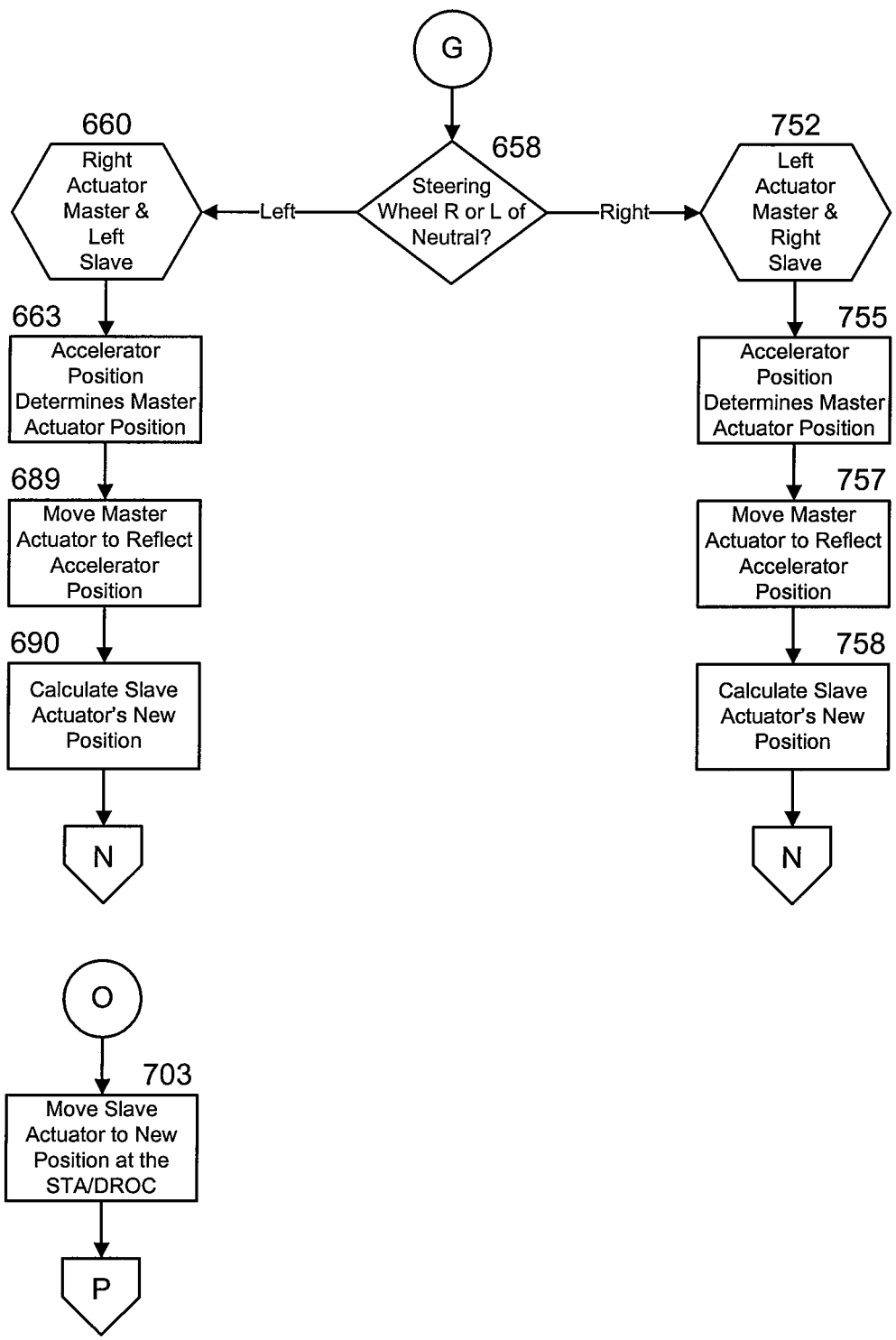
FIG. 38 is a flow chart of a control process of the second embodiment drive control system, showing a portion of the actuator control process.
Figure 39:
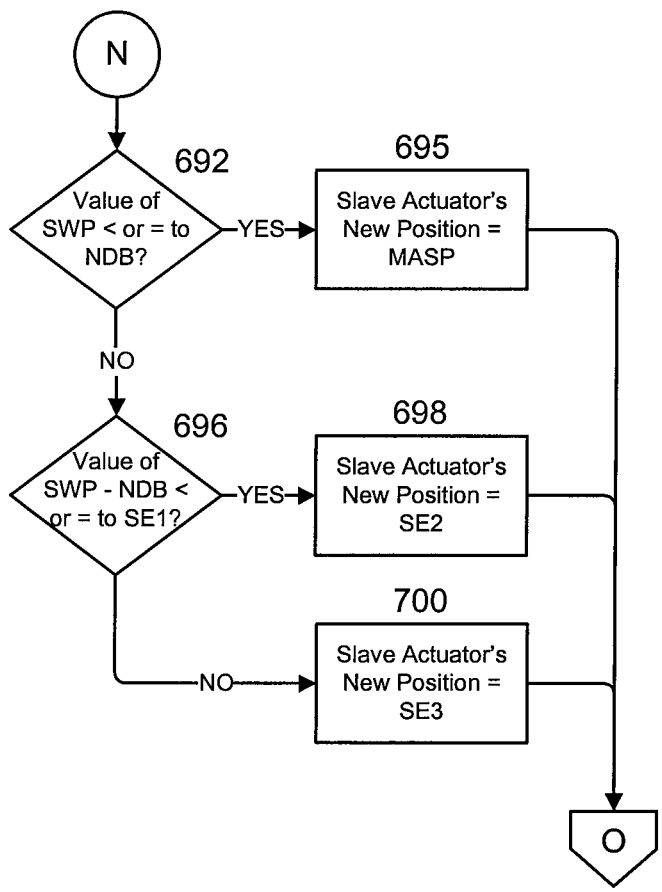
FIG. 39 is a flow chart of a control process of the second embodiment drive control system, showing a portion of the slave actuator control process.
Figure 40:
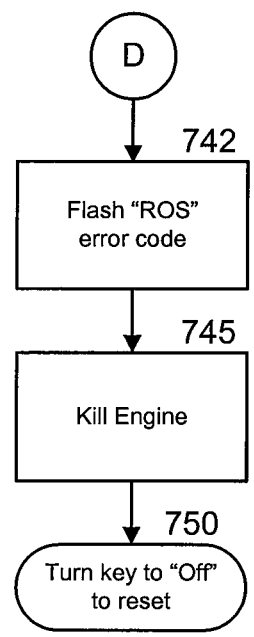
FIG. 40 is a flow chart of a control process of the second embodiment drive control system, showing shutdown of the vehicle due to a malfunctioning reverse operating system.

At step 703 in FIG. 38, the slave actuator is moved to the new position at the slave tire acceleration/deceleration rate of change (STA/DROC). The algorithm then proceeds to step 705 in FIG. 36.

At step 705, it is determined whether ignition switch 42 is in the OFF position. If ignition switch 42 is in the OFF position, then prime mover 18 is killed at step 715. If ignition switch 42 is not in the OFF position, it is then determined whether brake switch 66 is open at step 716. If brake switch 66 is open, actuators 52R and 52L are returned to neutral at step 718 and the algorithm returns to step 716. The loop between step 716 and 718 continues until brake switch 66 is closed or until ignition switch 42 is turned off. If brake switch 66 is not open, it is then determined whether PTO switch 44 is closed at step 720. If PTO switch 44 is not closed, it is then determined whether any inputs equal either 0 volts or 5 volts at step 722. If no inputs are either 0V or 5V, then it is determined whether the actuators 52R and 52L are responding correctly at step 724. If actuators 52R and 52L are responding correctly, then the algorithm returns to step 640, which enables the input controls. If actuators 52R and 52L are not responding correctly at step 724, then an error message is stored in software at step 726, an output error message stating the specific error is sent to the software interface at step 728, a "Return for Service" error code is flashed at step 730, and prime mover 18 is killed at step 732. To reset the system, ignition switch 42 is turned to the OFF position at step 736.

Returning to step 720, if PTO switch 44 is closed, it is then determined whether the ROS switch is closed at step 738. If the ROS switch is closed, the algorithm proceeds to step 722 as previously described above. If the ROS switch is not closed, then it is determined whether vehicle 510 is moving in reverse at step 740. If vehicle 510 is not moving in reverse, then the algorithm proceeds to step 722 as previously described above. If vehicle 510 is moving in reverse, then the algorithm proceeds to step 742 in FIG. 40. At step 742, the 'ROS' error code is flashed, and prime mover 18 is killed at step 745. To reset the system, ignition switch 42 is turned to the OFF position at step 750.

Figure 41:
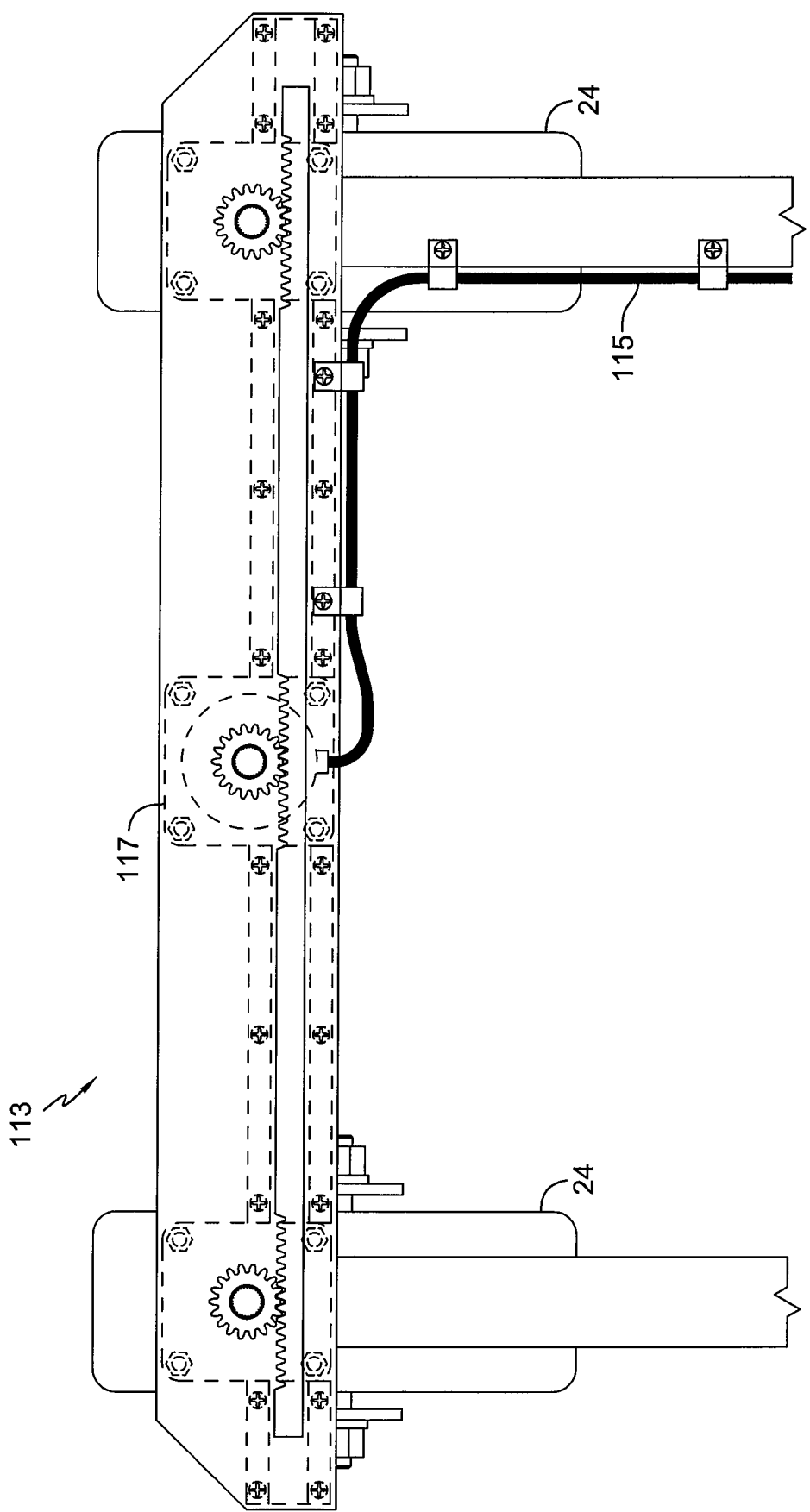
FIG. 41 is a top plan view of a first embodiment of an optional steering mechanism for the caster wheels of the vehicle shown in FIG. 1.

According to another aspect of the invention, there may be an advantage to providing steering for front casters 24. Casters 24 normally move in response to the action of transaxles 12L and 12R. However, there may be applications where a defined response of front casters 24 is desirable, such as when laterally traversing a sloped surface. One embodiment of a front steering mechanism is shown in FIG. 41, which is in the form of a rack and pinion assembly 113. A wiring harness 115 attaches to electric steering motor 117. Drive control system 30 or 530 may readily be modified to provide output to electric steering motor 117 in accordance with the principles of the present invention.

Figure 42:
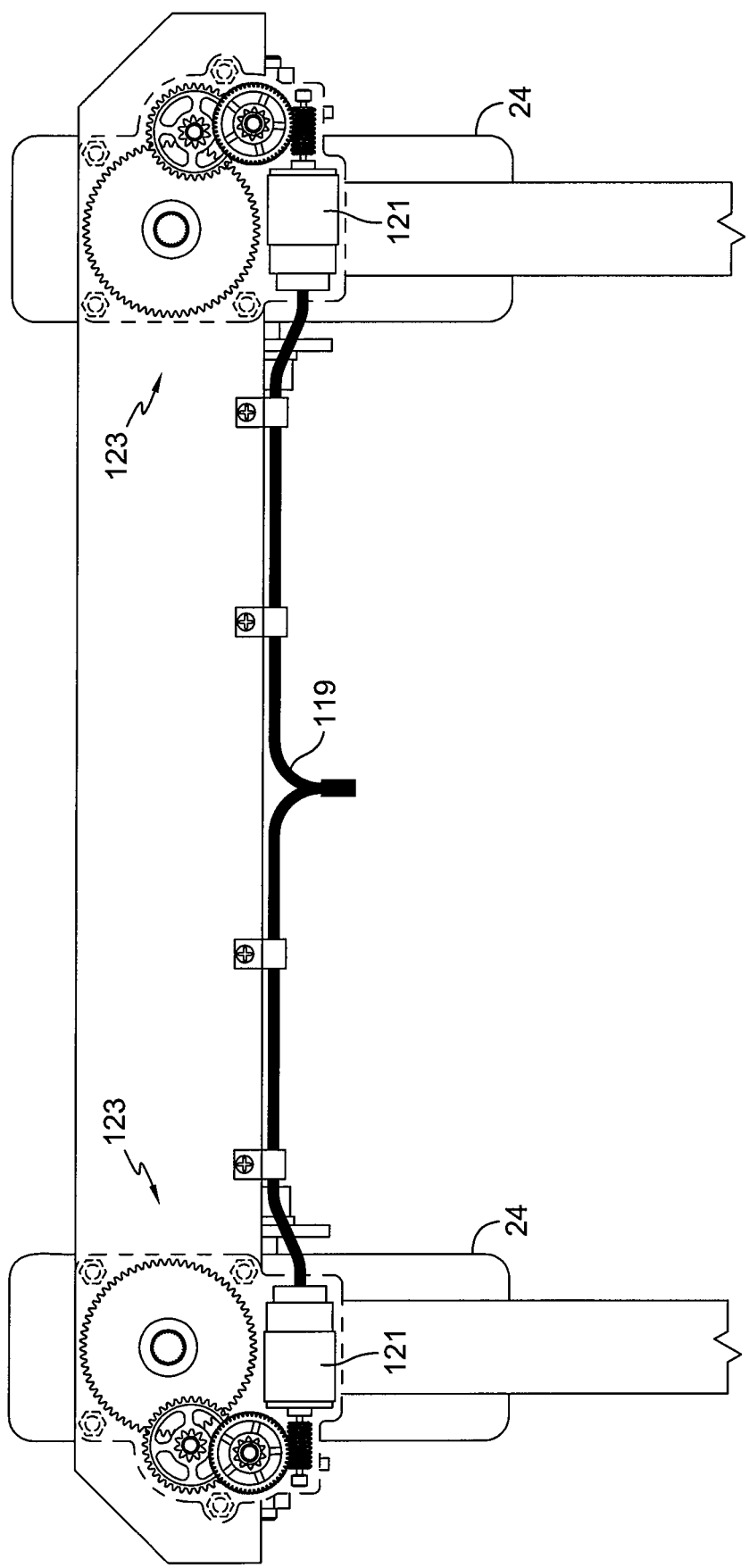
FIG. 42 is a top plan view of a second embodiment of an optional steering mechanism for the caster wheels of the vehicle shown in FIG. 1.

Casters 24 may be steered by other techniques. FIG. 42 shows an arrangement where electric drive motors 121 steer casters 24 through a plurality of reduction gears 123. Electric drive motors 121 are powered through wiring harness 119.

Figure 43:
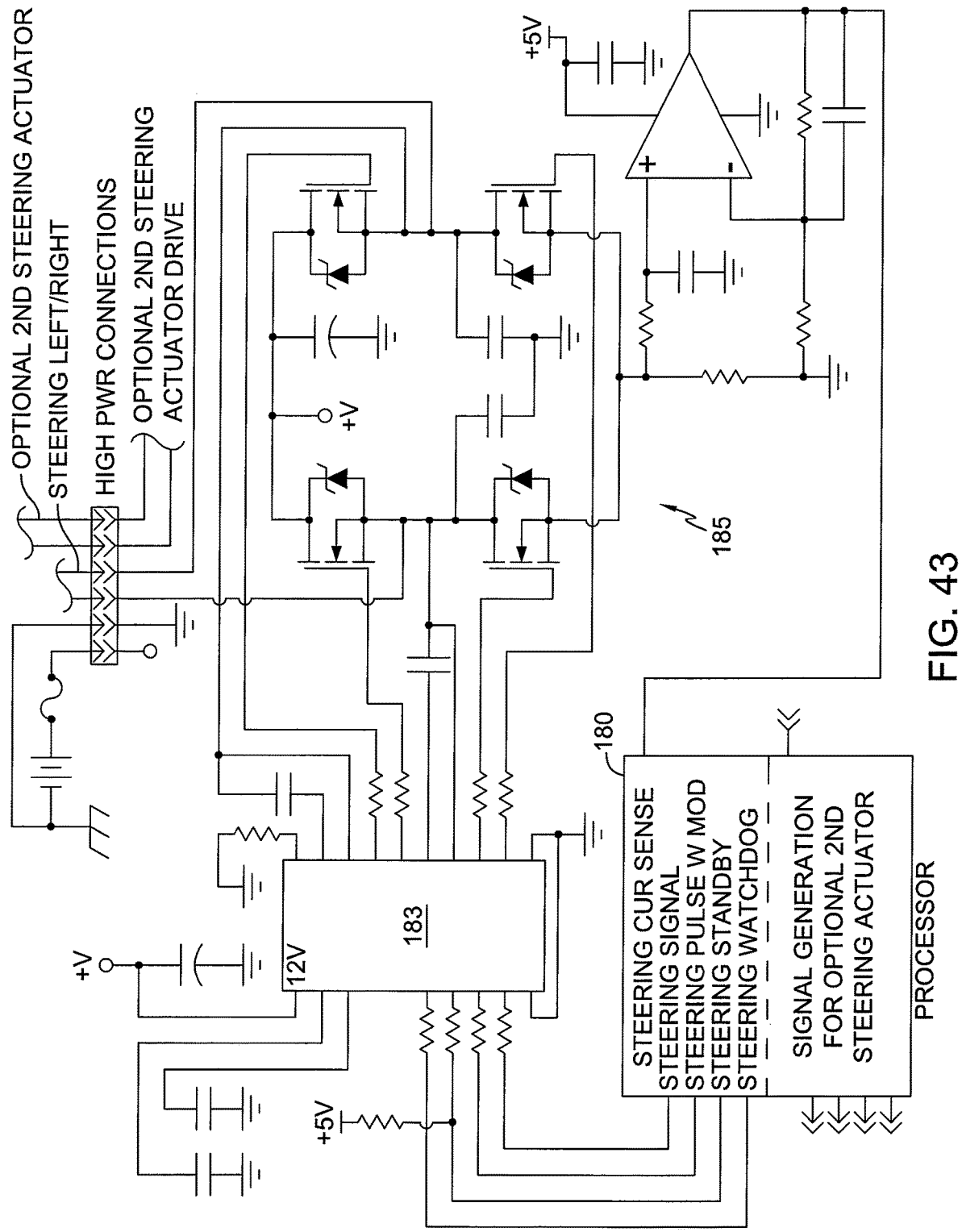
FIG. 43 is a schematic of one portion of the drive control system showing the drive circuits for an optional front caster steering mechanism.

In order to drive electric steering motor 117 or electric drive motors 121, drive control system 30 or 530 may readily be modified to incorporate a circuit similar to that of FIG. 43. A processor 180 is provided, which is similar to processors 80 and 580, except additional outputs have been provided to control a MOSFET driver 183, which then controls a MOSFET H-bridge 185. The function of this circuit would be similar to that of FIG. 8 and FIG. 29, and the control processes would provide a rate of movement proportional to the position of steering wheel 36, similar to the techniques used to position actuators 52L and 52R. In the configuration shown in FIG. 42, the control process would provide a radius of turning that is different for caster 24 at the inside of a turn as compared to caster 24 at the outside of a turn in order to provide a true steering track and improved steering control.

Figure 44:
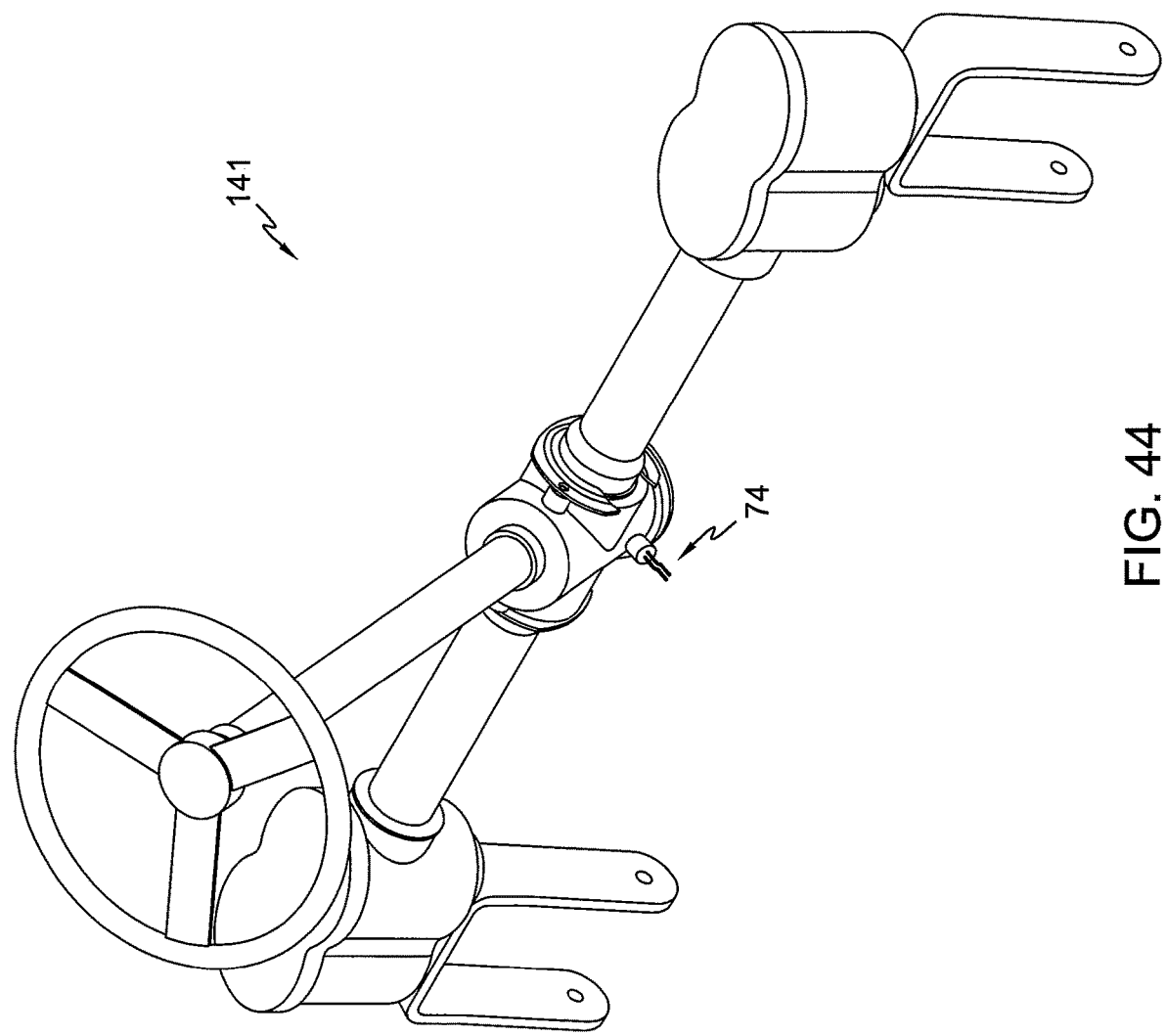
FIG. 44 is a perspective view of a third embodiment of an optional steering mechanism for the front caster wheels of the vehicle shown in FIG. 1.
Figure 45:
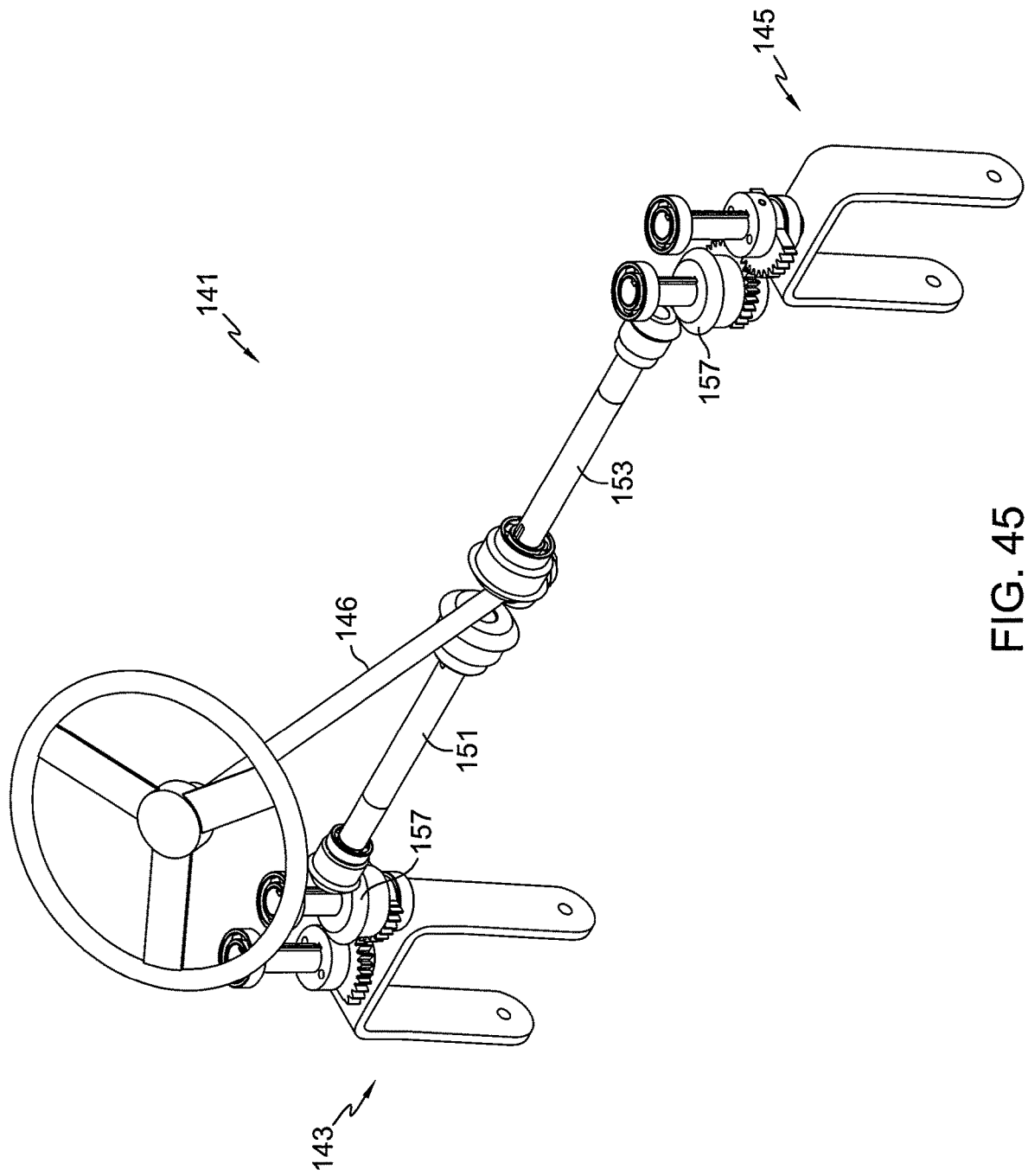
FIG. 45 is a perspective view of the third embodiment optional steering mechanism of FIG. 44 showing the gear mechanisms and linkages exposed.
Figure 46:
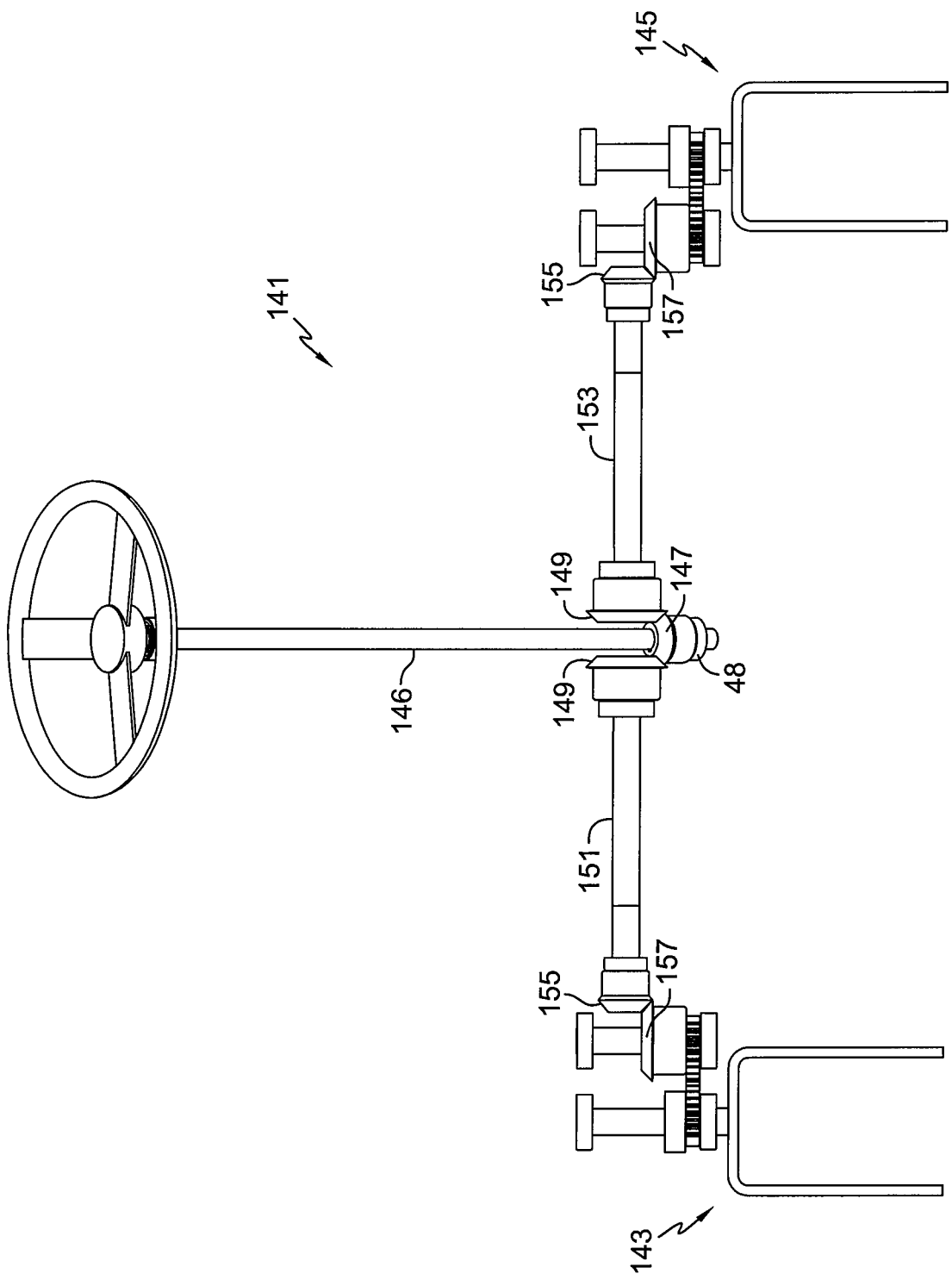
FIG. 46 is a rear elevation view of the third embodiment optional steering mechanism shown in FIG. 45.

FIGS. 44 through 46 illustrate an alternative embodiment of a front steering assembly 145 that can be incorporated either passively (i.e., without electrical integration with drive control system 30 or 530) or actively via integration with drive control system 30 or 530 by addition of circuitry, such as, for example, the circuit shown in FIG. 43. It should be noted that any mechanical front steering arrangement can be mechanically tuned or configured to "mechanically integrate" with drive control system 30 or 530. For example, the relative turning radii at given steering wheel 36 inputs and other control parameters of the drive control system 30 or 530 can be predetermined and the mechanical linkages of the front steering mechanisms can be tuned or configured mechanically to match or closely approximate the turning radii dictated by control of rear drive wheels 16.

As shown in FIGS. 45 and 46, front steering assembly 141 includes steering column shaft 146 having a beveled gear arrangement 147 that engages mating beveled gear arrangements 149 each respectively disposed on one end of a left linkage shaft 151 and a right linkage shaft 153. On the other end of each linkage shaft 151 and 153, a beveled gear arrangement 155 engages a respective intermediate gear arrangement 157, which in turn each links to its respective left caster assembly 143 and right caster assembly 145 (caster wheels not shown in the drawings).

As noted previously, there are circuits equivalent to that shown herein, and thus this description should not be read as limiting. For example, MOSFET H-bridge 185 could be replaced by two half bridges. Also, though processor 80, processor 180, and processor 580 are shown as single processors, multiple processors could readily share the processing tasks described herein. Additionally, one or more programmable logic controllers could be utilized, as well as other logic devices.

Another aspect of the present invention is illustrated in FIGS. 47-53, wherein various embodiments of a front steering module are depicted. For clarity, figure items related to the front steering module are labeled independent of prior numbering conventions, beginning with 1XXX-series numbers. Among FIGS. 47-53, similar elements in successive embodiments are labeled with sequential numerical prefixes. While the various embodiments all provide steering position signals to a drive control system governing a ZT vehicle's transmissions, such as drive control system 30 or 530, the embodiments vary in the manner in which front wheel steering is accomplished, being generally divided between mechanisms comprising direct mechanical linkages and those comprising steer-by-wire assemblages. It should be further noted that the front steering module is compatible with any electronic drive control system for a ZT vehicle whose processor integrates steering position signals with other system feedback to exercise control over drive system components. As such, subsequent references to drive control system 30 or 530 and/or similar systems are merely illustrative and not meant to limit application of the module disclosed herein.

In FIGS. 47-50, a first embodiment of a front steering module 1000 integrates a mechanical bevel and sector gear steering mechanism 1041 with a frame member 1022, a pair of front wheel assemblies 1024L and 1024R, shown as casters, a steering position sensor 1048, and a wiring harness 1019. It should be understood that several gearbox housings and their associated bearing supports have been removed from these figures for clarity. While the first embodiment incorporates bevel and sector gear arrangements, it is to be understood that other steering mechanisms may be similarly integrated into the module. Subsequent embodiments demonstrate a mechanical cable steering mechanism 1141 in FIGS. 51 and 52 and steer-by-wire reduction gear mechanisms 1241L and 1241R in FIG. 53. These embodiments are merely illustrative of the present invention and are not meant to be limiting, as various steering mechanisms with direct or steer-by-wire configurations are contemplated herein. What these embodiments share, as will be detailed below, is the ability to exhibit zero-radius turn capability while providing steering position signals.

It should be noted that references to various "steering mechanisms" are understood to include not only the distinguishing components but the commonly depicted steering wheel, steering column, and steering column support. Furthermore, in addition to the commonly described steering wheel and column, an equivalent hand or foot-operated steering input device should be understood to fall within the scope of the present invention.

Figure 47:
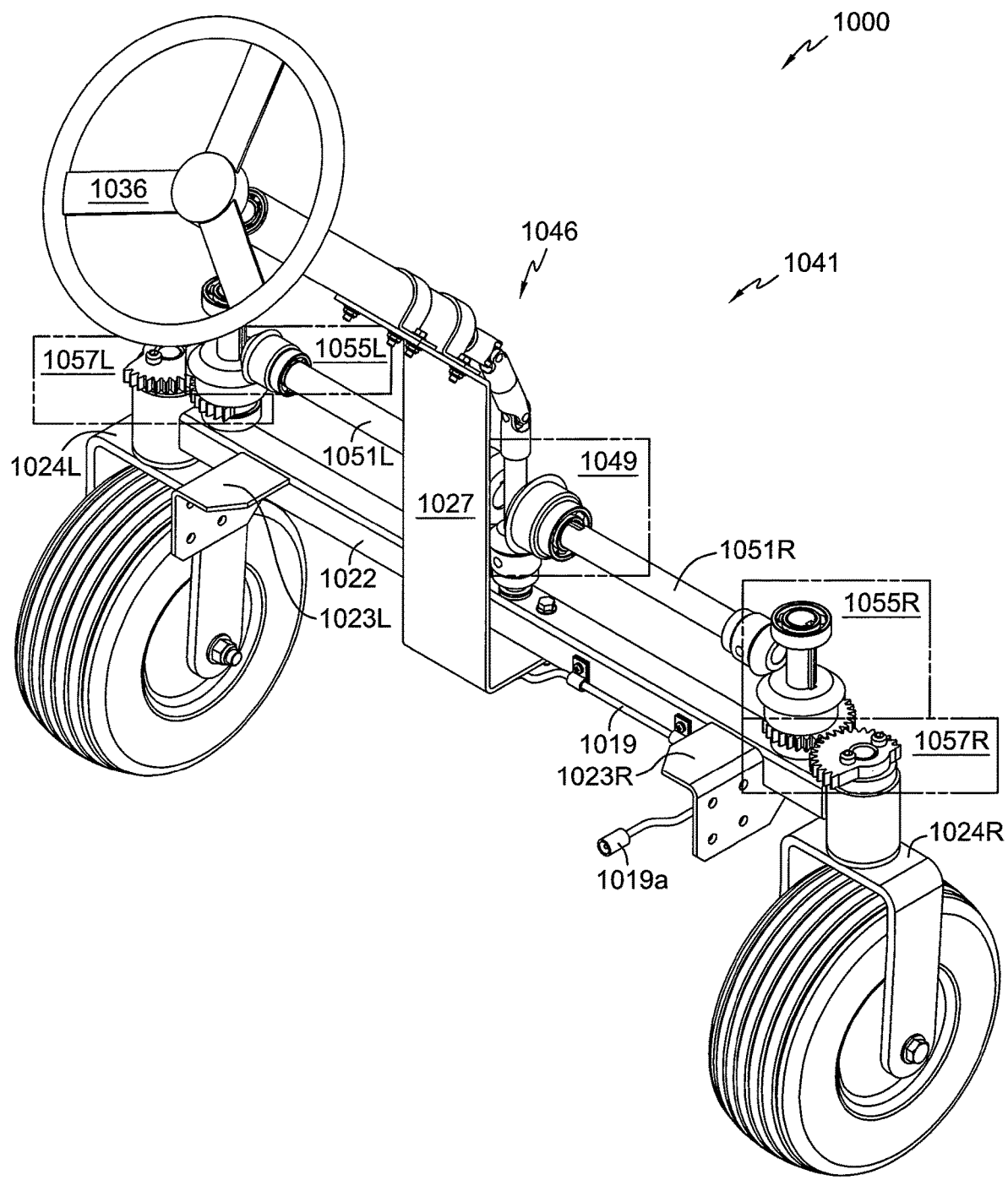
FIG. 47 is a perspective view of a first embodiment of a front steering module having a mechanical bevel and sector gear steering assembly.
Figure 48:
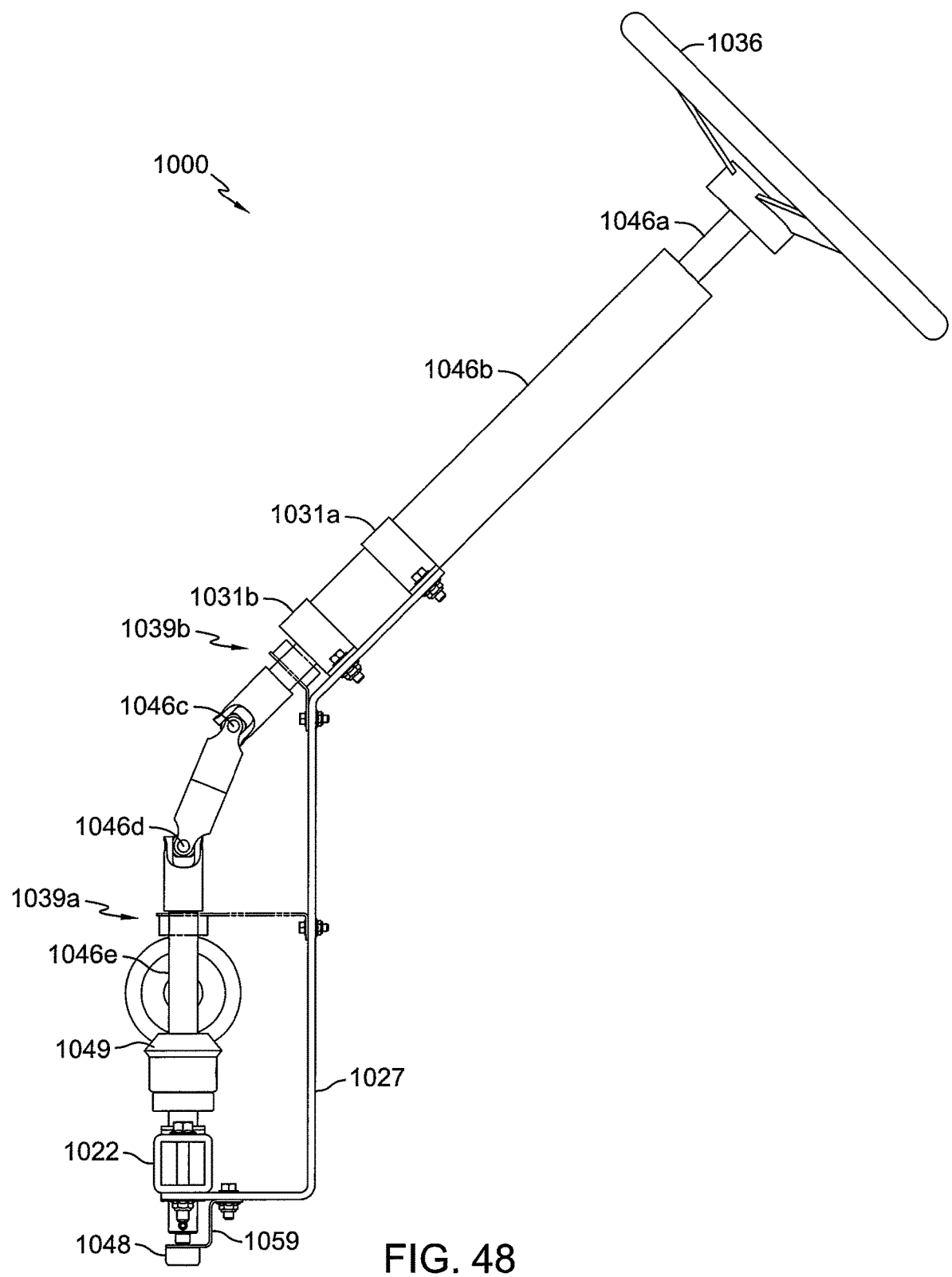
FIG. 48 is a left-side elevation view of the first embodiment of the module with certain elements removed for clarity.

In FIGS. 47 and 48, frame member 1022 includes mounting members 1023L and 1023R, whereby module 1000 may be fastened to the lateral frame members of a ZT vehicle's subframe (not shown), thereby forming the vehicle's front end. Mounting members 1023L and 1023R may be integrally formed with module frame member 1022 or may be attached thereto by yielding fasteners or other conventional means. Mounting members 1023L and 1023R are preferably attached to a vehicle subframe by fasteners, permitting integration with a fully finished subframe of a vehicle. However, that attachment may be made by welding or any other known method of joining components.

Figure 52:
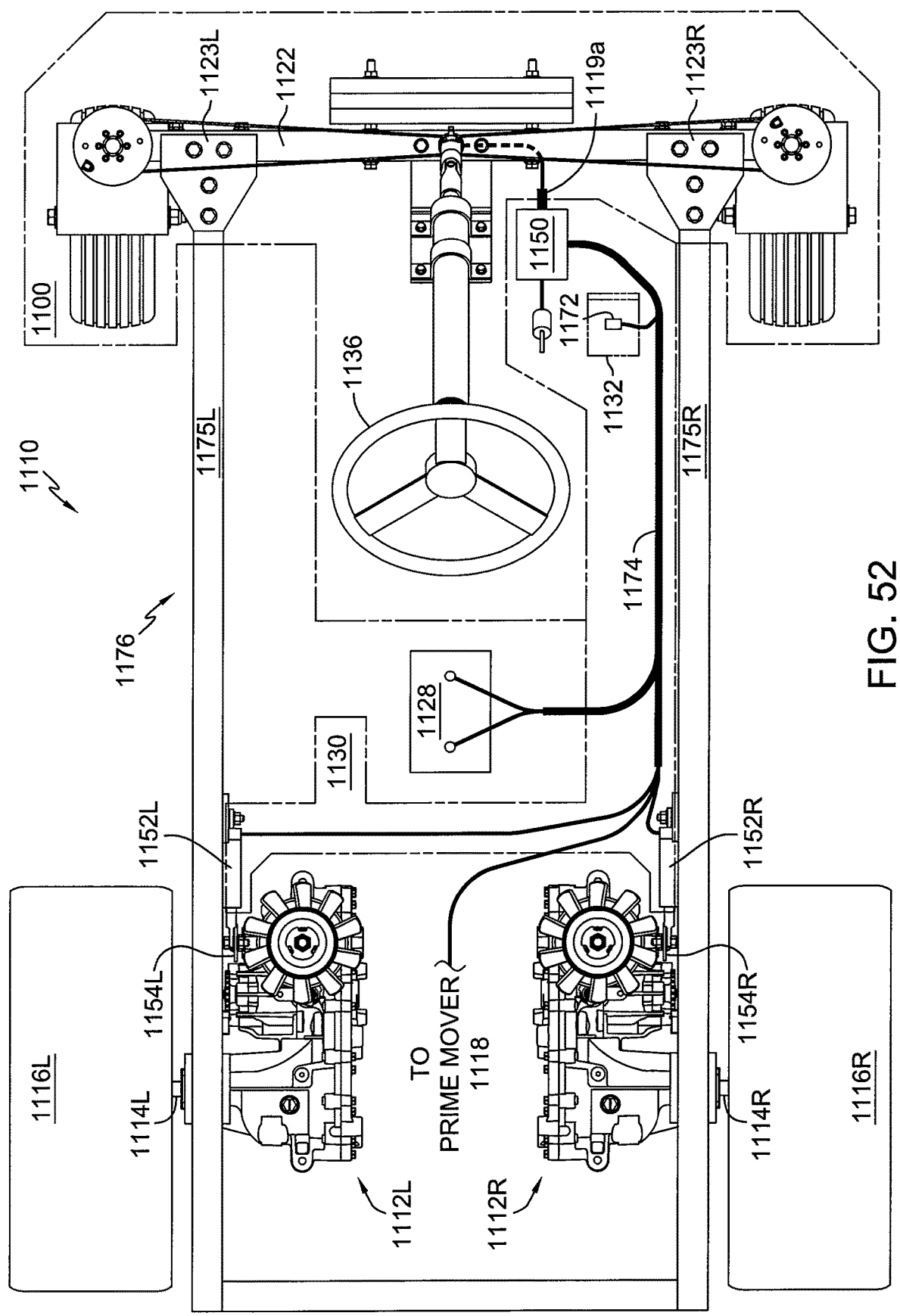
FIG. 52 is a top plan view of a vehicle that incorporates the second embodiment of the module with certain elements removed for clarity.
Figure 53:
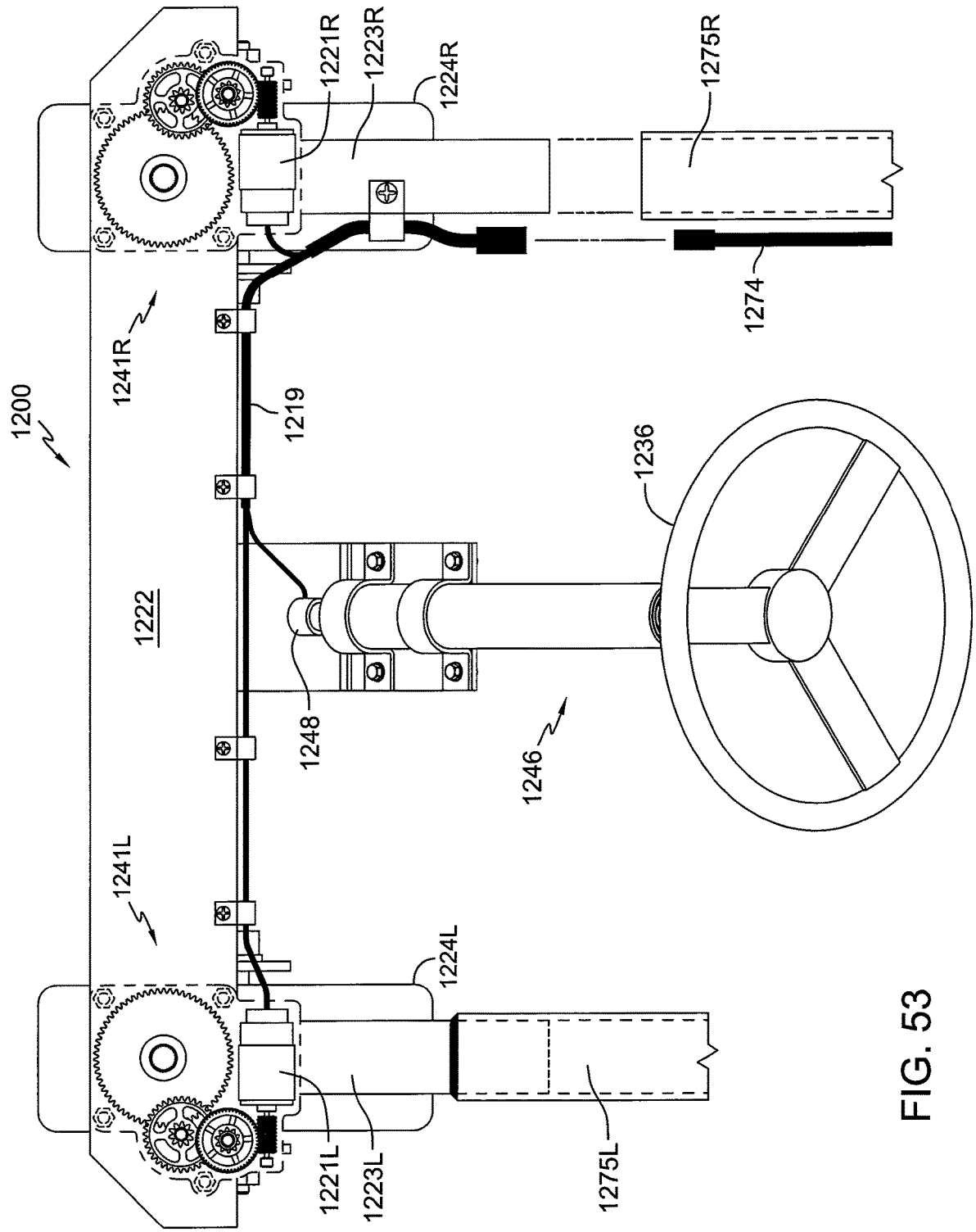
FIG. 53 is a top plan view of a third embodiment of a front steering module having steer-by-wire reduction gear mechanisms.

An alternate embodiment for mounting members 1123L and 1123R is shown in FIG. 52. Yet another embodiment of the mounting members is shown in FIG. 53, wherein the mounting members are box frame members 1223L and 1223R, which are insertable into vehicle frame members 1275L and 1275R.

Steering column support 1027, affixed at its base to frame member 1022, permits mounting of an articulated steering column 1046 comprising upper steering shaft 1046a, bearing support/cowling 1046b, universal joints 1046c and 1046d, and lower steering shaft 1046e. Column mounting brackets 1031a and 1031b prevent rotation of bearing support/cowling 1046b. Universal joints 1046c and 1046d allow an ergonomically appropriate angle for steering column 1046 to be established. Steering column support 1027 thus provides support for the rotatable attachment of the steering column 1046 to frame member 1022.

Steering position sensor 1048, located at the base of lower steering shaft 1046e and held stationary by sensor bracket 1059, provides a signal via wiring harness 1019 to a controller (not shown) of a drive control system such as drive control system 30 or 530. Steering position sensor 1048 may be a potentiometer, Hall Effect sensor, or other device that can sense or signal a change in the rotational position of steering column 1046. The manner in which drive control system 30 or 530 processes steering position signals in conjunction with signals from various positional (accelerator) and feedback (actuators and axles) sensors to exercise operational control of a ZT vehicle's transmissions has been well described herein and will not be further detailed. The term "steering position" shall refer herein to the degree of rotation of the steering column about its axis. "Center" refers to the point of column rotation wherein the front wheels of the module lay parallel to each other and to the longitudinal axis of a vehicle incorporating the module (a turn angle of zero degrees). The Center position may correspond to a voltage lying at the midpoint of a working range of voltages representing steering position or other voltage value representing a condition when the front wheels are parallel to each other. FIG. 48 also shows alternate locations 1039*a* and 1039*b* for steering position sensor 1048 along steering column 1046. It should be understood that other satisfactory locations along steering column 1046 exist, wherein access to rotatable portions of the steering column allow mounting of steering position sensor 1048. Sensor bracket 1059, shown mounted to steering column support 1027, could alternatively be affixed to any stationary element in proximity of steering column 1046, such as bearing support/cowling 1046*b*. It should be further understood that steering position sensor 1048 may be used to relay the change in position of any rotating element of the steering mechanism found in the link between a steering input device and front wheel assemblies 1024L and 1024R, wherein "steering position" would more broadly define a comparable rotation of the selected element.

To ease integration of module 1000 with a ZT vehicle's drive control system, wiring harness 1019 is provided with connector 1019*a* permitting rapid connection with a mating connector from the drive control system (not shown) along the length of the vehicle's frame member. Alternatively, a wiring harness (not shown) that directly connects steering position sensor 1048 with the controller (not shown) of the drive control system may be utilized to eliminate the potential for signal loss across the connector. Regardless of configuration, the inclusion of the steering position sensor 1048 in front steering module 1000 enables the operator's steering input to the front wheels to be matched, via the various control processes of drive control system 30 or 530, by a corresponding output at the drive wheels. In a ZT mower, this minimizes any tendency of the drive wheels to plow the front wheels through the subject turf as the steering track is established.

Operator input provided to steering wheel 1036 works to rotate the various elements of articulated steering column 1046, thereby rotating primary bevel gear assembly 1049. Correspondingly, linkage shafts 1051L and 1051R rotate in opposite directions, acting on secondary bevel gear assemblies 1055L and 1055R to produce rotation of sector gear assemblies 1057L and 1057R, and ultimately, coordinated rotation of front wheel assemblies 1024L and 1024R.

For module 1000, and similarly for the successive embodiments depicted herein, front wheel assemblies 1024L and 1024R are preferably located proximate to opposing ends of frame member 1022, promoting vehicle stability; and, as applied to zero turn radius mowers, providing clearance for mid-mount mowing decks. Front wheel assemblies 1024L and 1024R are each pivotable about their respective vertical axes, sometimes referred to herein as their steering axes.

Figure 49:
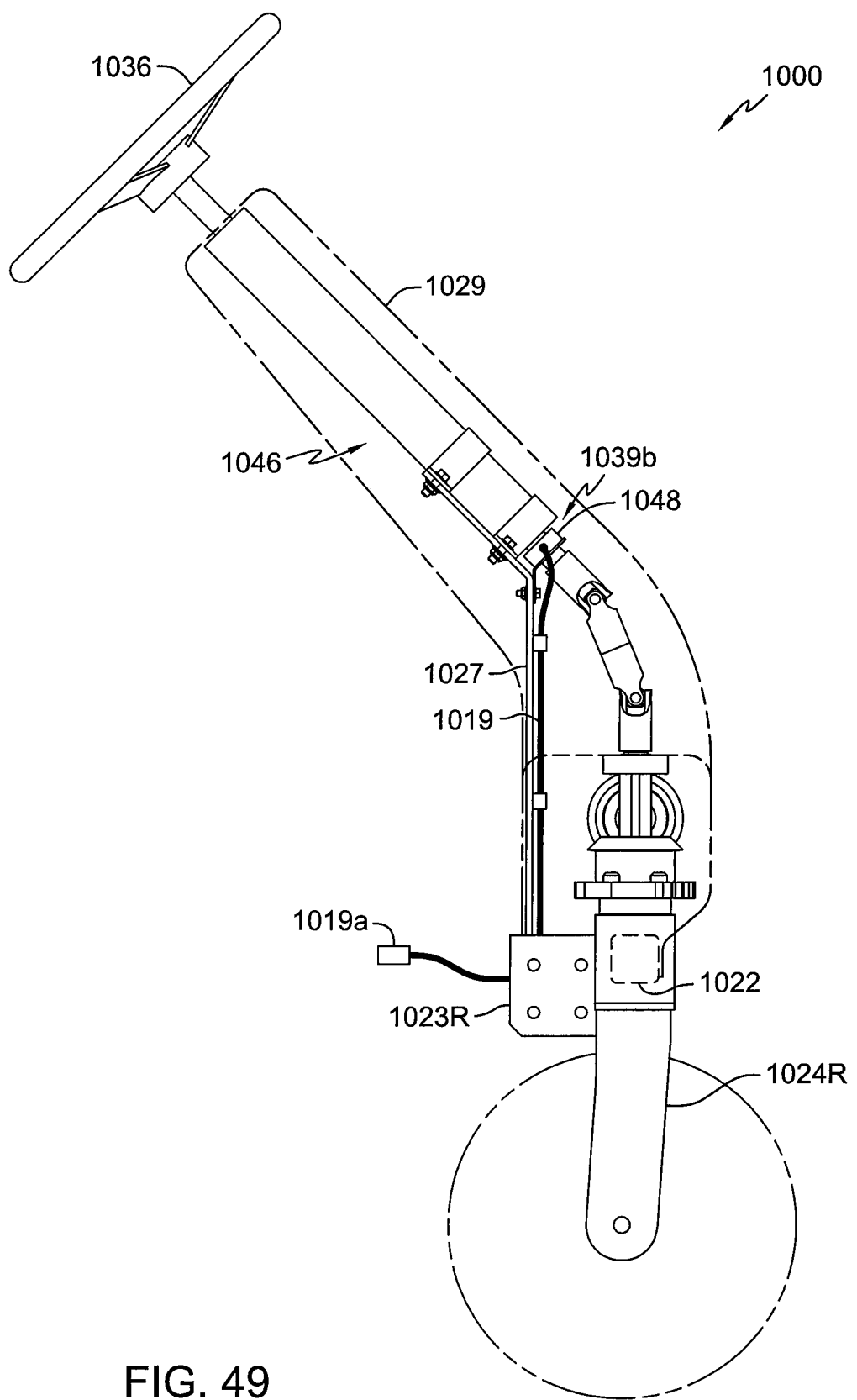
FIG. 49 is a right-side elevation view of the first embodiment with optional cowling.

As shown in FIG. 49, the various elements of front steering module 1000 can be protected from environmental debris by a cowling 1029, which may be removably attached to the frame 1022, steering column support 1027, and/or steering column 1046. This is particularly important in applications such as ZT mowers which can readily introduce grass clippings, dirt and other debris into their mechanical and/or electrical components. Relocation of steering position sensor 1048 to a more central location such as 1039*b* can also increase the protection of such components.

Figure 50:
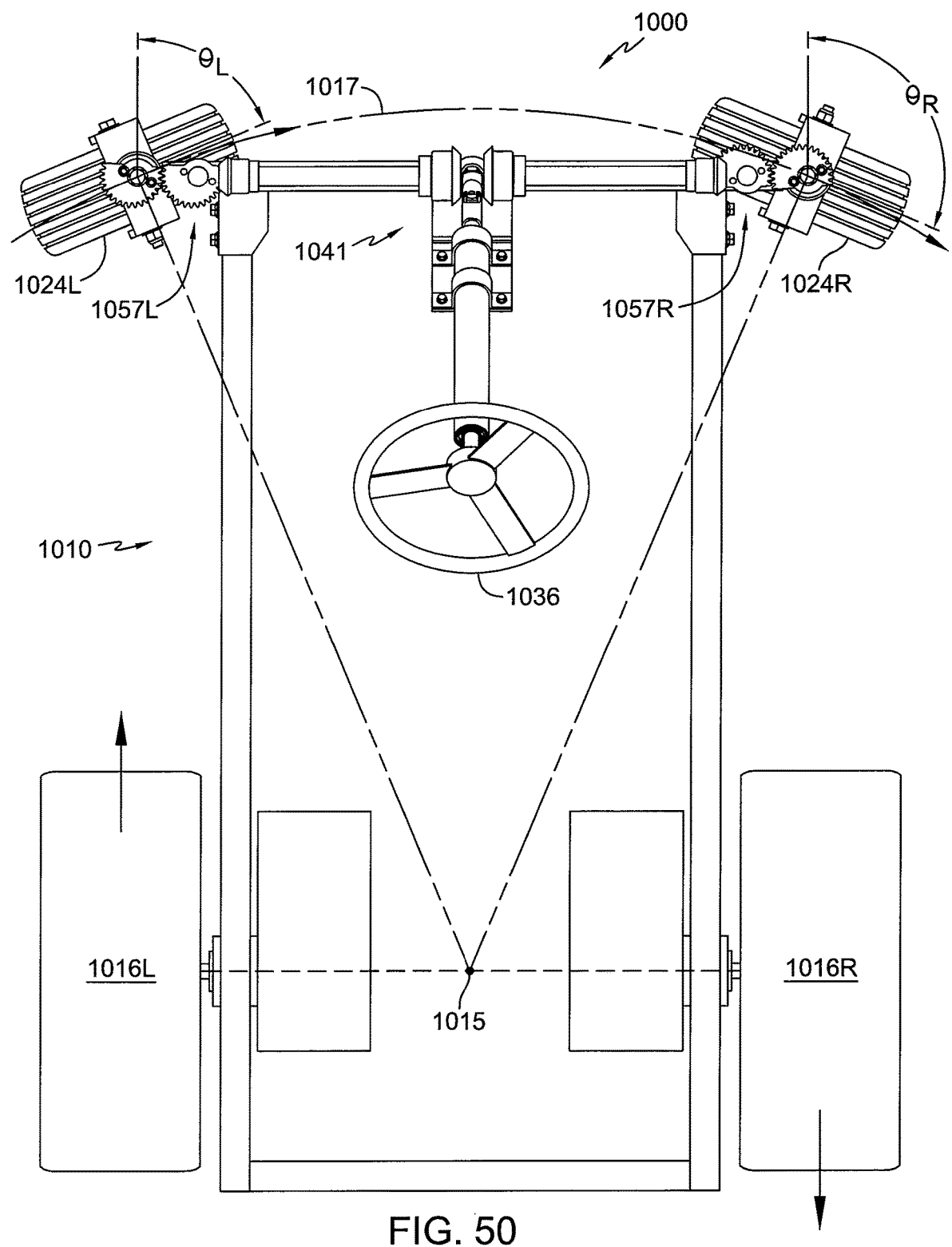
FIG. 50 is a top plan view of a stylized vehicle that incorporates the first embodiment of the front steering module demonstrating a zero-radius turn.

FIG. 50 illustrates the module's capacity to match the turning capability of a ZT vehicle, whereby a vehicle 1010 incorporating front steering module 1000 (shown with portions of secondary bevel gear assemblies, 1055L and 1055R removed for clarity) can, in the extreme, turn about a center of rotation 1015 situated midway along an axis between the vehicle's independently-driven rear wheels 1016L and 1016R as those wheels are driven in opposite directions. To achieve this capacity, the individual gears of sector gear assemblies 1057L and 1057R may have their axes of rotation offset from center, effectively creating variable radius sector gears that produce greater or lesser amounts of rotation for a given steering input depending upon which portions of the gears' circumferences are engaged. For steering mechanism 1041, using gears with axes of rotation offset from center, or in the alternative using noncircular gears or gears of variable pitch, produces an Ackerman effect, herein defined as the steering mechanism's ability to impart a greater turn angle to the wheel assembly lying on the inside of a turn than that imparted to the wheel assembly lying on the outside of the turn. Such techniques are generally known in the art and are not described in further detail herein. As applied here, progressively different turn angles are imparted to front wheel assemblies 1024L and 1024R by virtue of the same operator input to steering wheel 1036, whereby front wheel assemblies 1024L and 1024R exhibit progressively different turning radii until a zero-radius turn is achieved. It is to be understood that while the manner in which each successive embodiment of the present invention achieves zero-radius turn capability varies, the same progressive Ackerman effect is exhibited by each steering mechanism incorporated therein.

FIG. 50 demonstrates that in a clockwise zero-radius turn, the inside wheel assembly 1024R will ultimately be turned beyond 90 degrees of rotation from a forward position, turn angle $\theta_R$, while the outside wheel assembly 1024L is rotated less than 90 degrees, turn angle $\theta_L$, allowing both front wheels to track through a common arc 1017 about the center of rotation 1015. To execute a zero-radius turn in a typical ZT riding mower having a wheelbase of four feet and a track width of three feet, the inside turn wheel would need to exhibit a turn angle of approximately 110 degrees while the outside turn wheel would rotate approximately 70 degrees. Of course, these measures vary with the geometry of the vehicle and appropriately dimensioned gear sets can be tuned or configured to produce zero-radius turn capability in vehicles of different dimensions.

Figure 51:
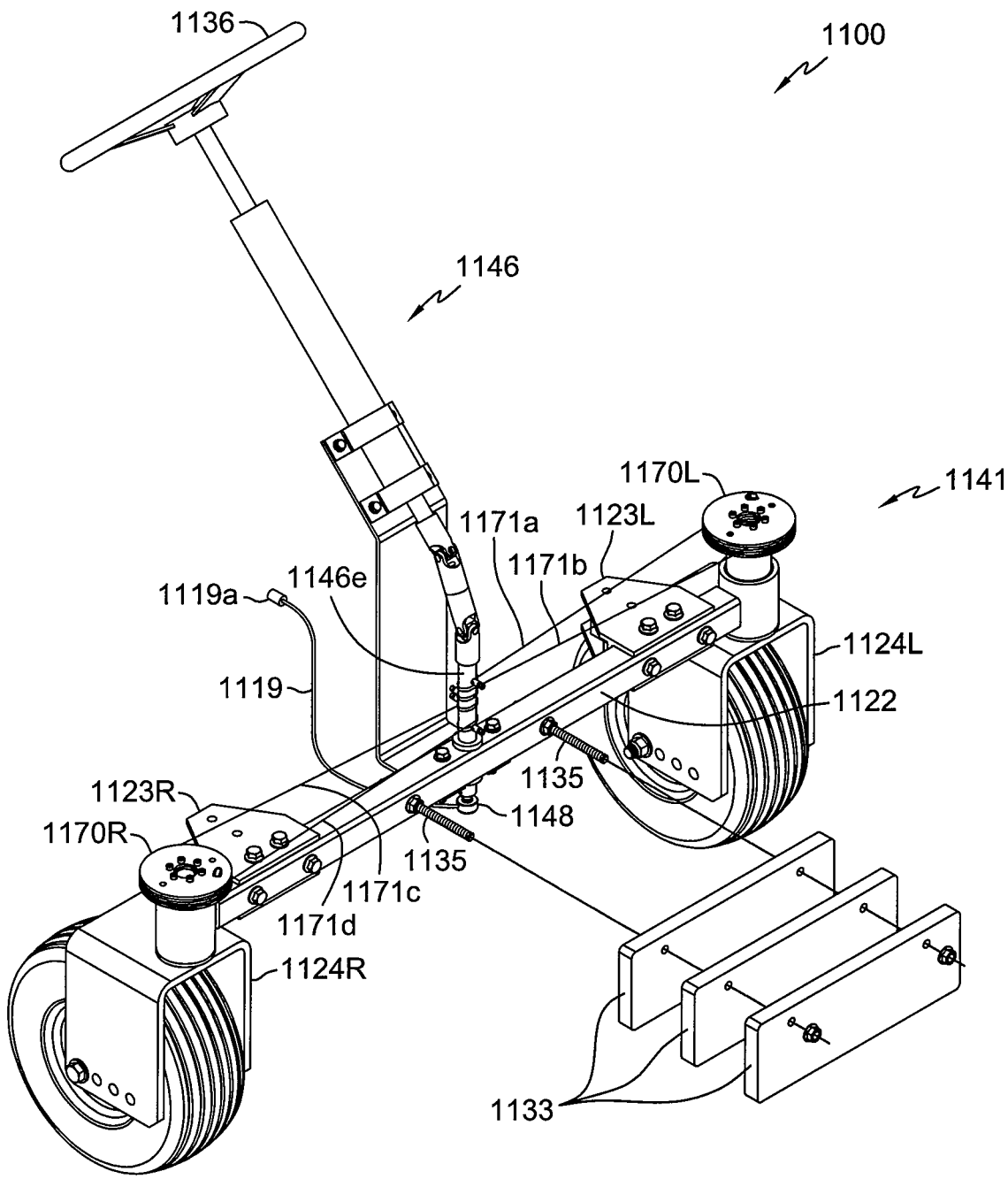
FIG. 51 is a perspective view of a second embodiment of a front steering module having a mechanical cable steering mechanism with optional weights.

FIG. 51 illustrates another embodiment of the front steering module 1100, here incorporating a mechanical cable steering mechanism 1141. The specific workings of a mechanical cable steering mechanism capable of zero-radius turns have been previously detailed in commonly owned Provisional U.S. Patent Application No. 60/973,831 filed on Sep. 20, 2007, the terms of which are incorporated by reference herein, and shall only be described in brief.

Cam mechanisms 1170L and 1170R are non-rotatably mounted on the vertical steering axes of front wheel assemblies 1124L and 1124R respectively. Each cam mechanism features two cams (not shown) of continually varying radii such that progressively different degrees of rotation are imparted to front wheel assemblies 1124L and 1124R depending upon whether steering column 1146 is being rotated in a clockwise or counter-clockwise sense. Each pair of steering cables, (1171*a*, 1171*b*) and (1171*c*, 1171*d*), is simultaneously being wound about, and unwound from, their associated cam mechanisms and lower steering shaft 1146*e* as steering wheel 1136 is rotated. The progressively differential response of front wheel assemblies 1124L and 1124R to a given steering input permits front steering module 1100 to precisely track through clockwise or counter-clockwise zero-radius turns. Such improved tracking benefits turns of lesser degree as well.

As with steering mechanism, 1041 cable steering mechanism 1141, is integrated with a frame member 1122 containing mounting members 1123L and 1123R, a pair of front wheel assemblies 1124L and 1124R, a steering position sensor 1148, and a wiring harness 1119 having connector 1119*a*. Optional weights 1133 are adapted to mount to frame member 1122 via a weight mounting receptor shown in FIG. 51 as threaded mounting bolts 1135. Such weights may be used to reduce the tendency of a ZT vehicle's front end to lift or counter rotate under hard acceleration, on upslopes, or when additional loads are carried at the vehicle's rear end. The weights and mounting receptor depicted herein, whether by bolt or bracket, are merely illustrative as many such means are well known in the art. It is to be understood that the weights can be adapted for use by any of the embodiments described herein. Steering position sensor 1148, mounted at the base of lower steering shaft 1146*e* for illustration purposes only, provides a positional signal to the controller (not shown) of a drive control system such as drive control system 30 or 530. That signal is directly correlated to the degree of rotational input imparted by the vehicle's operator to steering wheel 1136, and correspondingly, the rotational positions of the front wheel assemblies 1124L and 1124R.

FIG. 52 shows front steering module 1100 integrated with a representative ZT vehicle subassembly having a prime mover 1118 and power source (12V battery 1128) to form vehicle 1110. Vehicle 1110 has electronically actuated transmissions and control processes similar to those previously described for vehicle 10. The transmissions depicted as driving vehicle 1110, transmissions 1112L and 1112R respectively, are of a configuration similar to the component zero-turn transmissions disclosed in U.S. Pat. No. 6,775,976, the terms of which are incorporated herein by reference. It should be noted, however, that the present invention may be used with any variable drive unit having a control arm receptive to electric actuation.

Mounting members 1123L and 1123R of frame member 1122 bolt to corresponding subframe members 1175L and 1175R to form the vehicle's frame 1176. Connector 1119*a* is mated to a corresponding connector on controller 1150, placing steering position sensor 1148 (as shown in FIG. 51) in electronic communication with a drive control system 1130 that can be similar in functionality to either drive control system 30 or 530. Thus integrated, front steering module 1100 provides both mechanical front end steering and electronic steering position signals. Consequently, an operator's designated front steering track, when communicated through steering wheel 1136 and reported to controller 1150 by steering position sensor 1148, is matched by the controlled output of the ZT vehicle's transmissions 1112L and 1112R.

As similarly described for vehicle 10, output signals from controller 1150 containing operational parameters are transmitted via wiring harness 1174 to thereby direct linear actuators 1152L and 1152R to independently alter the position of the transmissions' control arms 1154L and 1154R, thereby varying the speed and/or direction of each transmission's output. (The teachings of U.S. Pat. No. 6,775,976 indicate that rotation of a transmission's control arm adjusts the position of an internal swash plate which controls the direction and amount of fluid flow from the transmission's hydraulic pump to its hydraulic motor.) As a result, axles 1114L and 1114R transmit power independently to drive wheels 1116L and 1116R, producing drive wheel steering along the operator's designated track.

The array of potential responses from drive control system 1130 to signals from steering position sensor 1148, a position sensor 1172 associated with accelerator 1132 and, as optionally required by vehicle demands, axle speed sensors (not shown), a brake switch linked to a brake pedal (not shown), actuator feedback sensors (not shown), and/or sensors linked to a forward/reverse selector (not shown) have been described at length herein for drive control systems 30 and 530, and are not further detailed herein. Regardless of the specific functionality inherent to drive control system 1130, front steering module 1100, as a unit, provides essential steering input signals to controller 1150 and matched mechanical front steering with zero-radius turn capability. In practice, and in a particular embodiment the software resident to the processor (not shown) of controller 1150 can be fine tuned to match the turning radii dictated by its control of the rear drive wheels with that of any mechanical front steering mechanism configured to produce zero-radius turns.

FIG. 53 depicts another embodiment of a front steering module 1200 comprising steer-by-wire, reduction gear mechanisms 1241L and 1241R integrated with frame members 1222, 1223L and 1223R, a pair of front wheel assemblies 1224L and 1224R, steering position sensor 1248, and wiring harness 1219. Module 1200 includes box section frame members 1223L and 1223R which may be welded to vehicle subframe members 1275L and 1275R, respectively, following insertion therein. FIG. 53 shows module frame member 1223R and vehicle subframe member 1275R unassembled, whereas FIG. 53 shows module frame member 1223L assembled to vehicle frame member 1275L. Such method of joinder is not meant to be limiting and is merely illustrative of the principles of the invention. Absent from module 1200 are the mechanical linkages between steering column 1246 and front wheel assemblies 1224L and 1224R. Instead, module 1200 uses electronic communication between steering position sensor 1248, the controller (not shown) of an electronic drive control system such as drive control system 30 or 530 as modified to incorporate processor 180, and electric drive motors 1221L and 1221R.

As with all versions of the front steering module, operator input to steering wheel 1236 results in signal transmission from steering position sensor 1248, via wiring harness 1219 and corresponding harness 1274, to a controller and associated processor, which includes circuitry similar to that of FIG. 43. The circuitry and algorithms inherent to such a processor have been previously described herein, and will not be further detailed. The controller produces corresponding signals that independently drive electric motors 1221L and 1221R and their associated reduction gearing, thereby positioning front wheel assemblies 1224L and 1224R to execute turns of differing radii in accordance with the principles of the invention. The use of independently driven motors 1221L and 1221R in module 1200 permits the control processes of the drive control system to be tuned or configured to execute turns at the vehicle's front end that match the turning radii dictated by control of the rear drive wheels (not shown), including zero-radius turns. Even greater steering precision is possible with electronic control of both steering modalities than with the mechanical front ends previously described.

Figure 54:
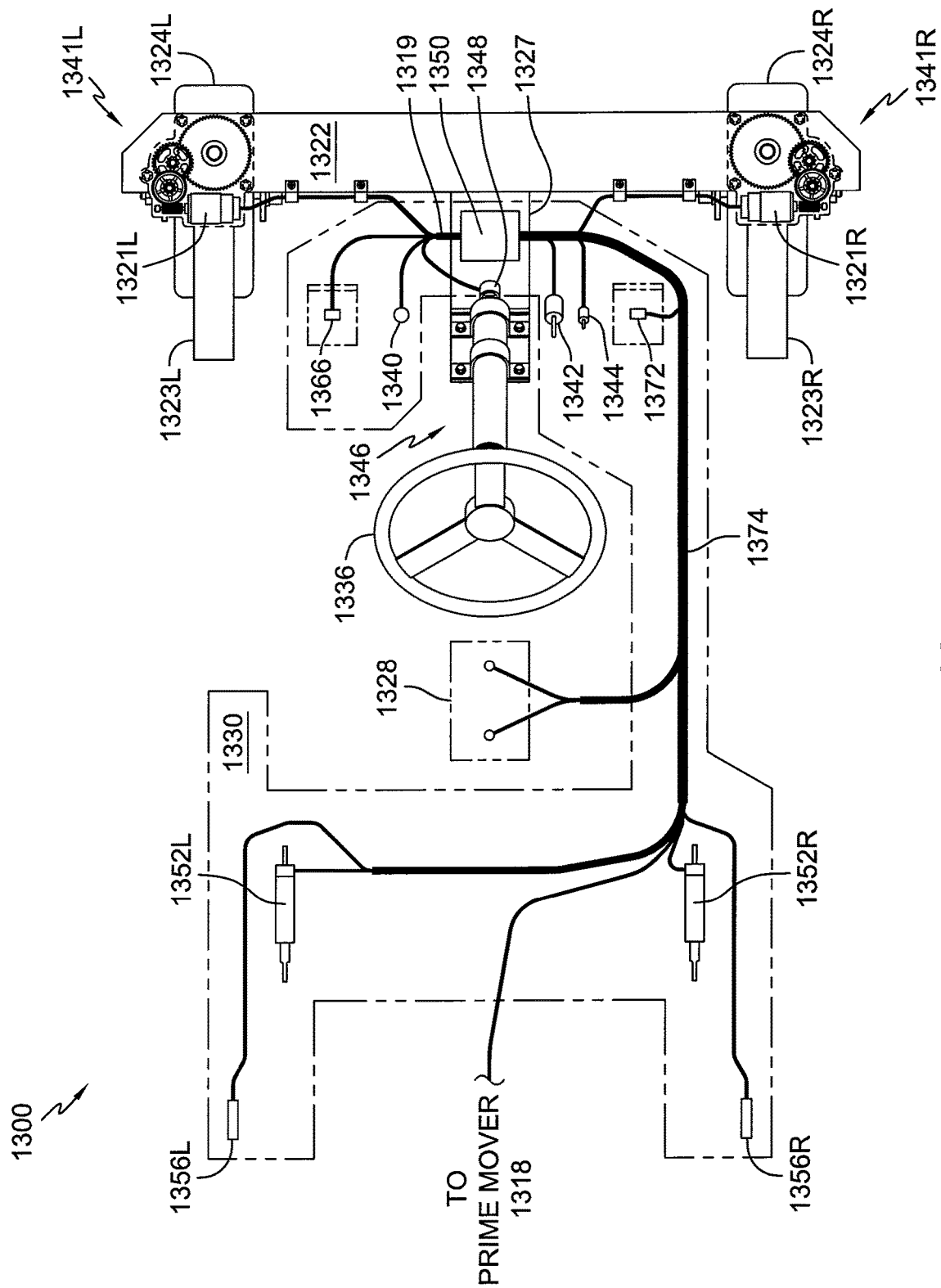
FIG. 54 is a top plan view of a fourth embodiment of a front steering module incorporating a drive control system.

A further aspect of the present invention is illustrated in FIG. 54, wherein front steering module 1300 combines the elements previously described for module 1200 with those elements necessary to form a complete drive control system 1330 having control processes and algorithms similar to those previously described for either drive control system 30 or 530. References to drive control system 30 or 530, and/or controllers 50 or 550 thereof, are merely illustrative of electronic drive control systems, and/or components thereof, that may be integrated and are not meant to limit application of the module disclosed herein. Thus, module 1300 can be mated to a vehicle subassembly featuring a prime mover 1318 and independent, variable drive units to form a ZT vehicle having matched zero-radius turn capability at its front and rear ends. Although steer-by-wire reduction gear mechanisms 1341L and 1341R are illustrated in this fully equipped module, it is to be understood that various steering mechanisms with direct or steer-by-wire configurations are contemplated herein.

Module 1300 combines a pair of steer-by-wire reduction gear mechanisms 1341L and 1341R, frame members 1322, 1323L, and 1323R, steering position sensor 1348, steering wheel 1336, steering column 1346, steering column support 1327, wiring harness 1319, and front wheel assemblies 1324L and 1324R with those elements necessary to form drive control system 1330. A controller 1350 having functionality similar to that previously detailed for either controller 50 or 550, and as modified to incorporate the circuitry of FIG. 43, is mounted along the vertical surface of steering column support 1327. In the alternative, any suitable location on a vehicle to which module 1300 is mated, particularly one that protects the controller 1350 from heat sources and environmental hazards, could be chosen. Controller 1350, via wiring harnesses 1319 and 1374, is placed in electrical communication with a pair of linear actuators 1352L and 1352R, axle speed sensors 1356L and 1356R, prime mover 1318, a power source (12V battery 1328), an accelerator position sensor 1372, a brake switch 1366, steering position sensor 1348, a pair of electric drive motors 1321L and 1321R, an LED or indicator light 1340, a PTO switch 1344, and an ignition switch 1342. The particular bundling of associated electrical cables between wiring harness 1319 and 1374 (or a single harness, not shown) can be varied to accommodate the specific layout of elements within a given ZT vehicle.

It is to be understood that various combinations of these sensors and switches, and others, may be incorporated into module 1300 depending upon the vehicle capability required. For example, actuators 1352L and 1352R may each incorporate a position sensor (not shown) to provide actuator position feedback to controller 1350, which in combination with feedback from axle speed sensors 1356L and 1356R allows precise control of a ZT vehicle's transmissions. Furthermore, the linear actuators 1352L and 1352R depicted may be replaced by rotary actuators (not shown), which are also known and capable of being drivingly attached to a vehicle transmission. In the case of a hydrostatic transmission, a rotary actuator would replace the control arm thereof to act directly on the trunnion which normally serves as the mechanical link between the swash plate and control arm.

As before, the array of possible responses from drive control system 1330 to operator input conveyed by steering position sensor 1348, accelerator position sensor 1372, and brake switch 1366 has been previously detailed for similar drive control systems 30 and 530 and is not further described herein. The workings of individual elements incorporated into module 1300 are also as previously described for corresponding elements of the earlier embodiments.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. An electronic drive control system for a vehicle having a right side actuator engaged to a first control arm of a right side variable drive unit and a left side actuator engaged to a second control arm of a left side variable drive unit, the electronic drive control system comprising:
   a right speed sensor in electrical communication with the right side variable drive unit;
   a left speed sensor in electrical communication with the left side variable drive unit;
   a controller in electrical communication with the right speed sensor and the left speed sensor, wherein the controller:
   receives a first signal from the right speed sensor and a second signal from the left speed sensor;
   determines at least one operational output of the right side variable drive unit and/or the left side variable drive unit based on the received first and second signals and an input signal denoting a desired speed and a desired direction of the vehicle;
   calculates adjustments to at least one of the right side actuator and the left side actuator; and
   adjusts the at least one of the right side actuator to move the first control arm of the right side variable drive unit and the left side actuator to move the second control arm of the left side variable drive unit to effectuate the at least one operational output.

2. The electronic drive control system of claim 1, wherein the controller calculates adjustments to the at least one of the right side actuator and the left side actuator based on an operating algorithm having settings comprising one or more of a speed of response of the right and left side actuators, a maximum speed of the right and left side variable drive units, or a permitted acceleration when transitioning the vehicle from zero turn operation.

3. The electronic drive control system of claim 1, further comprising at least one vehicle sensor in electrical communication with the controller, wherein the controller generates the input signal based on at least one sensor signal from the at least one vehicle sensor.

4. The electronic drive control system of claim 1, further comprising at least one axle speed sensor in electrical communication with the controller, wherein the at least one axle speed sensor is configured to detect a speed of an axle shaft of the vehicle, and wherein the controller generates the input signal based on at least one sensor signal from the at least one axle speed sensor.

5. The electronic drive control system of claim 1, wherein the controller is further in electrical communication with a power take-off switch to govern power to an auxiliary mechanism of the vehicle, and wherein the controller permits operation of the auxiliary mechanism when the input signal denotes the desired direction of the vehicle as a reverse direction and an ignition switch is in a reverse operating system position.

6. A vehicle drive system controller in electrical communication with a first actuator linked to a first control arm of a first variable drive unit of a vehicle, and a second actuator linked to a second control arm of a second variable drive unit of the vehicle, the vehicle drive system controller programmed to perform the steps of:
receiving at least one input signal relating to a desired speed and a desired direction of the vehicle;
calculating a speed adjustment for each of the first and second variable drive units based on the at least one input signal;
sending a first actuator control signal to the first actuator to move the first control arm, based on the calculated speed adjustment for the first variable drive unit; and
sending a second actuator control signal to the second actuator to move the second control arm, based on the calculated speed adjustment for the second variable drive unit.

7. The vehicle drive system controller of claim 6, wherein the controller is programmed to calculate the speed adjustment for each of the first and second variable drive units based on an operating algorithm having settings comprising one or more of a speed of response of the first and second actuators, a maximum speed of the first and second variable drive units, or a permitted acceleration when transitioning the vehicle from zero turn operation.

8. The vehicle drive system controller of claim 6, wherein the controller is further programmed to perform the steps of:
receiving at least one sensor signal from at least one vehicle sensor in electrical communication with the controller; and
generating the at least one input signal based on the at least one sensor signal.

9. The vehicle drive system controller of claim 6, wherein the controller is further programmed to perform the steps of:
receiving at least one sensor signal from at least one axle speed sensor in electrical communication with the controller, wherein the at least one axle speed sensor is configured to detect a speed of an axle shaft of the vehicle; and
generating the at least one input signal based on the at least one sensor signal.

10. The vehicle drive system controller of claim 6, wherein the controller is further in electrical communication with a power take-off switch to govern power to an auxiliary mechanism of the vehicle, and wherein the controller is further programmed to perform the step of powering the auxiliary mechanism when the at least one input signal denotes the desired direction of the vehicle as a reverse direction and an ignition switch is in a reverse operating system position.

11. A variable drive system for a vehicle, the variable drive system comprising:
a first variable drive unit in communication with a first wheel of the vehicle;
a second variable drive unit in communication with a second wheel disposed on an opposing side of the vehicle with respect to the first wheel;
a first actuator in communication with a first control arm of the first variable drive unit and a second actuator in communication with a second control arm of the second variable drive unit, wherein the first actuator and the second actuator move the respective first and second control arms to facilitate speed adjustment of the respective variable drive units; and
an electronic drive control system comprising (i) a plurality of sensors, each sensor in communication with one of the first variable drive unit, the second variable drive unit, the first actuator, and the second actuator, and (ii) a controller in communication with the first actuator, the second actuator, and the plurality of sensors to facilitate independent adjustment of the variable drive units based on input from at least one of the plurality of sensors, wherein the controller is configured to:
receive a plurality of input signals from the plurality of sensors;
determine at least one operational output of the first variable drive unit and/or the second variable drive unit based on the received input signals;
calculate adjustments to at least one of the first actuator and the second actuator; and
adjust the first actuator to move the first control arm of the first variable drive unit and/or the second actuator to move the second control arm of the second variable drive unit, thereby effectuating the at least one operational output.

12. The variable drive system of claim 11, wherein the controller is further configured to calculate adjustments to the at least one of the first actuator and the second actuator based on an operating algorithm having settings comprising one or more of a speed of response of the first and second actuators, a maximum speed of the first and second variable drive units, or a permitted acceleration when transitioning the vehicle from zero turn operation.

13. The variable drive system of claim 11, wherein the plurality of sensors comprises at least one axle speed sensor, wherein the plurality of input signals comprises at least one axle speed sensor signal from the at least one axle speed sensor, wherein the at least one axle speed sensor is configured to detect a speed of an axle shaft of the vehicle, and wherein the controller is further configured to determine the at least one operational output based on the at least one axle speed sensor signal.

14. The variable drive system of claim 11, wherein the controller is further in communication with a power take-off switch to govern power to an auxiliary mechanism of the vehicle, and wherein the controller permits operation of the auxiliary mechanism when one of the plurality of input signals denotes a desired direction of the vehicle as a reverse direction and an ignition switch is in a reverse operating system position.

15. A zero-turn vehicle having a prime mover, the vehicle comprising:
a first driven wheel driven by a first output axle and disposed on a first side of the vehicle and a second driven wheel driven by a second output axle and disposed on a second side of the vehicle;
a drive controller connected to an electric power source, wherein the drive controller is in communication with at least one speed sensor for detecting a speed of the vehicle;
a first variable drive unit powered by the prime mover and comprising a first hydraulic pump, a first hydraulic motor in communication with the first hydraulic pump for driving the first output axle, and a first control mechanism for controlling the first hydraulic pump;
a first electric actuator engaged to the first control mechanism, the first electric actuator in communication with the drive controller, wherein the first electric actuator comprises a first position sensor for detecting a position of the first electric actuator, and the first position sensor is in communication with the drive controller;

a second variable drive unit powered by the prime mover and comprising a second hydraulic pump, a second hydraulic motor in communication with the second hydraulic pump for driving the second output axle, and a second control mechanism for controlling the second hydraulic pump; and a second electric actuator engaged to the second control mechanism, the second electric actuator in communication with the drive controller, wherein the second electric actuator comprises a second position sensor for detecting a position of the second electric actuator, and the second position sensor is in communication with the drive controller;

wherein the first electric actuator and the second electric actuator move the first control mechanism and the second control mechanism, respectively, to permit steering of the vehicle by independently controlling the output speeds of the first output axle and the second output axle, and the drive controller is configured to adjust the first electric actuator and the second electric actuator based on signals received from the at least one speed sensor and at least one input signal relating to a desired acceleration and a desired steering of the vehicle.

16. The vehicle of claim 15, wherein the drive controller is further configured to calculate adjustments to the first electric actuator and the second electric actuator based on an operating algorithm having settings comprising one or more of a speed of response of the first and second electric actuators, a maximum speed of the first and second variable drive units, or a permitted acceleration when transitioning the vehicle from zero turn operation.

17. The vehicle of claim 15, further comprising at least one vehicle sensor in communication with the drive controller, wherein the drive controller is further configured to:

receive at least one sensor signal from the at least one vehicle sensor; and generate the at least one input signal based on the at least one sensor signal.

18. The vehicle of claim 15, further comprising at least one axle speed sensor in communication with the drive controller, wherein the at least one axle speed sensor is configured to detect a speed of an axle shaft of the vehicle, wherein the drive controller is further configured to:

receive at least one sensor signal from the at least one axle speed sensor; and generate the at least one input signal based on the at least one sensor signal.

19. The vehicle of claim 15, further comprising an auxiliary mechanism and a power take-off switch in communication with the drive controller, wherein the drive controller receives a signal from the power take-off switch when the auxiliary mechanism has been powered.

20. The vehicle of claim 15, further comprising an inclinometer and either an indicator light, LED, or LCD screen in communication with the drive controller to advise an operator of a potentially unsafe operating condition.

* * * * *